(12) United States Patent
Igarashi et al.

(10) Patent No.: US 8,059,966 B2
(45) Date of Patent: Nov. 15, 2011

(54) WAVELENGTH DIVISION MULTIPLEX OPTICAL REGENERATION SYSTEM AND WAVELENGTH DIVISION MULTIPLEX OPTICAL REGENERATION METHOD

(75) Inventors: Koji Igarashi, Tokyo (JP); Shunichi Matsushita, Tokyo (JP); Shu Namiki, Tokyo (JP); Shigehiro Takasaka, Tokyo (JP); Takashi Inoue, Tokyo (JP); Hideaki Tobioka, Tokyo (JP); Jiro Hiroishi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1475 days.

(21) Appl. No.: 10/516,306

(22) PCT Filed: Jun. 11, 2003

(86) PCT No.: PCT/JP03/07433
§ 371 (c)(1),
(2), (4) Date: Apr. 25, 2006

(87) PCT Pub. No.: WO03/104886
PCT Pub. Date: Dec. 18, 2003

(65) Prior Publication Data
US 2006/0204170 A1     Sep. 14, 2006

(30) Foreign Application Priority Data

Jun. 11, 2002 (JP) ............................... 2002-170429
Mar. 3, 2003 (JP) ............................... 2003-055645
Apr. 30, 2003 (JP) ............................... 2003-125659

(51) Int. Cl.
H04B 10/02 (2006.01)

(52) U.S. Cl. ..................... 398/179; 398/176; 398/180

(58) Field of Classification Search .......... 398/146–149, 398/158–160, 176, 179–180
See application file for complete search history.

(56) References Cited

U.S. PATENT DOCUMENTS
5,523,874 A * 6/1996 Epworth .......................... 398/28
(Continued)

FOREIGN PATENT DOCUMENTS
CN     1299475 A     6/2001
(Continued)

OTHER PUBLICATIONS

Bruno Dany, et al., "Recovered Efficiency of Filter Control in Dispersion-Managed Solitons for Optical Regeneration Applications: Analysis and Experimental Validation", Optics Letters, XP-002486032, vol. 25, No. 11, Jun. 1, 2000, pp. 793-795.

(Continued)

Primary Examiner — Dzung Tran
(74) Attorney, Agent, or Firm — Oblon, Spivak, McClelland, Maier & Neustadt, L.L.P.

(57) ABSTRACT

An optical regeneration system for regenerating a degenerated signal light, comprising a regeneration device having at least one of a soliton converter, a pulse roller, a Kerr-shutter and a soliton purifier. The solilton converter uses an anomalous-dispersion fiber (ADF) having a fiber length up to three times the soliton frequency, and the pulse roller is provided with a pulse roller fiber having high non-linear characteristics. The Kerr-shutter comprises an optical LO (local oscillation) generator for generating an optical LO on an OPLL (optical phase locked loop), a phase comparator for detecting the phase difference between an externally-input signal light and an optical LO, and a control unit for regulating the repeated frequency of an optical LO based on the phase difference. The soliton purifier has a soliton fiber disposed between two optical fibers.

4 Claims, 48 Drawing Sheets

U.S. PATENT DOCUMENTS

| | | | |
|---|---|---|---|
| 5,715,346 A * | 2/1998 | Liu | 385/124 |
| 5,796,891 A * | 8/1998 | Poustie et al. | 385/28 |
| 6,201,621 B1 | 3/2001 | Desurvire et al. | |
| 2003/0012495 A1* | 1/2003 | Islam et al. | 385/31 |
| 2003/0118303 A1* | 6/2003 | Evans | 385/122 |
| 2006/0002715 A1* | 1/2006 | Igarashi et al. | 398/152 |

FOREIGN PATENT DOCUMENTS

| | | |
|---|---|---|
| EP | 1 185 007 | 3/2002 |
| JP | 10-276130 | 10/1998 |
| JP | 11-284261 | 10/1999 |
| JP | 2001-08244 | 1/2001 |
| JP | 2002-77052 | 3/2002 |

OTHER PUBLICATIONS

W. A. Pender, et al., "10 Gbit/s all-optical regenerator", Electronics Letters, vol. 31, No. 18, Aug. 31, 1995, pp. 1587-1588.

W. A. Pender, et al., "Error free operation of a 40Gbit/s all-optical regenerator", Electronics Letters, vol. 32, No. 6, Mar. 14, 1996, pp. 567-569.

J. C. Simon, et al., "All Optical Regeneration", Electronic-Enhanced Optics, Optical Sensing in Semiconductor Manufacturing, Electro-Optics in Space, Broadband Optical Networks, Digest of the LEOS Summer Topical Meetings, FC4., Jul. 24-28, 2000, pp. 53-54.

"Analyses of Coherence-Maintained Ultrashort Optical Pulse Trains and Supercontinuum Generation in the Presence of Soliton-Amplified Spontaneous-Emission Interaction", Kubota, et. al., vol. 16, No. 12, Dec. 1999, J. Opt. Soc. Am. B, pp. 2223-2232.

Dany, B. et al., Full Optimization of 40Gbits/s Black-Box Optical Regenerator for DWDM transoceanic transmissions, Pro. 27$^{th}$ Eur. Conf. on Opt.Comm., We.P.45, pp. 466-467, 2001.

* cited by examiner

WAVELENGTH DIVISION MULTIPLEX OPTICAL REGENERATION SYSTEM AND WAVELENGTH DIVISION MULTIPLEX OPTICAL REGENERATION METHOD

TECHNICAL FIELD

The present invention relates to a wavelength division multiplex optical regeneration system and a wavelength division multiplex optical regeneration method.

BACKGROUND ART

There is continuously increasing a transmission capacity of the communication systems, and the capacity has been significantly increasing due to a progress of an optical fiber used in a communication system. For example, the communication systems are categorized into a point-to-point trunk line network system, a metro network system and an access network system, the optical communication system has already been deployed in the trunk line network system, in addition, even in the metro network system and the access network system, an electrical communication system is going to be replaced with the optical communication system. Namely, the whole communication system is progressing to adopt the optical communication system.

Recently, the information capacity transmitted via one optical fiber has been dramatically increased by use of a wavelength division multiplexing system. In this system, when using a low loss band width at 0.4 bit/Hz spectrum transfer efficiency, the transmission capacity per one optical fiber becomes approximately 3.2 Tbit/s. Concretely, this capacity can be realized by 320 channels based on the 10 Gbit/s transmission speed per channel (wavelength) which is available today.

It is inevitable for an optical signal to deteriorate in its waveform, timing and intensity when it travels a long distance. As such, the optical signal which has traveled a certain distance is inevitably required to be regenerated. Therefore, a regenerating system is normally provided in the optical communication systems so that the degenerated signal light is recovered. This regenerating system typically comprises: a receiver unit which receives a degenerated signal light and converts it into an electrical signal; a regenerator unit which performs a necessary function such as amplifying, noise reduction, waveform reshaping, and clock signal regeneration for the electrical signal; and a transmitter unit which reconverts the regenerated electrical signal to the optical signal then sends out to the optical carrier.

Concretely, in the optical signal regenerating system which is inserted in the middle point of the optical fiber wherein a plurality of light signals in 320 channels travel, 320 units of receivers, regenerators and transmitters are equipped in order to accommodate the number of channels.

There has been a difficulty in downsizing and a disadvantage of large power consumption in the optical signal regenerating system which includes so many units.

Furthermore, when the optical signal regenerating system is used in a metro network system and an access network system, it is necessary to install 320 channel optical signal regenerating systems at many relay points, and consequently the whole optical communication system becomes bigger and the cost and the power consumption increase.

As one of the solutions for the problems, there is an approach of reducing the number of channels in the wavelength division multiplexing system and increasing its transmission speed of each channel. This is because, the transmission speed is inversely proportional to the number of channels in the wavelength division multiplexing system when maintaining the same transmission capacity.

However, the regenerator used in the optical signal regenerating system is made of an electric device to process the electric signals so it has a physical upper limitation in the response speed. For example, a maximum signal transmission speed processed in an electric device is 40 Gbits/s today. Further, at this speed, still 80 channels are needed. Furthermore, when an electronic device is driven at higher speed, the higher electric power is needed. Therefore, the regenerating system using an electric device has a limitation in the transmission speed of each channel and it is difficult to realize a downsizing and reduce the power consumption in the real application.

As another possible solution for the problems with an optical signal regenerating system using an electronic device, there is a method of using whole optical signal regenerator which processes on the optical light itself without converting it to an electric signal. The equipment of the whole optical signal regenerator typically comprises a high speed electrical modulator and a regenerator utilizing a nonlinear optical effect of the substance.

However, this whole optical signal regenerator uses an electric modulator, so that there is an upper limitation in the processing speed similarly to the optical signal regeneration system which performs a photo-electro conversion. Further, when regenerating an optical signal of 40 Gbits/s or faster transmission speed, the transmission speed of the optical signal is reduced by a time division process, and after regenerating the signal, a time division multiplexing is required and hence it becomes a large system.

Because the whole optical signal regenerator uses a nonlinear optical response (nonlinear optical effect) for regenerating an optical signal, the following problems are caused.

Namely, in a large capacity optical communication system, when the light of a wavelength division multiplexed signal which includes a plural signal lights with a different wave length transmits through the optical transmitting path, the polarizing condition of each optical signal becomes slightly different among each wavelength after transmitted. If the regenerating process is performed at once by a whole optical signal regenerator using a nonlinear optical effect, the intensity of the nonlinear optical effect varies depending on the polarization condition of the incident light, and consequently the wavelength division multiplexed light after regenerated may include components of the light that is not well regenerated or sometimes no components regenerated at all.

In the above, the problems are pointed out focusing the polarization condition of the incident transmitting light in the optical regenerator. In the below, the today's problems will be discussed focusing on the optical regeneration system. The optical regeneration means re-amplification of a light intensity, re-shaping of a waveform, and re-timing of an optical signal which is degenerated during a transmission (hereinafter, abbreviated to O3R). The optical regeneration system which has those functions can transmit a signal light to the infinite distance (long distance) of the optical fiber.

Regarding the infinite distance (long distance) transmission described above, it is reported by Leuthold et al. (Leuthold et al., Electron. Lett,. 38, p 890, 2002). This paper describes about 40 Gb/s, 1,000,000 km transmission using an O3R regenerator.

In this paper, Leuthold et al used an electronic circuit technique for the optical clock extraction required for re-timing (a technique of generating a clock pulse train synchronizing with the transmitting optical signal) and for the switching function. As such, this system cannot satisfy the transmission speed which is limited by the electrical circuit technique. For example, it is not applicable to 160 Gbits/s system which exceeds the limit of the speed of the electronic circuit.

Note that regarding the 160 Gbits/s system, it is reported about the optical regenerator adopting an optical switch. (Schubert et al., Electron. Lett,. 38, p 903, 2002). However, it is anticipated not to work as an O3R device because the clock extractor is not provided.

Summarizing the above, the O3R has not been yet realized which fundamentally utilizes an effective whole light technique. However, there are many reports about a method of re-shaping of the waveform and re-timing of the clock which are one of components in the O3R. It will be demonstrated below but limited to the technique of an optical fiber which fundamentally relates to the present invention.

At first, the whole optical waveform re-shaping method will be described. This can be generally categorized into two methods. First one is a method utilizing a solution which is a combination effect made by a nonlinear optical characteristic and an anomalous dispersion of an optical fiber (Hasegawa and Tappert, Appl. Phys. Lett., 23, P 142, 1973). The waveform re-shaping device based on this technique is called as a solution converter. Second one is a method based on the self phase modulation effect of a light pulse utilizing a nonlinear characteristic of an optical fiber (Mamyshev, ECOC' 98, p. 475, 1998). This is called as a Mamyshev filter originated from a name of a proponent. A method utilizing a supercontinuum light is positioned as a follow-up model.

As an experiment using the former system (solution converter), the transmission of 4×40 Gb/s signal for 10,000 km is reported (Dany et al., Opt. Lett., 25, p. 793, 2000). The latter system (Mamyshev filter) is used in the 1,000,000 km transmission line in the Leuthold's system (Leuthold et al., Electron. Lett,. 38, p 890, 2002) as described above. All of them are reported from a view point of systems but has not described clearly about the performance of the device itself (only a few report such as Dany et al., ECOC' 01, We. P. 45, 2001). Especially, in the solution converter, because a noise amplification by a solution effect becomes a problem (Kubota et al., J. Opt. Soc. Am B, 16, p 2223, 1999), the designing from view point of a device performance is important as well. Namely, identifying the device performance clearly and establishing an optimum design rule of the device itself will be a future subject to be solved.

Next, a method of re-timing method will be described. The main stream of this technique is a complex method of an optical clock extraction and an optical switching. FIG. 38 shows this configuration. It includes an optical clock extraction part and an optical switching part. The former (an optical clock extraction part) is to synchronize the phase of the input signal (an optical signal or an electrical signal which corresponds to a carrier signal) and the local optical light (an optical pulse train which functions as a standard clock, called an optical local oscillator (abbreviated to optical LO). Namely, an optical clock extraction is realized by synchronization between the input optical light and the local optical light. Therefore, the optical LO is required to have a variable characteristic of the repetitive frequency.

The latter (an optical switching part) is an optical switch such as a four wave mixing (FWM) device or a nonlinear optical loop mirror (NOLM), utilizing a nonlinear effect of an optical fiber which can realize a multiplication function in the optical region. The details of the optical clock extraction and optical switch technique will be described below.

In FIG. 38, the area enclosed by a dotted line is an optical clock extraction part which comprises an optical phase comparator, an optical LO generator and a controller circuit. The optical phase comparator senses the phase difference between the external optical signal and the optical LO, and controls the optical LO oscillating frequency (which corresponds to the repetitive frequency of the pulse train) to minimize the error.

Consequently, a synchronization between the external optical signal and the optical LO is realized to produce a precise time position pulse train (hereinafter, called a clock pulse train) which is synchronized with the external optical signal. By utilizing a nonlinear optical effect instead of an electronic circuit technique, a phase controller which is capable of working at speed of exceeding 160 GHz can be realized. The method of a synchronization using a phase comparator in an optical region as described above is called an optical phase locked loop (OPLL). Actually, there has been proposed a clock extractor which is carried out by a synchronization between a beat light and an external optical signal from two LDs using a NOLM (Bigo et al., U.S. Pat. No. 6,239,893 B1).

Remarkable point is a timing jitter (time fluctuation of a clock pulse) of the output optical clock train of the OPLL. A timing jitter means a shift of the clock pulse in the time scale. Since the jitter can be a cause of deteriorating the performance in the communication systems, its suppression is important. The timing jitter of the clock pulse train has a correlation with the OPLL operation speed and when the OPLL operation is getting faster, the jitter is reducing. Namely, increasing an operation speed of OPLL is effective for jitter reduction.

However, when a NOLM as described in above technique (Bigo et al., U.S. Pat. No. 6,239,893 B1) is used, the OPLL loop length becomes a longer size, and hence the band width of the OPLL operation is limited. As a result, it restricts a reduction of jitter. To solve this, shortening a fiber length of the optical nonlinear device used for the phase controller will become a key factor. By shortening the fiber length, the OPLL operation band width can be free from the restriction, Namely, it can realize a fast speed OPLL operation and generate a high quality clock pulse train with less jitter.

There is required an optical switch technology for the re-timing along with the clock extraction technique described above. A method of using an FWM which is a typical example of an optical switch utilizing an optical fiber nonlinear effect will be described below. When two chromatic lights with different wavelengths enter an optical fiber, newly colored optical lights different from the original color are generated if either of the incident optical lights has a sufficient power for the nonlinear effect. This is an FWM phenomenon.

When the clock pulse train and the optical signal enter into the optical fiber, the FWM light includes an imposed information of the input optical signal and its pulse timing is determined by the clock pulse train. Consequently, the optical signal pulse train with low jitter in which the information is imposed can be obtained. This is a principle of re-timing based on FWM. However, not only dispersion effect but also nonlinear effect give an influence to the optical pulse traveling in the optical fiber.

By this effect or the combined effect of those effects, the pulse waveform changes during the pulse traveling. As a result, the waveform distortion of FWM light is generated. It is effective to optimize a fiber dispersion value or the input power in order to suppress this, but the real value or the control method have not been disclosed.

The minimum components required for the optical regeneration system are described above. In addition, a method to improve the performance of the optical regeneration system is also important. Two components relating to the present invention are summarized below. Namely, (1) a device to convert an optical pulse waveform to a wave shape suitable to the optical switch and (2) a device to isolate a component of the optical pulse from a component of optical noise.

Firstly, the rectangular pulse waveform method which is effective to suppress the increased noise intensity in the optical switch will be described concerning (1) a device to convert an optical pulse waveform to a wave shape suitable to the optical switch. Typically in the optical switch, as a result of an interaction between the nonlinear optical characteristic and the dispersion, the time jitter of the input of a transmitting optical signal pulse is converted to the intensity jitter in the output signal after regenerated. FIG. 39A is an explanatory view.

Here, an optical switch for a pulse train including a jitter and a clock pulse train will be discussed.

The output pulse power from the optical switch correlates with a time overlapping between a transmitting pulse and a clock pulse. As a result, a change in the overlapping region between both pulses caused by a jitter is converted to an output pulse power of the optical switch. In order to suppress the amount converted from the phase jitter to the light intensity jitter, a rectangular clock pulse waveform conversion on the transmitting optical signal pulse or the extracted clock pulse is effective (FIG. 39B).

This rectangular method is categorized into a method utilizing a chromatic dispersion or a polarization mode dispersion, and a method utilizing a complex effect of nonlinear effect and a normal dispersion. The former example is a method using a fiber Bragg grating or a polarization maintaining fiber (Lee et al., OFC2001, PD30-1, 2001 and Schubert et al., Electron. Lett,. 38, p 903, 2002), and the latter example is a method using a normal dispersion fiber (the principle reported, Nakatsuka et al., Phys. Rev. Lett., 47, p. 910, 1981).

In the former method based on the linear function, a steepness of the rising edge and falling trail of the rectangular waveform before transforming is determined by the input pulse width. Namely, in order to obtain a steep slope of the rectangular pulse, the very narrow optical pulse is needed accordingly. Compared with that, the latter case has an advantage of ability to transform to a steep slope rectangular wave, however, the higher power of an input optical light and a longer fiber length are the mandatory required to obtain nonlinear effect and dispersion effect.

Secondly, a device to isolate a component of optical pulse from a component of optical noise (2) will be described. In the below, the noise reduction component is summarized. The optical pulse has a noise imposed thereon. The major component of the noise is an amplified spontaneous emission light (ASE) generated when amplifying an optical light. In general, a noise has a wider optical spectrum than an optical signal, and hence the noise components which are out of the optical signal bandwidth can be eliminated by the optical filter to some extent.

However, the noise components within the bandwidth of the optical signal remain. To eliminate those noise components, there is a proposed method utilizing an optical solution characteristic, besides a method using a waveform reshaping described above. Here, attention is directed to the latter case which relates to the present invention.

There is reported about phenomena (solution self frequency shift: SSFS) that the solution shifts towards a longer wavelength side by a stimulated Raman scattering (SRS) in the optical solution transmission (Mitschke and Mollenauer, Opt. Lett., 11, p. 659, 1986). This phenomenon also happens when the ASE noise is added to the solution. It is proposed a method of noise reduction utilizing this characteristic which isolates the solution from ASE noise components to filter the same in the frequency domain by using this phenomenon (Namiki et al., Provisional Publication No. 2001-109024). The configuration of the noise reduction unit is shown in FIG. 40A.

It comprises an anomalous dispersion fiber (ADF) and an optical filter. An optical solution including noise components shown in FIG. 40B upper part is inputted to the ADF. During the transmission, SSFS of the optical solution component is carried out by the SRS. Further, the remarkable point is that the solution components shift towards longer wavelength side by the SRS but the noise components stay without shifting towards the longer wavelength side. Consequently, the noise components within a bandwidth of the optical signal can be eliminated by a method of extracting the solution components by the output optical filter after shifted. (FIG. 40B lower part).

Furthermore, this phenomenon has a function of shifting the wavelength as well, and therefore it is possible to adjust the wavelength of the optical signal to the desired wavelength by SSFS control. However, SSFS is a phenomenon which typically occurs in the femto second region, so that further improvements for the pico second solution transmission is necessary in the SSFS and its efficiency.

As described above, today's status and problems about the optical regeneration systems are detailed. The present invention is aiming to solve these problems and provide simple O3R systems.

The purpose of the present invention is to solve the above described problems and to provide a wavelength division multiplex optical regeneration system and a wavelength division multiplexing optical regeneration method which is capable of realizing a large transmission capacity, a small footprint and a power saving.

DISCLOSURE OF THE INVENTION

To attain the above object, one embodiment of an optical regeneration system in accordance with the present invention is an optical regeneration system to regenerate a degenerated optical signal including a regenerator which comprises at least one of devices consisting of a solution converter, a pulse roller, a Kerr shatter and a solution purifier.

Another embodiment of an optical regeneration system in accordance with the present invention is an optical regeneration system wherein a polarizing converter is included either in a previous stage before the regenerator or inside the regenerator.

Still another embodiment of an optical regeneration system in accordance with the present invention is an optical regeneration system wherein a demultiplexer is included in a previous stage before the regenerator, or before the polarizing converter when the polarizing converter is placed before the regenerator.

Yet another embodiment of an optical regenerating system in accordance with the present invention is an optical regenerating system wherein a multiplexer is included in a stage after the regenerator.

A still further embodiment of an optical regenerating system in accordance with the present invention is an optical regenerating system wherein a phase compensator is included in a stage before the generator, before the polarizing converter when the polarizing converter is placed before the regenerator, or before the demultiplexer when the demultiplexer is placed before the polarizing converter.

A yet further embodiment of an optical regenerating system in accordance with the present invention is an optical regenerating system wherein a multiplexer mixing an optical signal generated by the regenerator with another optical signal is included at an output side of the regenerator.

Another embodiment of an optical regenerating system in accordance with the present invention is an optical regenerating system wherein the regenerators are serially connected in multi stages.

Still another embodiment of an optical regenerating system in accordance with the present invention is an optical regenerating system wherein an optical switch is included between the regenerators serially connected in multi stages.

Yet another embodiment of an optical regenerating system in accordance with the present invention is an optical regenerating system wherein an input power is adjusted before the regenerator.

One embodiment of a waveform reshaping device in accordance with the present invention is a waveform reshaping device having a solution converter comprising an anomalous dispersion fiber (ADF) in which a fiber length thereof is up to twice of that of a solution frequency.

Another embodiment of a waveform reshaping device in accordance with the present invention is a waveform reshaping device wherein an optical filter is included in a stage after the anomalous dispersion fiber.

Yet another embodiment of a waveform reshaping device in accordance with the present invention is a waveform reshaping device wherein an optical amplifier is included in a stage before the anomalous dispersion fiber.

A still further embodiment of a waveform reshaping device in accordance with the present invention is a waveform reshaping device wherein a Mamyshev filter or a NOLM is included in place of the solution converter.

A yet further embodiment of a waveform reshaping device in accordance with the present invention is a waveform reshaping device wherein a pulse compressor is included at an input side.

Another embodiment of a waveform reshaping device in accordance with the present invention is a waveform reshaping device wherein the pulse compressor utilizes an adiabatic compression.

Still another embodiment of a waveform reshaping device in accordance with the present invention is a waveform reshaping device wherein the pulse compressor includes a dispersion decreasing fiber in which the dispersion is decreasing in a longitudinal direction of the optical fiber.

Yet another embodiment of a waveform reshaping device in accordance with the present invention is a waveform reshaping device wherein the pulse compressor includes an SDPF in which the dispersion has a step like profile in a longitudinal direction of the optical fiber.

A still further embodiment of a waveform reshaping device in accordance with the present invention is a waveform reshaping device wherein the pulse compressor includes an CDPF in which the dispersion has a comb like profile in a longitudinal direction of the optical fiber.

A yet further embodiment of a waveform reshaping device in accordance with the present invention is a waveform reshaping device wherein the pulse compressor includes an optical fiber in which nonlinearity is increasing in a longitudinal direction of the optical fiber.

Another embodiment of a waveform reshaping device in accordance with the present invention is a waveform reshaping device wherein the pulse compressor includes an optical fiber in which nonlinearity has a step like profile increasing in a longitudinal direction of the optical fiber.

Still another embodiment of a waveform reshaping device in accordance with the present invention is a waveform reshaping device wherein the pulse compressor includes an optical fiber in which nonlinearity has a comb like profile increasing in a longitudinal direction of the optical fiber.

Yet another embodiment of a waveform reshaping device in accordance with the present invention is a waveform reshaping device wherein the pulse compressor includes a Raman amplifier.

A still further embodiment of a waveform reshaping device in accordance with the present invention is a waveform reshaping device wherein a saturable absorption substance having a saturable absorption characteristic is used in place of the solution converter.

A yet further embodiment of a waveform reshaping device in accordance with the present invention is a waveform reshaping device which further comprises a position adjustment unit in which the saturable absorption characteristic is made variable by adjusting a position of the saturable absorption substance.

Another embodiment of a waveform reshaping device in accordance with the present invention is a waveform reshaping device wherein the saturable absorption characteristic has a surface distribution.

One embodiment of a Kerr-shutter in accordance with the present invention is a Kerr-shutter comprising a demultiplexer, an OPLL (Optical Phase Locked Loop), and an optical switch.

Another embodiment of a Kerr-shutter in accordance with the present invention is a Kerr-shutter wherein $L_{Loop}$ is determined by satisfying the following equation:

$$\Delta\omega(L_{Loop}) < v \cdot X / n \cdot L_{A-B}$$

where $\Delta\omega$: bit rate difference in the OPLL, $L_{Loop}$: loop length, v: velocity of the light in the optical fiber, $L_{A-B}$: length of fiber between the demultiplexer and the optical switch, n: refraction index of the fiber, and X: arbitrary number.

Still another embodiment of a Kerr-shutter in accordance with the present invention is a Kerr-shutter wherein the OPLL comprises an optical LO generator generating an optical. LO, a phase comparator detecting phase difference between an external optical signal and the optical LO signal, and a controller to control a frequency of the LO signal based on the phase difference.

Yet another embodiment of a Kerr-shutter in accordance with the present invention is a Kerr-shutter wherein the phase comparator includes an FWM unit generating an FWM light, an optical filter and a photo receiving device.

A still further embodiment of a Kerr-shutter in accordance with the present invention is a Kerr-shutter wherein the FWM unit adopts either a high nonlinear optical fiber, a PPLN (Periodically-poled $LiNO_3$), or an SOA (Semi-conductive Optical Amplifier).

A yet further embodiment of a Kerr-shutter in accordance with the present invention is a Kerr-shutter wherein the photo receiving device has a pulse roller which is placed in a front stage and monitors frequency characteristic of pulses entering to the photo receiving device.

Another embodiment of a Kerr-shutter in accordance with the present invention is a Kerr-shutter wherein the LO generator has a beat light generator.

Still another embodiment of a Kerr-shutter in accordance with the present invention is a Kerr-shutter wherein the beat light generator comprises at least one semiconductor laser which emits a CW light with at least two frequency components and an optical coupler which mixes the CW lights.

Yet another embodiment of a Kerr-shutter in accordance with the present invention is a Kerr-shutter wherein the semiconductor lasers are driven in series.

A still further embodiment of a Kerr-shutter in accordance with the present invention is a Kerr-shutter wherein an optical fiber compressor is inserted between the beat light generator and the optical switch.

A yet further embodiment of a Kerr-shutter in accordance with the present invention is a Kerr-shutter wherein the phase comparator includes a PD (Photodiode), a Loop Filter and an LD controller, and wherein the PD generates a photo current by a two photon absorption effect.

Another embodiment of a Kerr-shutter in accordance with the present invention is a Kerr-shutter wherein the PD is made of a silicon avalanche photodiode (SiAPD).

Still another embodiment of a Kerr-shutter in accordance with the present invention is a Kerr-shutter wherein the optical switch includes an FWM unit, an optical filter and a phase controller.

Yet another embodiment of a Kerr-shutter in accordance with the present invention is a Kerr-shutter wherein the phase controller is controlled so that the phase control output does not to drift for change of an ambient temperature.

A still further embodiment of a Kerr-shutter in accordance with the present invention is a Kerr-shutter wherein the phase control output is controlled by a feedback of an output pulse.

A yet further embodiment of a Kerr-shutter in accordance with the present invention is a Kerr-shutter wherein the FWM unit has a relation expressed by the following equation:

$$\Delta v > \frac{|\Delta v_p + \Delta v_s|}{2}$$

where;
$\Delta v$: frequency delta (detuning amount) between a pump light and an optical signal,
$\Delta v_p$: spectrum width of an input pumping pulse, and
$\Delta v_s$: spectrum width of an input signal pulse.

Another embodiment of a Kerr-shutter in accordance with the present invention is a Kerr-shutter wherein the FWM unit has a relation expressed by the following equation:

$$\Delta L > \Delta v_p + (\Delta v_s/2)$$

where;
$\Delta L$: fiber length,
$\Delta v_p$: spectrum width of an input pumping pulse, and
$\Delta v_s$: spectrum width of an input signal pulse.

Still another embodiment of a Kerr-shutter in accordance with the present invention is a Kerr-shutter wherein the fiber length L is determined by the following equation:

$$1 < \frac{L}{L_{NL}} = \gamma P_0 L$$

Yet another embodiment of a Kerr-shutter in accordance with the present invention is a Kerr-shutter wherein the fiber length L of the FMW unit is determined by the following equation:

$$\frac{L}{L_{SOD}} < \frac{1}{2}, \frac{L}{L_{TOD}} < \frac{1}{2}$$

$$\beta_3 < \frac{1.7628^3}{2} \frac{\Delta t_p^3}{L}$$

$$\beta_3 < \frac{1.7628^2}{4\pi} \frac{\Delta t_s^2}{L \Delta v}$$

A still further embodiment of a Kerr-shutter in accordance with the present invention is a Kerr-shutter which is designed by the following steps of:
a process to determine a detuning amount $\Delta v$ which is a value to avoid a spectrum overlapping using the equation regarding the pumping pulse ($\Delta t_p$, $\Delta v_p$) and the signal pulse ($\Delta t_s$, $\Delta v_s$);

$$\Delta v > \frac{|\Delta v_p + \Delta v_s|}{2}$$

a process to determine the fiber length L to obtain the FWM bandwidth exceeding $2\Delta v$;
a process to determine the pumping peak power $P_p$ which can generate an FWM without distortion in the spectrum waveform using the equation;

$$1 < \frac{L}{L_{NL}} = \gamma P_0 L$$

$$\gamma P_P L \leq \frac{3\pi}{2}$$

and
a process to determine the third order dispersion value $\beta_3$ which is necessary to suppress a time waveform distortion of the pulse during the fiber transmission using the following equation:

$$\beta_3 < \frac{1.7628^3}{2} \frac{\Delta t_p^3}{L}$$

$$\beta_3 < \frac{1.7628^2}{4\pi} \frac{\Delta t_s^2}{L \Delta v}$$

A yet further embodiment of a Kerr-shutter in accordance with the present invention is a Kerr-shutter which further comprises an optical LO generator, and a controller, wherein the FWM unit is commonly shared with the optical phase comparator and the optical switch.

One embodiment of a pulse roller in accordance with the present invention is a pulse roller having a pulse roller fiber with high nonlinear characteristic.

Another embodiment of a pulse roller in accordance with the present invention is a pulse roller wherein the pulse roller fiber comprises a normal dispersion increasing fiber having a characteristic in which normal dispersion is increasing in a longitudinal direction.

Still another embodiment of a pulse roller in accordance with the present invention is a pulse roller wherein the pulse roller fiber has a characteristic in which nonlinearity is decreasing in a longitudinal direction.

Yet another embodiment of a pulse roller in accordance with the present invention is a pulse roller wherein the pulse roller fiber comprises a distribution management optical fiber which is a combination of at least two fibers which have different normal dispersion and different nonlinearity characteristic in a longitudinal direction.

A still further embodiment of a pulse roller in accordance with the present invention is a pulse roller wherein an optical fiber whose dispersion is dominant in a longitudinal direction and an optical fiber whose nonlinearity is dominant in a longitudinal direction are arranged in the distribution management optical fiber.

A yet further embodiment of a pulse roller in accordance with the present invention is a pulse roller wherein the dispersion characteristic of the optical fiber in which the dispersion is dominant and the nonlinearity characteristic of the optical fiber in which the nonlinearity is dominant are arranged to form a step-like profile in the dispersion management optical fiber.

Another embodiment of a pulse roller in accordance with the present invention is a pulse roller wherein the dispersion characteristic of the optical fiber in which the dispersion is dominant and the nonlinearity characteristic of the optical fiber in which the nonlinearity is dominant are arranged to form a comb-like profile in the dispersion management optical fiber.

One embodiment of an OTDM signal generator in accordance with the present invention is an OTDM signal generator comprising the pulse roller and the optical switch.

One embodiment of a solution purifier in accordance with the present invention is a solution purifier wherein a solution fiber is placed between two optical filters.

Another embodiment of a solution purifier in accordance with the present invention is a solution purifier wherein the gain slope (slope of gain) is controlled by a stimulated Raman scattering so that solution wave shift is realized in the solution fiber.

Still another embodiment of a solution purifier in accordance with the present invention is a solution purifier wherein the solution fiber comprises a highly nonlinear fiber.

Yet another embodiment of a solution purifier in accordance with the present invention is a solution purifier which further comprises a pumping light generator for generating external pumping light, wherein a stimulated Raman scattering is generated by the external pumping light.

A still further embodiment of a solution purifier in accordance with the present invention is a solution purifier which further includes a pulse compressor at an input side.

A yet further embodiment of a solution purifier in accordance with the present invention is a solution purifier wherein a stimulated Raman scattering is generated while performing a solution adiabatic compression.

One embodiment of a solution noise controlling method in accordance with the present invention is a solution noise controlling method of determining a maximum transmission distance at predetermined noise amplification gain based on a duty ratio (ratio of pulse period vs pulse width) and a dispersion distance during an optical nonlinear signal processing using an optical solution train.

Another embodiment of a solution noise controlling method in accordance with the present invention is a solution noise controlling method wherein a CS-RZ pulse train is used as a modulation method.

One embodiment of an optical transmission system in accordance with the present invention is an optical transmission system wherein the optical regeneration systems are serially connected in multi stages.

BEST MODE FOR CARRYING OUT THE INVENTION

Figure 1:
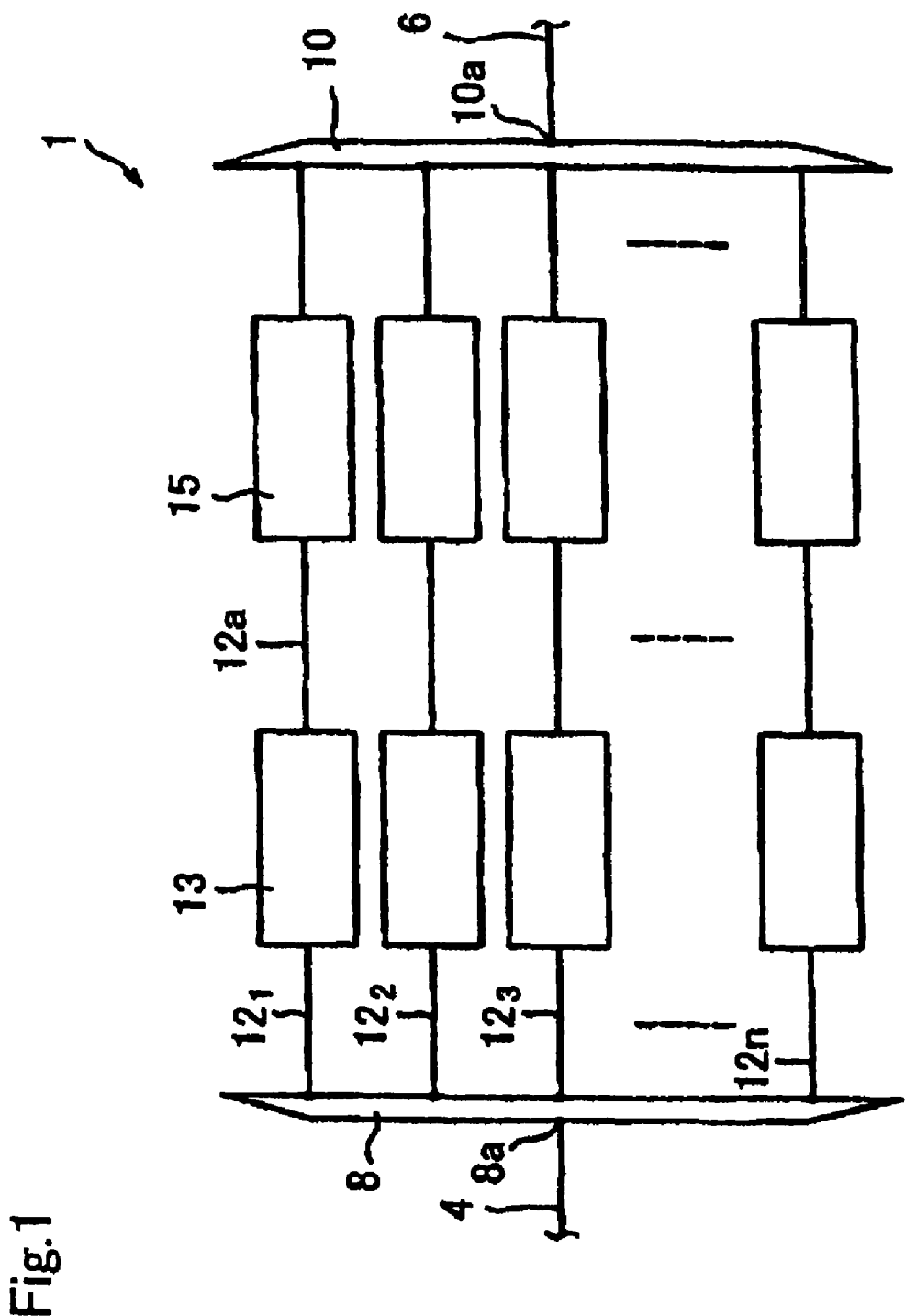
FIG. 1 is a schematic view of a first embodiment of the wavelength division multiplexing optical regeneration system in accordance with the present invention.

According to the present invention, a wave length division multiplexing optical light including a degenerated optical signal is regenerated by utilizing a nonlinear optical effect which is described later. Thus, a nonlinear optical effect is firstly explained.

The nonlinear optical effect occurs significantly when a high intensity optical light enters into a substance which has a large nonlinear optical constant (hereinafter, called a nonlinear optical substance). Examples for the substance which has a large nonlinear optical constant are an optical fiber doped with germanium, fluorine, rare earth metal or the like (hereinafter, called a high nonlinear optical fiber), a ferroelectric substance such as $LiNbO_3$ and a semiconductor etc. Further, as an example for the high intensity light source, there are the optical signal itself, and besides the optical signal itself, at least one controlled lights or pump lights which are intentionally prepared to generate this effect.

When a nonlinear optical effect occurs, for example, the waveform or phase of the incident light entering the optical media changes. Further, a high resonance frequency, or the sum frequency or the subtraction frequency is generated which is a different frequency from the controlled light or the pump light. As the examples of the nonlinear optical effect, there are a self phase modulation (hereinafter called "SPM"), a cross phase modulation (hereinafter called "XPM"), a four wave mixing (hereinafter called "FWM"), a Raman amplification, a parametric amplification, a solution effect, and a supercontinuum effect (hereinafter called "SC").

In this phenomena, the level of the nonlinear optical effect such as an amount of the frequency modulation, an intensity of the generated higher harmonic wave is nonlinear to the intensity of the incident optical light.

The level of the nonlinear optical effect has a dependency on the polarizing condition. For example, assuming that an optical light with a strong intensity is not in the non-polarization condition but in polarized condition, and the non-liner optical medium shows anisotropic characteristic in the plane where the direction of the incident light of this strong intensity optical light crosses at a right angle. In this case, the level of the nonlinear optical effect has a polarization dependency on the polarization condition and the relative direction to the medium. Even if that medium has not such anisotropic characteristic, the level of the nonlinear optical effect heavily depends on the relative relation between the polarization condition of the optical signal and the condition of the controlled light or pump light when the strong intensity optical light is either a controlled light or a pump light.

Referring to the drawings, the embodiments of the present invention will be described below.

FIG. 1 shows first embodiment of the wavelength division multiplexing optical regeneration system 1 in accordance with the present invention (hereinafter called "regenerating system 1").

The regenerating system 1 is used in the configuration installed in the wavelength division multiplexing optical communication system, for example it is inserted between the optical fiber 4 and the optical fiber 6.

The regenerating system 1 recovers and regenerates a degenerated signal included in a wavelength division multiplexing light, where the degeneration is caused when a wavelength division multiplexing light transmits in the path in the wavelength division multiplexing optical communication system, to the conditions before transmission such as conditions just after emitted from the signal generator. The degeneration means that at least one selected from a group consisting of a level of intensity, a phase, a frequency or a polarization condition or combination thereof, changes and exceeds a predetermined allowable value.

The regenerating system 1 comprises a demultiplexer 8 and a multiplexer 10.

Figure 43:
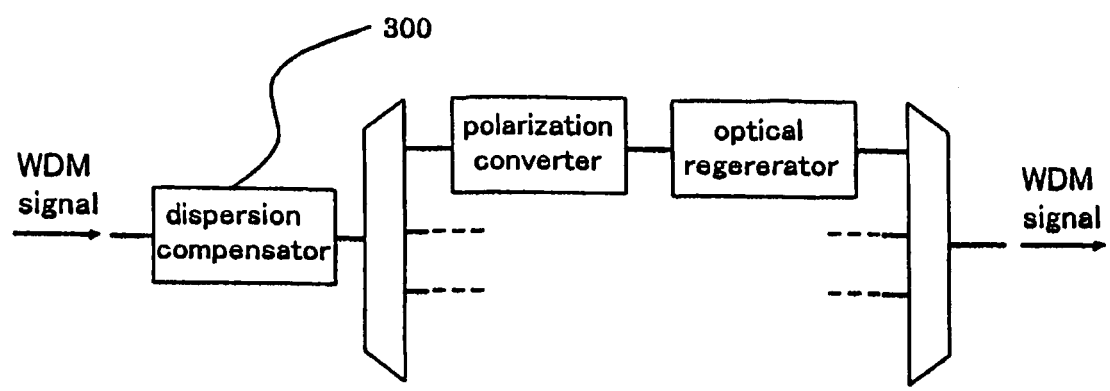
FIG. 43 shows one configuration of the regenerator in accordance with the present invention.

The demultiplexer 8 has one input port 8a and a plurality of output ports and the input port 8a is connected to the optical fiber 4. The wavelength division multiplexing light which enters in demultiplexer 8 via the input port 8a from the optical fiber 4 is divided into a plurality of signal lights $\lambda_1, \lambda_2, \lambda_3, \ldots \lambda_n$. Each of signal light $\lambda_1, \lambda_2, \lambda_3, \ldots \lambda_n$ is emitted from the output ports of the demultiplexers 8 which are prepared for each different wavelength. However, it is preferable to insert the dispersion compensator 300 before demultiplexing which works to compensate a chirping added by a dispersion of the transmission channel. This embodiment is shown in FIG. 43. One example of the dispersion compensator is a module using a fiber Bragg grating, a module using an etalon, a DCF (dispersion shifted fiber) module, a module using a prism pair or a grating or the like which is available for general use. Furthermore, the dispersion compensator 300 described above may be of a fixed type or a variable type, but a variable type is preferable because the range of chirping compensation can be broadened.

The multiplexer 10 has a plurality of input ports and a single output port 10a, and the optical fiber 6 is connected to the output port 10a. The optical signals $\lambda_1, \lambda_2, \lambda_3, \ldots \lambda_n$ which enter the multiplexer 10 via each input port are multiplexed to become a wavelength division multiplexing optical light, then the light transmits to the optical fiber 6 via the output port 10a.

The demultiplexer 8 and the multiplexer 10 may be constructed from an array waveguide diffraction grating, a filter type multiplexer/demultiplexer, an FBG (fiber Bragg grating) type multiplexer/demultiplexer.

Between the demultiplexer 8 and the multiplexer 10, a plurality of optical paths $12_1, 12_2, 12_3, \ldots 12_n$, are extended and both ends of each optical path $12_1, 12_2, 12_3, \ldots 12_n$ are connected to the output ports of the demultiplexer 8 and the input ports of the multiplexer 10.

For the optical path 12, selected at least one from the optical paths $12_1, 12_2, 12_3, \ldots 12_n$, the demultiplexer 8, the polarizing converter 13 and the optical signal regenerator 15 (hereinafter, called a regenerator 15) are inserted in this sequence.

In the regenerator system 1, a selection which optical path from the optical paths $12_1, 12_2, 12_3, \ldots 12_n$ requires a polarization converter 13 and an optical signal regenerator 15 to be inserted, is determined by taking account of the level of degeneration of the signal lights $\lambda_1, \lambda_2, \lambda_3, \ldots \lambda_n$ which transmit in the respective optical paths $12_1, 12_2, 12_3, \ldots 12_n$. Further, the embodiment shown in FIG. 44 which does not include a polarization converter 13 is also possible.

The optical paths $12_1, 12_2, 12_3, \ldots 12_n$ are constructed from an optical fiber such as a single mode fiber or a dispersion shifting fiber, an optical waveguide, or a space or combination thereof. However, the part of the optical path $12_1$ extending between the polarization converter 13 and the optical signal regenerator 15 is preferably constituted of the polarization maintaining waveguide 12a which can keep a polarization condition of the transmitting light because of the reason to be described later. There are several examples of the polarization maintaining waveguide 12a such as a polarization maintaining optical fiber, a semiconductor optical waveguide and a glass made flat surface waveguide or the like.

The incident light $\lambda_1$ which enters the polarization converter 13 is converted by the polarization converter 13 to the predetermined polarized condition suitable for processing at a regenerator 15 such as converting to a linear polarization, and after that it emits from the polarization converter 13.

At the time when it enters to the polarization converter 13, the optical signal $\lambda_1$ holds a certain polarizing condition which is determined by the original wavelength and the distance, its type, or other conditions of the transmission path from the generator to the polarization converter 13. Namely, the optical signal $\lambda_1$ holds its polarization condition corresponding to the chromatic dispersion of the light path and the polarization mode dispersion (including those by an optical elastic effect) or the like.

The polarization converter 13 performs a polarization conversion on the optical signal $\lambda_1$ which may take all possible polarizing condition responding to such a various and uncertain element, and then converts its polarizing condition into a desired polarizing condition. Namely, the polarization converter 13 emits a desired polarized light independently of the polarizing condition of the input optical signal at a time when it enters it, so that it has functions of converting a light in any arbitrary state of the polarization to a desired polarization condition.

The optical signal $\lambda_1$ which is emitted from the polarization converter 13 transmits through the polarization maintaining waveguide 12a and is inputted to the regenerator 15.

In this situation, the optical signal transmitting through the polarization maintaining waveguide 12a can maintain its polarizing condition during a transmission. Thus, the optical signal $\lambda_1$ which is emitted from the polarization converter 13 transmits into the regenerator 15 maintaining its polarizing condition.

More concretely, when the optical signal $\lambda_1$ after a polarization conversion is made to a linear polarization, and when a polarization maintaining optical fiber is used as a polarization maintaining waveguide 12a, it is possible to maintain the polarizing condition of the optical signal $\lambda_1$ between the polarization converter 13 and the regenerator 15, by means of adjusting a polarization plane of the optical signal to align to the same direction as the primarily plane of the polarization maintaining optical fiber, i.e. a phase lead axis or phase delay axis.

However, if the polarizing condition wave is maintained even without using a polarization maintaining waveguide 12a, a standard waveguide is acceptable. For example, by shortening the distance of the light path $12_1$ between the polarization converter 13 and the regenerator 15, it can maintain the polarizing condition or control the change of the optical signal $\lambda_1$ between them.

Furthermore, even in the case that the light path $12_1$ between the polarization converter 13 and the regenerator 15 is not a polarization maintaining waveguide 12a, the optical signal $\lambda_1$ in the desired polarizing condition can be inputted into the regenerator 15, by taking account of the birefrengency and setting a polarization conversion of the polarization converter 13, if a birefrengency of the light path $12_1$ is known.

The regenerator 15 processes on the optical signal $\lambda_1$ using nonlinear effect and regenerates the optical signal $\lambda_1$.

The optical signal $\lambda_1$ which emits from the regenerator 15 and transmits in the light path $12_1$ enters into the multiplexer 10 through the input port. On the other hand, to the multiplexer 10, the optical signals $\lambda_2, \lambda_3, \ldots \lambda_n$ which transmit in the respective optical paths $12_2, 12_3, \ldots 12_n$ enter through separated input ports, respectively. The multiplexer 10 mixes the optical signals $\lambda_1, \lambda_2, \lambda_3, \ldots \lambda_n$ to make it a wavelength division multiplexing light, and then emits the same from the output port 10a.

Figure 70:
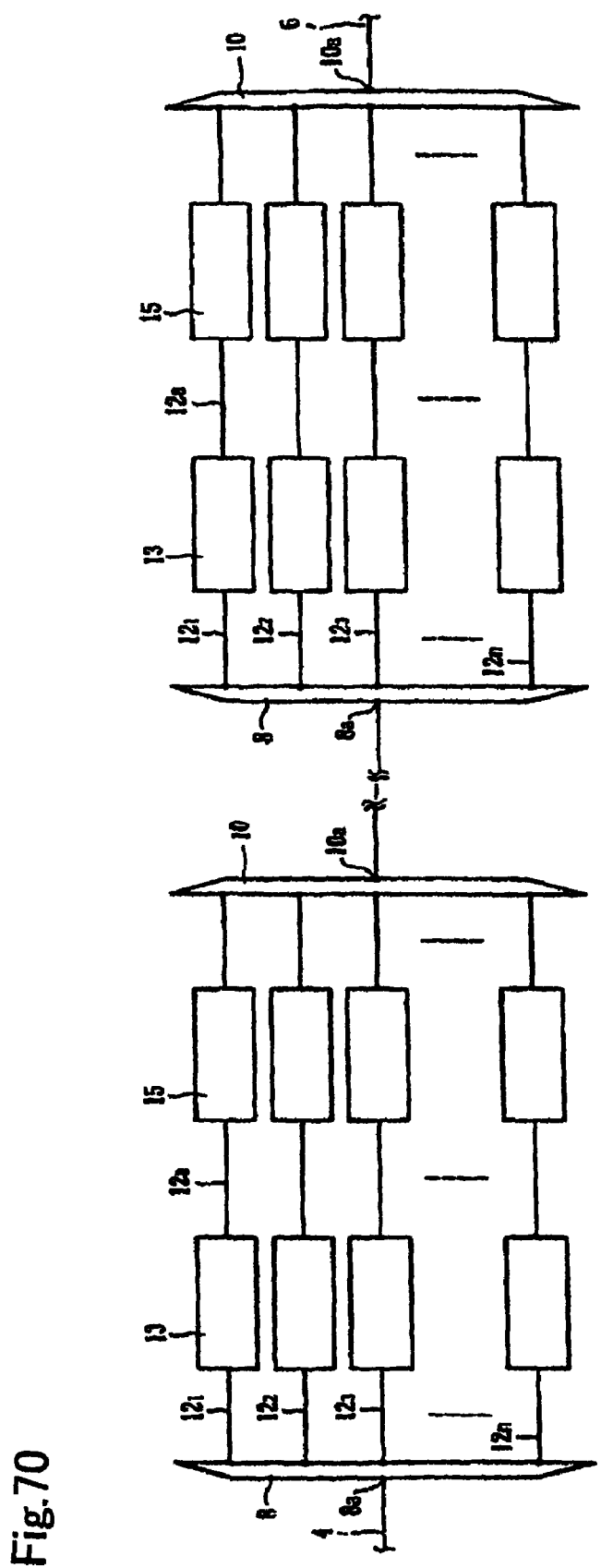
FIG. 70 is a schematic constitutional view of the optical communication system wherein a plurality of regenerating systems shown in FIG. 1 are connected in multi stages in series.

As shown in FIG. 70, an optical communication system may be constructed by connecting a plurality of the regenerating systems 1 described above in multi stages in series at an arbitrary distance. In the real application of the optical communication system, the regenerating system 1 is arranged in the manner as shown in FIG. 70. Namely, since the optical signal degeneration is caused by a characteristic of the optical fiber 4 or the optical fiber 6 or the transmission speed, the regenerating system may be arranged in the place where its regenerating is needed. Especially, in case that the optical signal is transmitted between the long distant stations, the optical communication system as shown in FIG. 70 is effective.

There will be described a method for regenerating a wavelength division multiplexing light using the regenerating system 1 (hereinafter referred to Method-A) with reference to FIG. 1.

The Method-A comprises the steps of a wave demultiplexing process, a polarization converting process and a regenerating process. At first, in the demultiplexing process, the demultiplexer 8 separates a wavelength division multiplexing light into a plurality of optical signals $\lambda_1, \lambda_2, \lambda_3, \ldots \lambda_n$ for each wavelength.

Then, in the polarization conversion process, the polarization converter 13 processes on at least one optical signal $\lambda_i$ selected from a plurality of optical signal $\lambda_1, \lambda_2, \lambda_3, \ldots \lambda_n$ which has been separated by the demultiplexing process. This polarization conversion converts the polarizing condition of the optical signal $\lambda_i$ to the best condition for realizing the desired nonlinear optical effect at the regenerator 15 or to the most efficient condition of the polarization for regenerating the optical light at the regenerator 15.

In the regenerating process, the regenerator 15 performs a regeneration utilizing a nonlinear optical effect on the optical signal $\lambda_i$ which has been applied a polarization conversion.

The regenerating system 1 and the method-A have the following functions.

A plurality of optical signals with different wavelength contained in the wavelength division multiplexing light, are changed in polarizing conditions based on the respective wavelengths, after the wavelength division multiplexing light emits from the signal generator of the communication system and transmits through the communication system. Therefore, when a plurality of optical signals with different wavelengths are regenerated as a whole by the regenerator using a nonlinear optical effect, the levels of the regeneration of the optical signal varies in respective wavelengths. This means that one optical signal with a certain wavelength can be excellently regenerated but another light with a different wavelength may not be regenerated.

As such, it is necessary to take into account the following considerations in the regenerating system 1 and the method-A: a polarizing condition of the optical signal has a wavelength dependency, and a level of the regeneration of the optical signal using a nonlinear optical effect is heavily depends on the relationship between a polarizing condition of the optical signal and a polarizing condition of the controlled light or the pump light. Thus, the wavelength division multiplexing light is separated into a plurality of optical signals with different wavelengths and the respective optical signals are treated each other as the independent light. After that, the polarizing condition of the optical signal which needs regeneration performed by the regenerator 15 is changed to the most suitable polarizing condition for the regeneration before entering to the optical light regenerator 15.

In this way, the regenerating process 1 and the method-A can reproduce the optical signal which needs truly the same regeneration as the condition just after emitted from the signal generator, or the condition of the optical signal before degenerated. As a result, the waveform of the wavelength division multiplexing light including the regenerated optical signal can be regenerated in a good condition.

Furthermore, in the regenerating system 1 and the method-A, since the optical signal is regenerated without transforming into an electrical signal, the transmitting capacity is not restricted by electronic devices or the like. Therefore, by using the regenerating system 1 and the method-A, the transmission speed of each wavelength (channel) can be increased to exceed 40 Gbit/s, and hence the number of channels of the wavelength division multiplexing light can be decreased. This results in that the regenerator 1 is constructed from a less number of regenerators 15 than the conventional case, and further downsizing and power saving is possible.

The details of the regenerator 15 will be described below.

Figure 2:
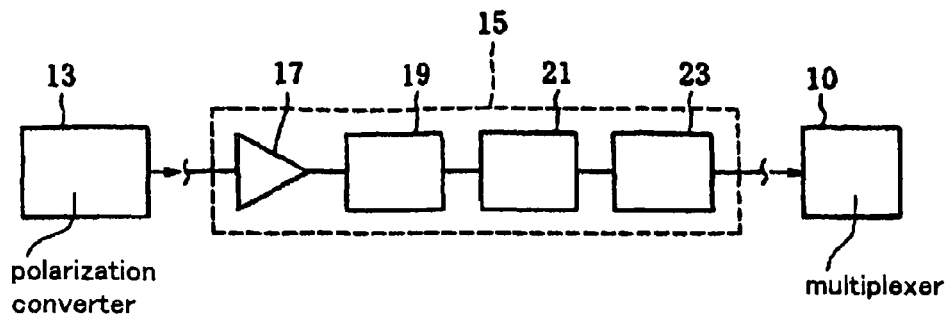
FIG. 2 is a schematic view of a regenerating unit 15 in the regenerating system in FIG. 1.

The regenerator 15 includes an amplifier 17, a waveform reshaping device 19, a clock regenerator 21 and a noise reduction unit 23 as shown in FIG. 2.

Corresponding to the required function of the regenerating system 1, the regenerator 15 consists of at least one selected from a group of an amplifier 17, a waveform reshaping device 19, a clock regenerator 21 and a noise reduction unit 23.

The selected devices process a regeneration utilizing nonlinear effect. Further, an arrangement of the amplifier 17, the waveform reshaping device 19, the clock regenerator 21 and the noise reduction unit 23 is not restricted but flexible so as to be changed as required. For example, the clock regenerator 21 may be placed before the waveform reshaping device 19, In this configuration, the amplifier 17 amplifies the attenuated optical signal, the waveform reshaping device 19 reshapes the waveform of the optical signal, the clock regenerator 21 regenerates the clock of the optical signal, and the noise reduction unit 23 eliminates the noise included in the optical signal.

Further, even if the optical signal is amplified by the amplifier 17 which includes a natural emitting light (non polarized light) as a noise, the noise included in the optical signal can be reduced to one half by passing the polarizer. Namely, a combination of the amplifier 17 and the polarizer can be used as a noise reduction unit 23.

There are several types of amplifier 17 such as an erbium doped fiber type amplifier, a Raman amplifier, a semiconductor amplifier and a parametric amplifier or the like.

In the Raman amplifier, the Raman gain depends on the relative relation of conditions between the incident light and the pumping light. In the regenerating system 1, the polarizing converter 13 converts the optical signal in advance to the suitable condition of polarization to obtain the required Raman gain, so that the Raman amplifier can amplify the optical signal stably.

Similarly to the Raman amplifier, both of the semiconductor amplifier and the parametric amplifier have a polarization dependency in the gain, respectively. In the regenerating system 1, the polarizing converter 13 converts the optical signal in advance to the suitable condition of polarization to obtain the required gain, so that the semiconductor amplifier and the parametric amplifier can amplify the optical signal stably.

In the clock regenerator 21, the XPM or FWM are used as a nonlinear optical effect, for example.

Figure 3:
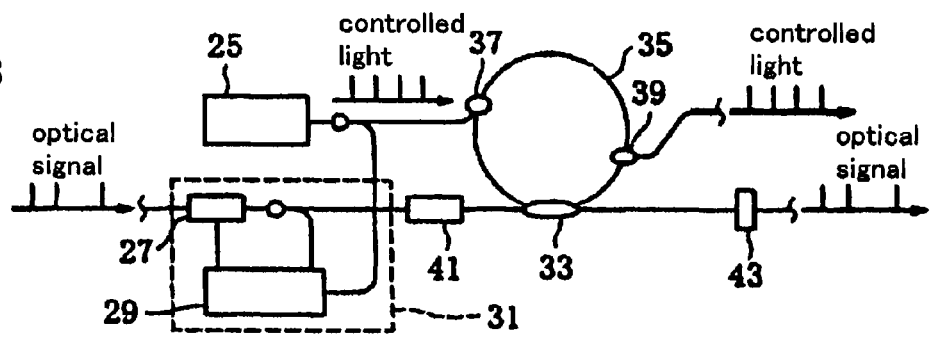
FIG. 3 is a schematic view of a clock regenerator 21 in the regenerating unit 15 in FIG. 2.

As the former (utilizing an XPM) clock regenerator 21, there are some examples as shown in FIG. 3. The clock regenerator 21 comprises: a controlled light generator 25 which emits a controlled light in a pulse shape; a phase synchronizing means 31 which synchronizes a phase of the optical signal with the controlled light by the optical delay means 27 and the control unit 29; a high nonlinear type fiber 35 generating an XPM which is inserted in the optical path via an optical coupler 33 wherein the controlled pulse light and the optical signal transmit; WDM couplers 37, 39 which cause the controlled light to enter the high nonlinear optical fiber 35 or emit from that. Furthermore, it is preferable for the clock regenerator 21 to have an isolator 41 which protect the returning light from the nonlinear type fiber 35 and the optical filter 43.

Figure 4:
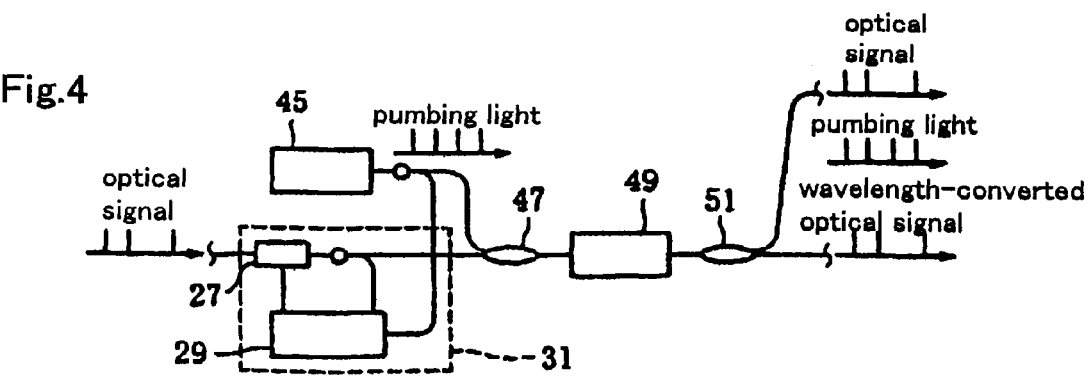
FIG. 4 is a schematic view of another clock regenerator 21 in the regenerating unit 15 in FIG. 2.

As the latter case (using an FWM) clock regenerator 21, one configuration is shown in FIG. 4. The clock regenerator 21 comprises: a pump light emitter 45 which emits a pump light in a pulse shape; a phase synchronizing means 31 which synchronizes a phase of the optical signal with the pump light; a nonlinear optical medium 49 where an FWM is generated when the optical signal and the pump light enters thereto via the multiplexer 47 (a WDM coupler, a 3 dB coupler or the like). In this clock regenerator 21, the optical signal entering to the nonlinear optical medium 49 is outputted along with the light to which a wavelength conversion is implemented by an FMW, so that the optical signal without the wavelength conversion and the pump light are isolated by the optical filter or the WDM coupler 51 from the optical signal with the wavelength converted.

In the clock regenerator 21 as shown in FIG. 3 and FIG. 4, a clock regeneration process for the optical signal is carried out by using an XPM or an FWM in the highly nonlinear fiber 35 or the nonlinear optical medium 49. In this clock regeneration process, when a gain of the nonlinear effect is so small, it is loosing a performance in the clock regeneration for the optical signal. Therefore, it is necessary to maintain a desired relative relation between the conditions of the optical signal and the controlled light or the pump light, and maintain the level of the nonlinear effect as required.

Concretely, if the polarizing condition of the optical signal is in a linear polarization when entering to the clock regenerator 21, the polarizing condition of the optical signal is maintained so that the plane of the polarization of the controlled light or the pump light aligns with the plane of the polarization of the optical signal so as to be in parallel. By this alignment, the clock regenerator 21 can regenerate a clock of the optical signal at a desired level.

In the waveform reshaping device 19, a solution effect, an SPM or an SC is used as a nonlinear optical effect.

Figure 5:
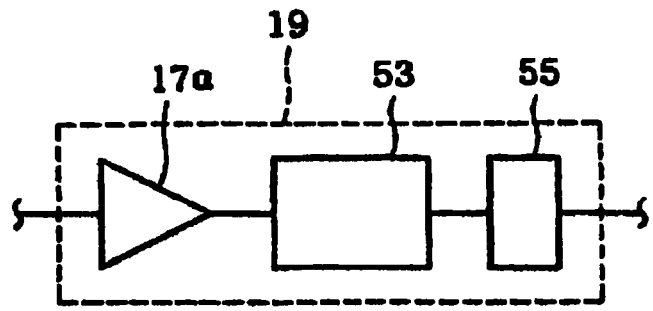
FIG. 5 is a schematic view of a waveform reshaping device 19 in the regenerating unit 15 in FIG. 2.

The former (using a solution effect) type waveform reshaping device 19 comprises, for example as shown in FIG. 5, an amplifier 17a, a nonlinear optical medium 53 and an optical filter (band pass filter) 55. For the nonlinear optical medium 53, a highly nonlinear fiber and a semiconductor element are listed. For example, the amplifier 17a is placed inside the waveform reshaping device 19 as illustrated in FIG. 5. However, in case that the amplifier 17 is placed as shown in FIG. 2 and if the intensity of the optical signal entering to the waveform reshaping device 19 can be increased at a sufficient level by only this amplifier 17, the amplifier 17a is not required to be added. Eventually, the amplifier 17a in the waveform reshaping device 19 may be added only when required.

In the waveform reshaping device 19 shown in FIG. 5, the optical signal with the intensity increased by the amplifier 17a enters into the nonlinear optical medium 53, and a noise component in time region included in the optical signal is eliminated by the solution effect generated in the medium 53, and thus the optical signal waveform is regenerated accordingly.

Figure 6:
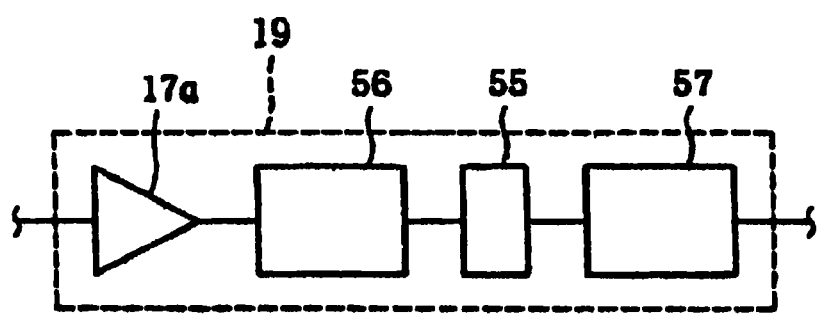
FIG. 6 is a schematic view of another waveform reshaping device 19 in the regenerating unit 15 in FIG. 2.

Shown in FIG. 6 is an example for the latter (using an SPM or an SC) type waveform reshaping device 19. The waveform reshaping device 19 comprises an amplifier 17a, a nonlinear optical medium 56, an optical filter 55 and a waveform converter 57. Similarly, because of the same reason as FIG. 5, the amplifier 17a may be added when required.

In the waveform reshaping device 19 of FIG. 6, the optical signal with the intensity increased by the amplifier 17a enters the nonlinear optical medium 53, and a noise component in time region included in the optical signal is eliminated by the SPM or SC generated in the medium 53, thus the wave band width of only the optical signal with the noise component in time region eliminated is broadened.

The optical signal with bandwidth broadened enters the optical filter 55, and the only optical signal which has a predetermined wavelength can pass through the optical filter 55, thus the reshaping of the waveform of the optical signal is carried out. The optical signal with the waveform reshaped enters the wavelength converter unit 57 and the wavelength is converted therein.

The wavelength conversion by the wavelength converter unit 57 is to cause the bandwidth of the optical signal which emitted from the waveform reshaping device 19 to return to the original bandwidth before broadened by the medium 56. Therefore, if it is not necessary to return the bandwidth back to the original, the wavelength converter unit 57 may not be added.

In the wavelength converter unit 57, as a nonlinear optical effect, an FWM, an XPM, SPM or the like are used. Among these, the application using an FWM or an XPM has a basically identical configuration to the clock regenerator 21 explained above. Consequently, the wavelength converter 57 can be functioned as the clock regenerator 21. Thus in the waveform re-shaping device 19 of FIG. 6, there is no need to place the clock regenerator 21 at the output side.

Furthermore, when the wavelength converter unit 57 adopts an SPM, it may consist of an amplifier, a nonlinear optical fiber and an optical filter.

As described above, the waveform reshaping process by the waveform reshaping device 19 utilizes a nonlinear optical effect such as an SPM, an XPM, an FWM, a solution, or a supercontinuum in the medium 53, 56, 35 and 49. A XPM or an FWM is generated in the waveform reshaping process using an XPM and FWM, by means of entering both of the controlled light or pump light which is emitted from the light generator 25 or 45 and the optical signal light into the same medium 35 and 49.

In the process of the waveform reshaping, it may not reshape well the waveform of the optical signal when the gain of the nonlinear optical effect is too large or too small. Therefore, it is necessary to maintain the predetermined relative relations between the polarization condition of the optical signal and the controlled light or the pump light and maintain the level of the nonlinear effect to the required level.

The noise reduction unit 23, like the waveform reshaping device 19, may be constructed by a nonlinear optical medium and an optical filter. The noise reduction unit 23 separates a signal component from the noise component after the wave bandwidth of the signal component is broadened, using a nonlinear optical effect such as an SPM or an SC.

For the generator of the controlled light or the pump light used in the waveform reshaping device 19, the clock regenerator 21 and the noise reduction unit 23, it is preferable to use one from a group of a light pulse source using a comb like dispersion arrangement (comb like dispersion profile), a light pulse source compressed by a fiber type compressor unit, a super continuum light source, a solution pulse light source and a fiber ring laser. This is because, the light source can generate a high repetitive pulse with narrow time width of the pulse, and further the pulse time width and repetitive pulse pattern can be optimally set, considering the frequency of the optical signal or the like.

Figure 7:
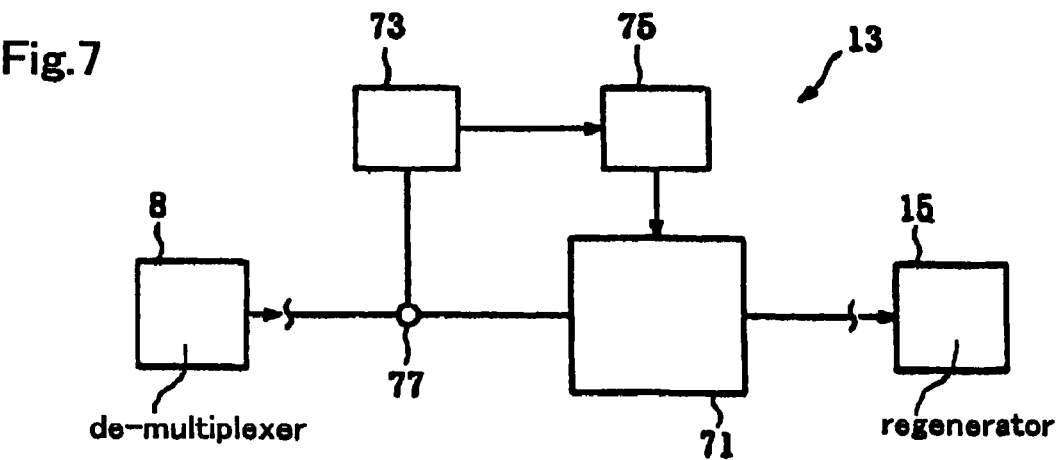
FIG. 7 is a schematic view of a polarization converter 13 in the regenerating system in FIG. 1.

Referring to FIG. 7, the polarizing converter 13 will be detailed.

The polarizing converter 13 is expected to perform a polarizing conversion from an arbitrary polarizing condition into a desired polarizing condition as described above. Such a polarizing converter 13 has at least a polarization conversion unit 71 which process a polarization conversion on the incident light (optical signal) and obtain the desired polarizing conditions.

Concretely, if the controlled light or the pump light is in a linear polarization, the condition of the optical signal is controlled by the polarizing converter 13 so that it becomes a linear polarization and aligns its polarization plane with the controlled light or the pump light so as to be in parallel.

Figure 8:
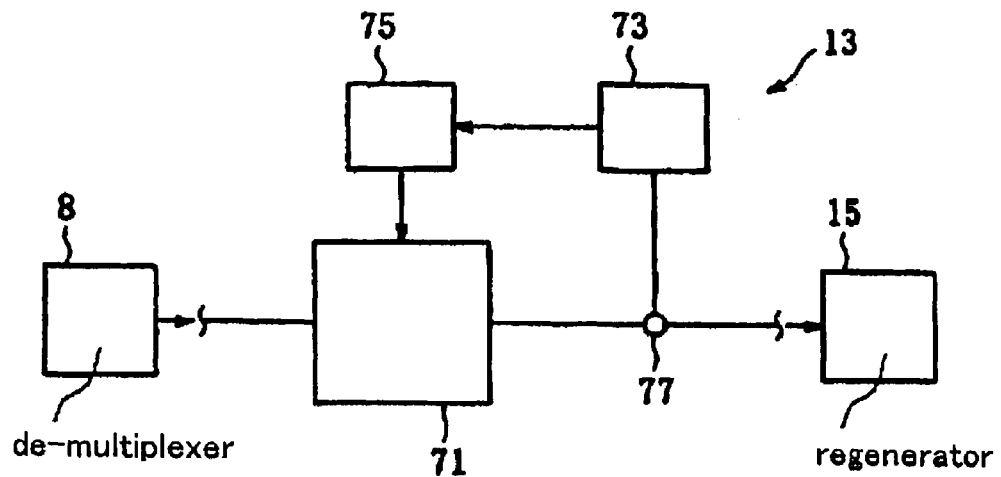
FIG. 8 is a schematic view of another polarization converter 13 in the regenerating system in FIG. 1.

The polarizing converter 13 senses the polarization condition of the optical signal entering the polarization conversion unit 71 and performs a feed-forward control of the polarization conversion unit 71 based on the sensing output as illustrated in FIG. 7. Alternatively, the polarizing converter 13 senses the polarization condition of the optical signal exiting the polarization conversion unit 71 and performs a feed-back control of the polarization conversion unit 71 based on the sensing output as illustrated in FIG. 8. Therefore, the polarizing converter 13 is preferably equipped with the sensing unit 73 and the control unit 75 as shown in FIGS. 7 and 8, because the optical signal is surely polarization-converted to the desired polarization condition.

Concretely, as a sensing unit 73, a polarization analyzer which senses both of the polarization condition and the intensity, or a power meter which senses only the intensity of the optical signal after divided by the optical divider 77 are listed. The control unit may be constructed by a computer unit or the like.

Figure 9:
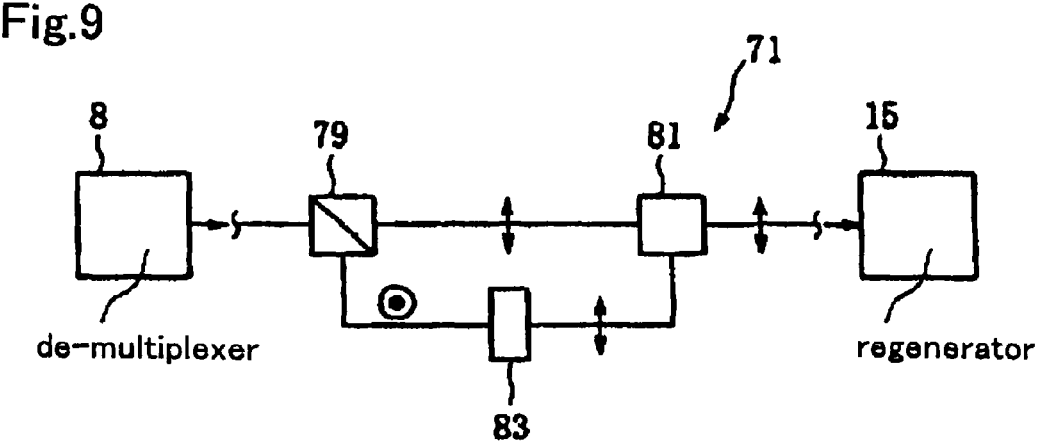
FIG. 9 is a schematic view of different polarization converter 13 in the regenerating system in FIG. 1.

Next, referring to FIG. 9, there is shown one embodiment of the polarizing converter which converts the incident optical signal to a linear polarization light, in which neither a sensing unit nor a control unit is included.

The polarization conversion unit 71 comprises a polarization splitter 79 which splits the input optical signal into two polarized lights in which the polarization planes are crossing at right angle each other and a multiplexer 81 which mixes the two polarized lights. Two light paths extend between the polarization splitter 79 and the multiplexer 81, and a λ/2 wavelength plate 83 is inserted in only one optical path.

When the optical signal enters the polarization conversion unit 71, one from polarized lights split by the polarization splitter 79 enters the multiplexer 81 while the polarized plane is kept parallel to the plane of the paper as illustrated by an arrow. Another polarized light which has a polarized plane in perpendicular to the surface of the paper is rotated by 90° after passing through the λ/2 wavelength plate 83, then enters the multiplexer 81. Consequently, at the time when it enters the multiplexer 81, both polarized planes of the polarized lights are in the same direction after transmitting in the two separate paths, and hence the optical signal mixed from the two polarized lights by the multiplexer 81 is always made to a linear polarized light.

Figure 10:
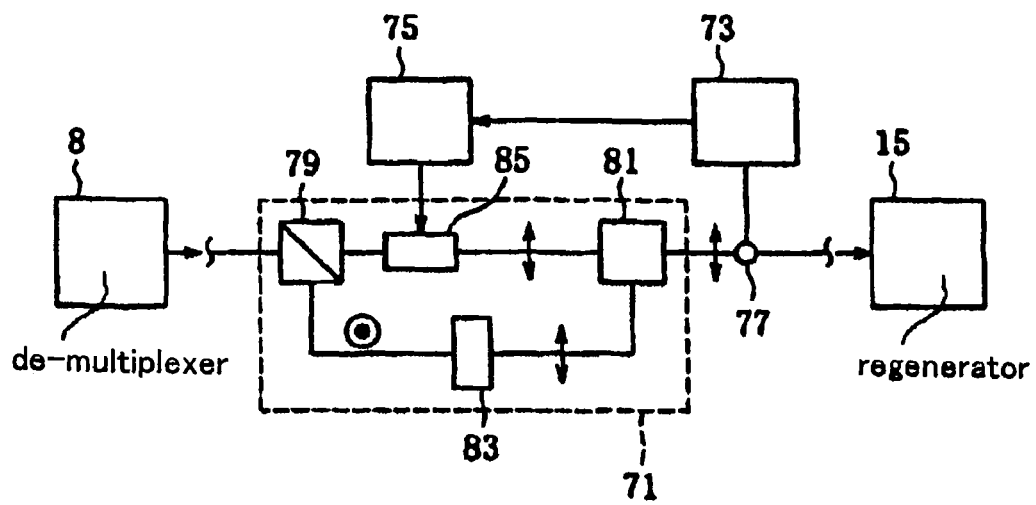
FIG. 10 is a schematic view of one embodiment of the polarization converter 13 in FIG. 7.

FIG. 10 shows the polarizing converter which converts the incident optical signal to a linear polarized light, and comprises a sensing unit 73 and a control unit 75 which are used to control the polarization conversion unit 71 by a feedback control.

The polarization conversion unit 71 comprises a polarization splitter 79 which splits the incident optical signal into two polarized lights in which the polarization planes are in perpendicular to each other, and a multiplexer 81 which mixes the two polarized lights. The two light paths extend between the polarization splitter 79 and the multiplexer 81, and a λ/2 wavelength plate 83 is inserted in one of the optical paths, while an optical delaying means 85 which allows to vary the optical path length is inserted in the other path.

Furthermore an optical light distributor 77, which splits the incident optical signal into two lights at predetermined ratio of the intensity, is placed at the output side of the multiplexer 81. Further, a power meter to receive and measure the intensity of the optical signal is placed as a sensing unit 73 at another output side of the optical light distributor 77. The control unit 75 consisting of a computer or the like is electrically connected to the sensing unit 73 in order to control the intensity of the optical signal based on the sensing result by the sensing unit 73. On the hand, the control unit 75 is electrically connected to the optical delaying means 85 as well so that the sensing results inputted from the sensing unit 73, that is the intensity of the optical signal by the sensing unit 73, is maximized by adjusting the optical path of another path by the optical delaying means 85.

Figure 11:
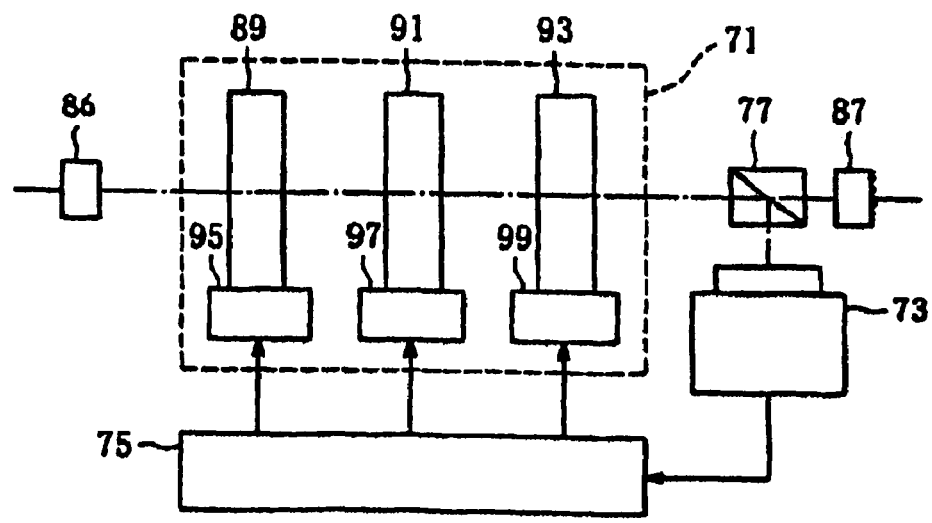
FIG. 11 is a schematic view of another embodiment the polarization converter 13 in FIG. 7.
Figure 12:
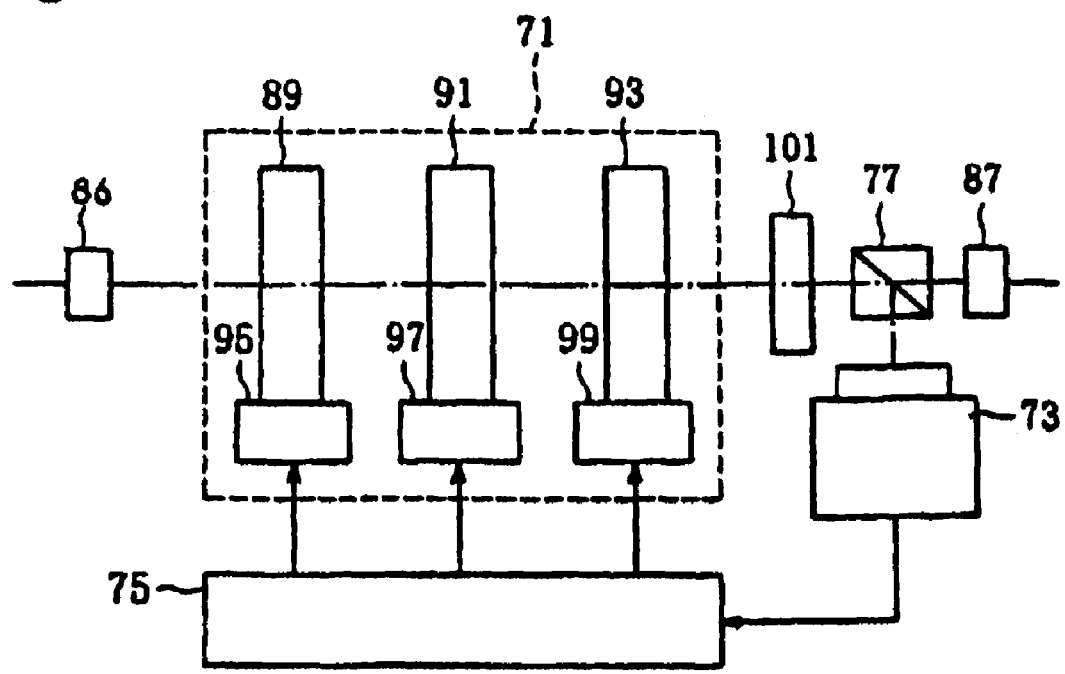
FIG. 12 is a schematic view of a different embodiment of the polarization converter 13 in FIG. 7.

Furthermore, FIG. 11 shows a polarization conversion unit which converts the input optical signal to an arbitrary polarized signal light including a linear polarization light, and includes the optical light distributor 77, the sensing unit 73 and the control unit 75 which are needed to feedback control the polarization conversion unit 71.

The polarization conversion unit 71 of the polarization converter comprises: a $\lambda/4$ wavelength plate 89, a $\lambda/2$ wavelength plate 91 and a $\lambda/4$ wavelength plate 93 which are arranged in this sequence on the line extending from the collimator 86 to the collimator 87; and a rotating means 95, 97, 99 which are attached to each of the wavelength plates and which rotate them around each axis of the optical axis of the wavelength plate. Namely, in this polarization conversion unit 71, the delaying phase axis and the lead phase axis of the wavelength plate 89, 91, 93 in the polarization condition of the optical signal can be adjusted by rotating each of the wavelength plates 89, 91, 93 with the rotating means 95, 97, 99.

The sensing unit 73 consists of a polarizer analyzer which is capable of obtaining one of polarization conditions, for example, a stokes parameter of the optical signal, and a control unit 75 controls the rotation angle of each rotating means 95, 97, 99 so that the stokes parameter becomes a desired value. Consequently, by using the polarization converter as shown in FIG. 11, the optical light which has an arbitrary polarization condition can be converted to the desired polarization condition.

In the polarization converter as shown in FIG. 11, when the polarization conversion unit 71 converts the optical signal to a linear polarization light, it is preferable to place a linear polarizer 101 at an output side of the conversion unit 71, and for the sensing unit 75, a power meter to measure the intensity of the optical signal is preferably used.

The reason is that, when the optical signal $\lambda_1$ passes a linear polarizer 101, the level of polarizing is enhanced so that the output of regeneration by the regenerator 15 can be further stabilized. In addition, as described later, when the optical amplifier 105 is placed at the input side (refer to FIG. 13) of the polarizing converter 13, the noise amplified by the optical amplifier 105, that is a spontaneous emission light in non-polarized which is added to the optical signal $\lambda_1$, is eliminated so that a signal-noise ratio of the optical signal $\lambda_1$ can be increased.

The polarization conversion unit 71 may be constructed by using at least one birefringence material arranged in place of the wavelength plates 89, 91, 93. In this case, the birefringence material is controlled by the control unit 75 so that the optical power of the optical signal after passing through the polarizer 101 is maximized at the sensing unit 73. Furthermore, it is preferable to use a polarization maintaining waveguide 12a (refer to FIG. 1) between the polarizer 101 and the regenerator 15 (refer to FIG. 1), which can maintain the polarization condition. The primary axis of the polarizer 101 is adjusted so as to be able to maintain the polarization condition in the polarization maintaining waveguide 12a.

When using the polarizing converter with the polarizer 101 equipped, a fluctuation of the control appears as a variation of the output light intensity. In contrast, it is also possible to make an incident angle at which the polarization condition can be maintained in the polarization maintaining waveguide 12a without using the polarizer 101. In this case, the fluctuation of the control appears as an increase of the extinction ratio. Namely, the polarizing converter using the polarizer 101 is effective in the nonlinear signal processing in the case that a tolerance of the optical power variation is allowed to be larger than a tolerance of the variation of the extinction ratio.

Figure 13:
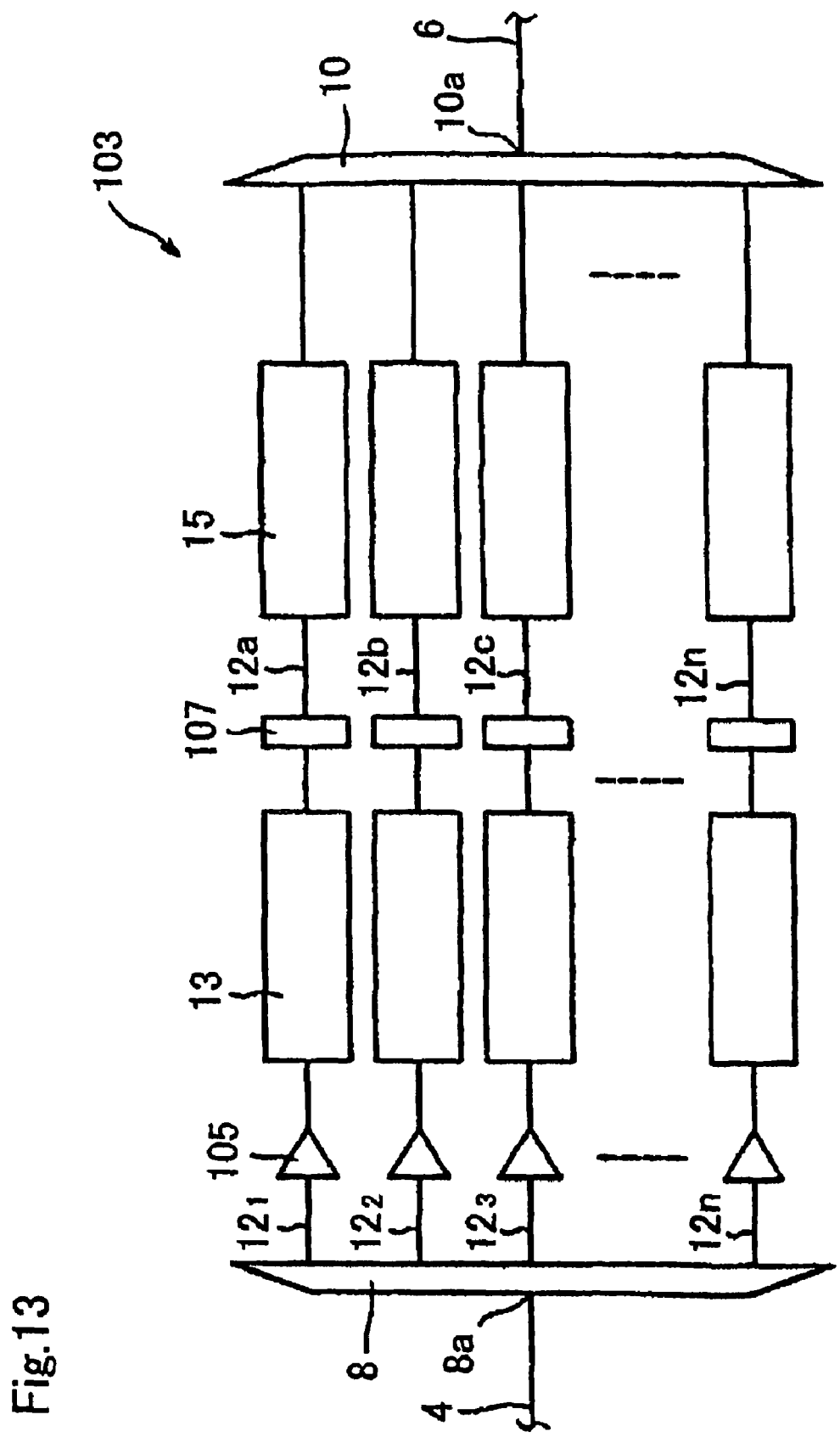
FIG. 13 is a schematic view of a second embodiment of the wavelength division multiplexing optical regeneration system in accordance with the present invention.

FIG. 13 shows a second embodiment of the wavelength division multiplexing optical regeneration system 103 (hereinafter, called a regenerating system 103) in accordance with the present invention.

The regenerating system 103 is the identical configuration to the regenerating system 1 except that: an optical amplifier 105 is inserted in the optical paths $12_1$, $12_2$, $12_3$, ... $12_n$, extending from the demultiplexer 8 to the polarizing converter 13; and a variable dispersion compensator 107 is inserted in the polarization maintaining waveguide 12a, 12b, 12c ... 12n extending from the polarizing converter 13 to the optical signal regenerating system 1 (refer to FIG. 1).

The optical amplifier 105 is placed between the demultiplexer 8 and the polarizing converter 13 and receives the optical signals $\lambda_1$, $\lambda_2$, $\lambda_3$, $\lambda_n$ transmitted in the optical paths $12_1$, $12_2$, $12_3$, ... $12_n$ from the demultiplexer 8. The optical amplifier 105 amplifies the optical signals $\lambda_1$, $\lambda_2$, $\lambda_3$, ... $\lambda_n$ to be at predetermined intensity and sends out to the optical paths $12_1$, $12_2$, $12_3$, ... $12_n$.

Namely, the optical amplifier 105 amplifies the incident optical signals $\lambda_1$, $\lambda_2$, $\lambda_3$, ... $\lambda_n$ as required and sends out. By this means, even if the intensity of the optical signals $\lambda_1$, $\lambda_2$, $\lambda_3$, ... $\lambda_n$ after transmitting through the wavelength division multiplexing optical regeneration system is largely attenuated, it is possible to recover and compensate for the attenuation.

However, the position for the optical amplifier 105 is not limited to the position between the demultiplexer 8 and the polarizing converter 13, but also any position between the demultiplexer 8 and the regenerator 15 is acceptable. Alternatively, it is acceptable to place the optical amplifier 105 at the side of the input port 8a of the demultiplexer 8 and amplifies the optical signals $\lambda_1$, $\lambda_2$, $\lambda_3$, ... $\lambda_n$ which are in the condition as involved in the wavelength division multiplexing light.

The gain of optical signal amplification of the optical amplifier 105 may be controlled by feedback or feed-forward signal from the sensing unit and the control unit in the polarizing converter 13.

The variable dispersion compensator 107 is placed between the polarizing converter 13 and the regenerator 15, and the optical signals $\lambda_1$, $\lambda_2$, $\lambda_3$, ... $\lambda_n$ emitted out from the polarizing converter 13 transmit in the polarization maintaining waveguide 12a, 12b, 12c ... 12n and enter the variable dispersion compensator 107. The variable dispersion compensator 107 compensates the accumulated waveform distortion of the optical signal caused by a wavelength dispersion through transmitting in the optical path, and then sends out to the polarization maintaining waveguide 12a, 12b, 12c ... 12n.

Note that, the position for the variable dispersion compensator 107 is not limited to the specific position, so that the position between the polarizing converter 13 and the regenerator 15, between the demultiplexer 8 and the optical amplifier 105, between the optical amplifier 105 and the polarizing converter 13, or between the regenerator 15 and the demultiplexer 8 is acceptable.

Figure 14:
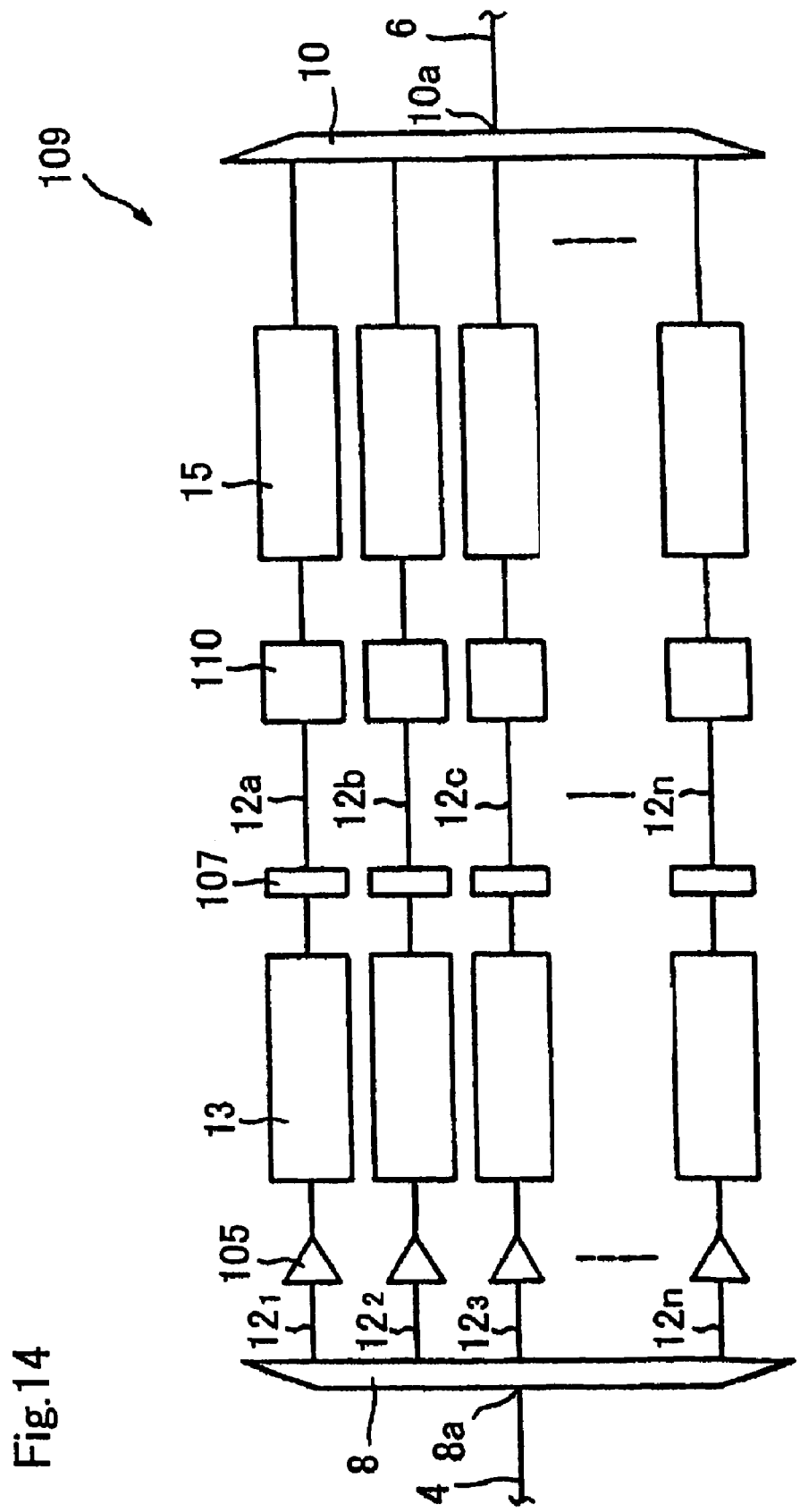
FIG. 14 is a schematic view of a third embodiment of the wavelength division multiplexing optical regeneration system.

FIG. 14 is a schematic view of the third embodiment of the wavelength division multiplexing optical regeneration system 109 (hereinafter, called a regenerating system 109) in accordance with the present invention.

The regenerating system 109 is the identical configuration to the regenerating system 103 shown in FIG. 13 except that the polarization mode dispersion compensator 110 is inserted in the polarization maintaining waveguide 12a, 12b, 12c ... 12n extending from the variable dispersion compensator 107 to the regenerating system 15.

This polarization mode dispersion compensator 110 is a device to compensate the polarization mode dispersion which is a phenomenon that the birefringency existing randomly and locally in the transmitting path makes the difference in the transition speed among polarization mode to make a distortion in the time waveform of the optical signal.

Consequently, by this regenerating system 109, a distortion of the waveform by the polarization mode dispersion in the transmitting path can be compensated so that the transmission distance of the optical signal or the wavelength division multiplexing light after sent out from the regenerating system 109 can be further extended.

Figure 15:
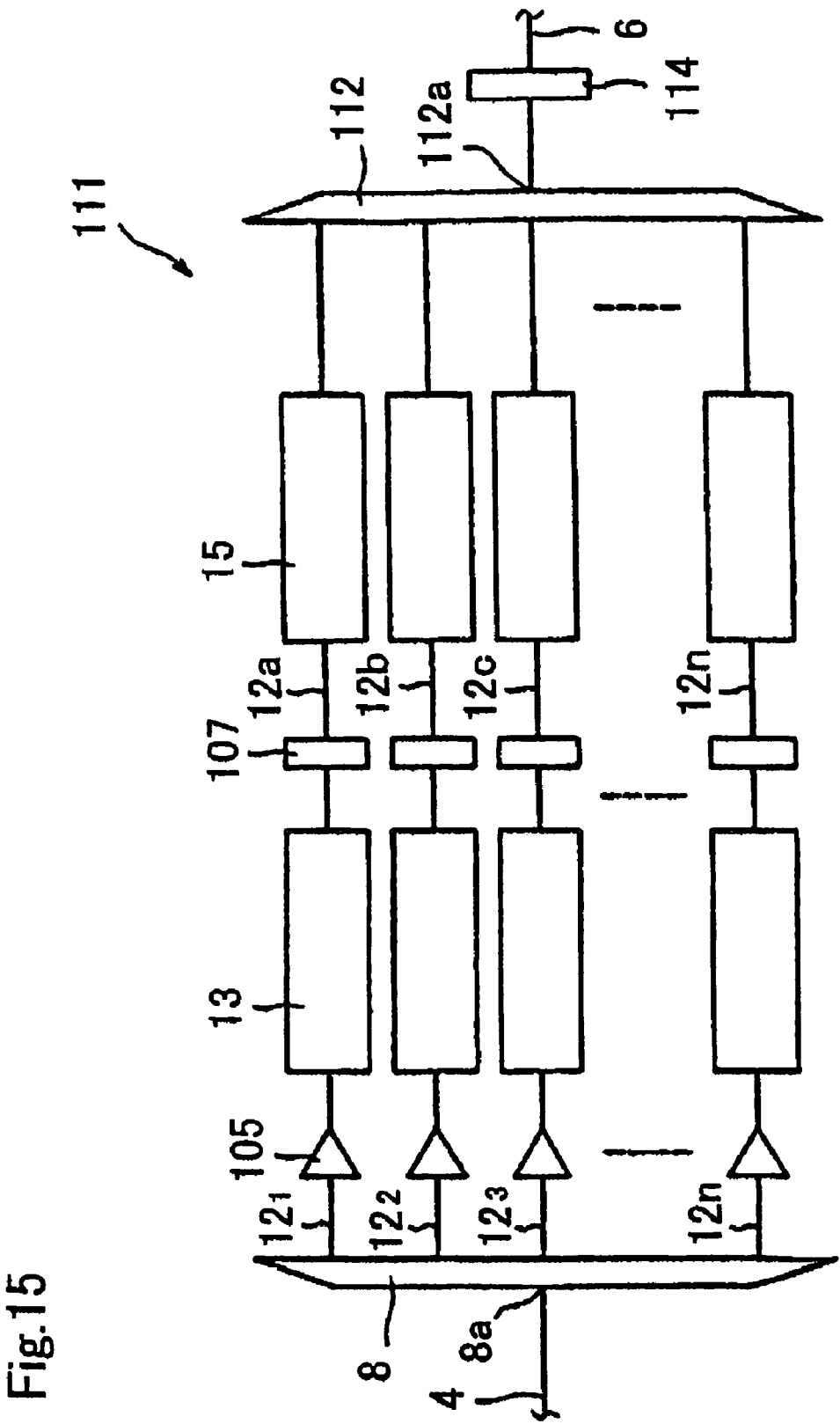
FIG. 15 is a schematic view of a fourth embodiment of the wavelength division multiplexing light regenerating system.

FIG. 15 shows a fourth embodiment of the wavelength division multiplexing light regenerating system 111 (hereinafter, called a regenerating system 111) in accordance with the present invention.

The regenerating system 111 is different from the regenerating system 103 in that the multiplexer is an interleaver 112 which has a polarizing interleaver function, and in addition, the polarizing converter 114 is placed at an output side of the polarizing interleaver 112 to convert the polarizing condition of the wavelength division multiplexing light sent out from the polarizing interleaver 112.

The polarizing interleaver 112 has an interleave function to mix the optical signals in the condition of polarization in such manner that each of neighboring optical signals in wavelength crosses at right angle, when mixing a plurality of the optical signals of different wavelength $\lambda_1, \lambda_2, \lambda_3, \ldots \lambda_n$.

Therefore, when the wavelength division multiplexing light after mixed by the polarizing interleaver 112 transmits in the same optical path, it is possible to suppress a degeneration of the optical signal caused by the interaction between the neighboring lights in wavelength i.e., neighboring channels.

The polarizing converter 114 performs a polarizing conversion on the wavelength division multiplexing lights sent out from the output port 112a of the polarizing interleaver 112 so that the effect of the polarizing mode dispersion on the wavelength division multiplexing lights is minimized in the optical path (optical fiber 6) extending between the polarizing converter 114 and the next wavelength division multiplexing regeneration system, or the receiver.

Therefore, according to the regenerating system 111, it is possible not only to regenerate the incident light of the wavelength division multiplexing light entering to the regenerating system 111, but also to adjust the condition of the wavelength division multiplexing light being suitable in the polarizing condition for the transmitting optical path after sent out from the regenerating system 111. For example, the regenerating system 111 can suppress a degeneration of the wavelength division multiplexing light until reaching to the next wavelength division multiplexing regenerating system or the receiver unit.

In this regenerating system 111, the optical amplifier 105 is not inserted between the demultiplexer 8 and the polarizing converter 13, but inserted in the polarization maintaining waveguide 12a, 12b, 12c ... 12n extending from the polarizing converter 13 to the regenerator 15, and the regenerating system 111 controls the optical amplifier 105 by the feed-forwarding based on the intensity of the optical signals $\lambda_1, \lambda_2, \lambda_3, \ldots \lambda_n$ detected by the sensor of the polarizing converter 13.

In this configuration, the intensity of the incident optical signals $\lambda_1, \lambda_2, \lambda_3, \ldots \lambda_n$ to the regenerator 15 can be maintained constant, and consequently the regeneration of the optical signals $\lambda_1, \lambda_2, \lambda_3, \ldots \lambda_n$ by the regenerator 15 can be further stabilized.

Figure 16:
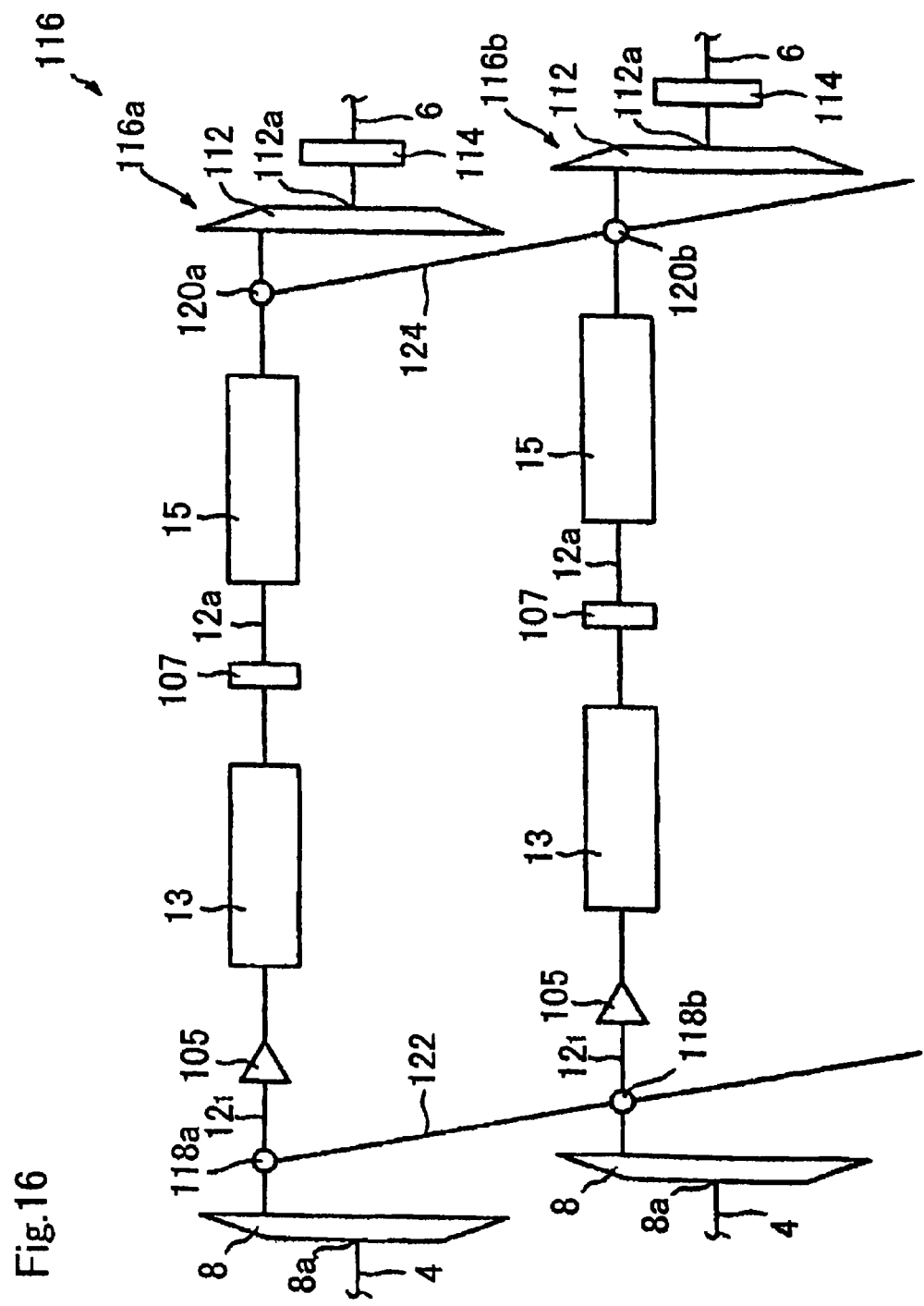
FIG. 16 is a schematic view of a fifth embodiment of the wavelength division multiplexing optical regeneration system.

FIG. 16 shows a fifth embodiment of the wavelength division multiplexing optical regeneration system 116 (hereinafter, called a regenerating system 116) in accordance with the present invention.

This regenerating system 116 includes a plurality of subsystems 116a, 116b, ... which are connected each other.

The subsystems 116a, 116b, ... are the identical configuration to the regenerating system 111 except that: an optical switch 118a, 118b, ... and an optical switch 120a, 120b, ... are connected closely to both ends of the optical paths $12_1$ that is the side of the demultiplexer 8 and the multiplexer 112, respectively. In FIG. 16, in order to avoid complexity of lines, it is omitted to draw optical paths $12_2, 12_3, \ldots 12_n$, in each subsystem 116a, 116b, ....

In the regenerating system 116 as illustrated in FIG. 16, the optical switches 118a and 118b are connected through optical path 122 and the optical switches 120a and 120b are connected through an optical path 124.

As a result, the regenerating subsystems 116a, 116b, ... can process a regenerating on not only the optical signal which is demultiplexed light at own demultiplexer 8 itself, but also the optical signals which are transmitted from other point of the wavelength division multiplexing optical communication systems, because at least one optical switch is inserted in the optical paths $12_1$ or the polarization maintaining waveguide 12a.

By connecting each subsystem 116a, 116b, ... via the optical paths 122 and 124, the regenerating subsystems 116 can work as a router in the whole system.

Furthermore, the optical switches 118a, 118b, ... or the optical switches 120a, 120b are preferable to be a semiconductor switch. This is because, it can avoid larger dimensions of the regenerating systems 116 and increase the switching speed to switch the optical path between the subsystems 116a, 116b, ....

More specifically, the semiconductor switch is an optical switch which is made from a semiconductor material by applying a micro machining technology such as an anisotropic etching or a sacrificing etching, and it is one of Micro-Electro-Mechanical-Systems (hereinafter, called MEMS).

The present invention is not limited to the embodiments described above, but it is possible to change the configuration. For example, the regenerator 15 in FIG. 2 may be fabricated on a semiconductor substrate as an integrated circuit, and thus the regenerator 15 can be integrated into one package with further miniaturized.

In the regenerator 15, since a waveform re-shaping unit, the noise suppression unit and the clock regenerator have the same function when utilizing nonlinear effect, one or two of these can be omitted to decrease the number of components of the regenerator 15.

The details of the regenerator of the present invention will be further detailed below (refer to FIG. 1).

Figure 17:
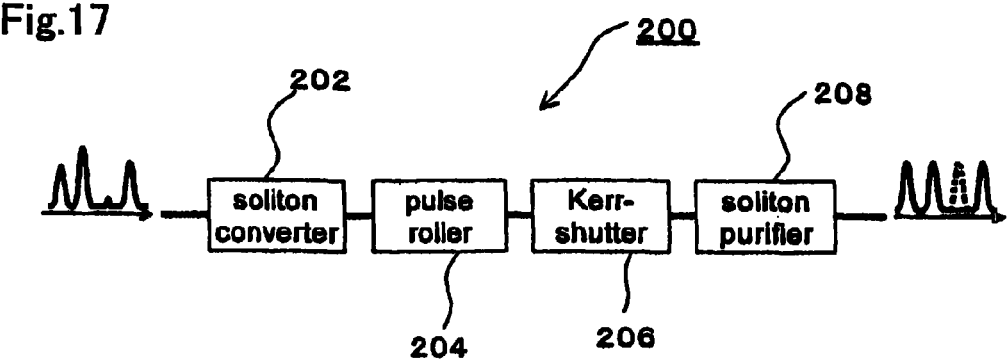
FIG. 17 shows one configuration of the regenerator in accordance with the present invention.
Figure 44:
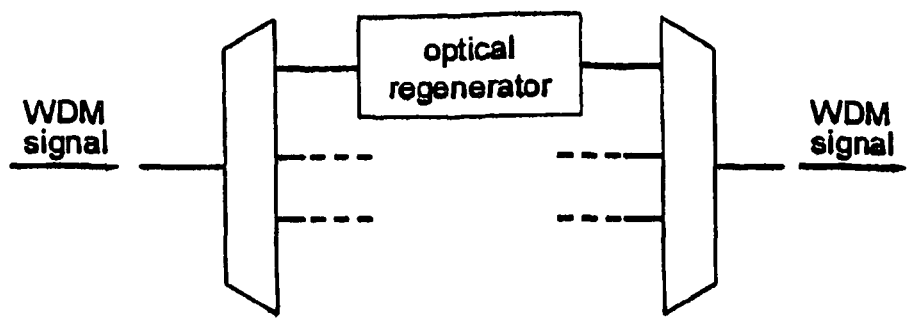
FIG. 44 shows another configuration of the regenerator in accordance with the present invention.

FIG. 17 is a conceptional view to show one embodiment of the regenerator 200 in accordance with the present invention. The regenerator 200 consists of a solution converter 202, a pulse roller 204, a Kerr-shutter 206 and a solution purifier 208 which are arranged in this sequence. As a regenerator system 1, the polarizing converter 13 is preferably arranged to be placed before the regenerator 200 as illustrated in FIG. 1, but as far as the polarization wave is maintained, the system configuration without using the polarizing converter 13 may be acceptable as shown in FIG. 44.

Figure 45:
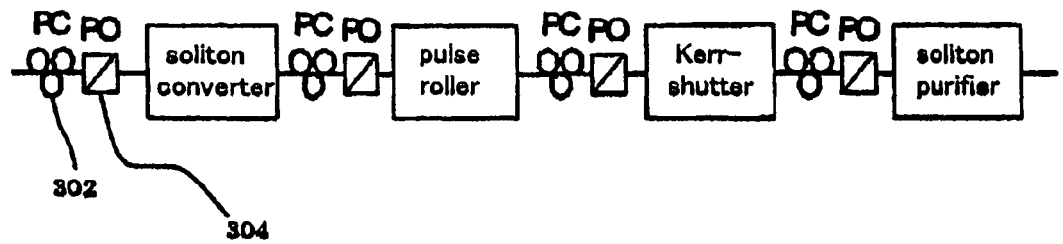
FIG. 45 shows still another configuration of the regenerator in accordance with the present invention.
Figure 46:
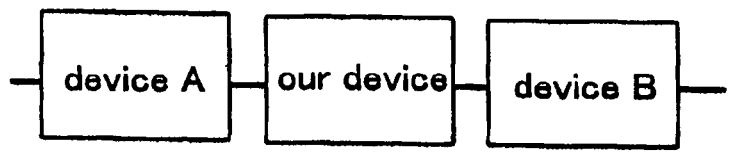
FIG. 46 shows one configuration of the regenerating system using the regenerator in accordance with the present invention.

At first, the waveform of the optical signal 210 which has been degenerated while transmitting is reshaped and the residue of the chirping is eliminated by the solution converter 202. Then, the optical signal is sent to the pulse roller 204, where the reshaped optical signal is transformed to a rectangular waveform as suitable to next stage of the Kerr-shutter 206. After the preprocessing as described above, using the Kerr-shutter 206, the waveform of the optical signal is reshaped and also the clock time is regenerated. Finally, in order to improve the quality of the regenerated light, the components excluding a solution, for example, a spontaneous emission light generated when amplifying an optical light can be eliminated by the solution purifier 208. Since the function of each component in the regenerator 200 follows its nonlinear optical characteristic, it generally shows a polarization dependency. Therefore it is preferable to place the polarizing controller 302 and the polarizer 304 at the input side of each component 202, 204, 206, 208 as required, as shown in FIG. 45. But if the change of polarization condition in the regenerator 200 is so small, those are not required. As illustrated in FIG. 46, it may be acceptable to construct a system using at least one of the components 202, 204, 206, 208 in the regenerator 200. For example, it can be constructed using a device A, a solution converter which is disposed as our device, and device B as illustrated in FIG. 46. Based on the purpose, the our device may be selected appropriately from the component 202, 204, 206, 208 described above, and the corresponding device A and device B are disposed.

Each component 202, 204, 206, 208 in the regenerator 200 will be described below.

The first stage of the regenerator 200 is a solution converter 202. The related technology to a solution converter are reported in Dany et al., Opt. Lett., 25, p. 793, 2000 or Matsumoto et al., IEEE, Photon, Technol, Lett., 14, p. 319, 2002.

Figure 18:
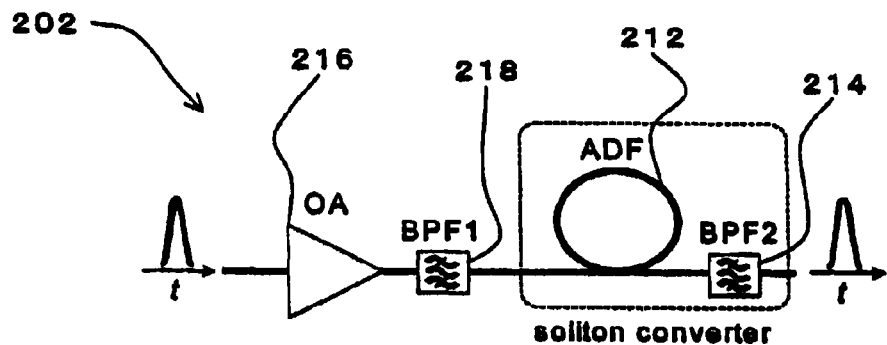
FIG. 18 shows one configuration of the solution converter in FIG. 17.

FIG. 18 shows one embodiment of the solution converter 202. The solution converter 202 comprises an anomalous dispersion fiber (ADF) 212 and an optical band pass filter (BPF) 214. The incident optical signal is converted to a solution like pulse train by the interaction between the anomalous dispersion effect and the nonlinear effect along with transmission of the anomalous dispersion fiber. Furthermore, by passing the optical filter 214, an optical limiter function works and a noise reduction is also carried out. If the input optical power for the ADF 212 is insufficient to generate a solution effect, the optical amplifier 216 and the optical filter 218 which eliminates the spontaneous emission light may be placed in a stage before the ADF 212 as shown in FIG. 18.

In the configuration of the solution converter 202 as shown in FIG. 18, an input noise amplification by a solution effect during a solution transmission occasionally causes a problem. (Kubota et al., J. Opt. Soc. Am, B. 16, p. 2223, 1999). The reason is that an amplitude/phase noise is amplified by a parametric gain generated by the interaction between the anomalous dispersion effect and the nonlinear effect during a solution transmission with a noise included.

To suppress this, it is preferable to shorten the fiber length of ADF 212 in the solution converter 202. When the ADF 212 fiber length is shortened, the distance in which a noise and a solution transmit is decreased, and this directly works for suppressing the interaction. Therefore, the shortening of the ADF 212 length is effective for the reduction of the noise amplification with the reshaping of the waveform. Further, details of the fiber length of the ADF 212 will be described later.

Figure 20A:
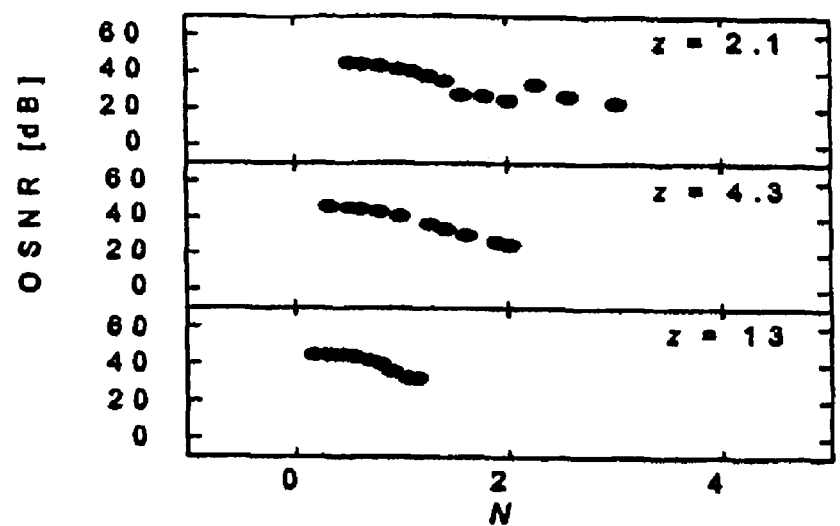
FIG. 20A is a graph showing an optical signal noise ratio OSNR of the output pulse from the solution converter.
Figure 20B:
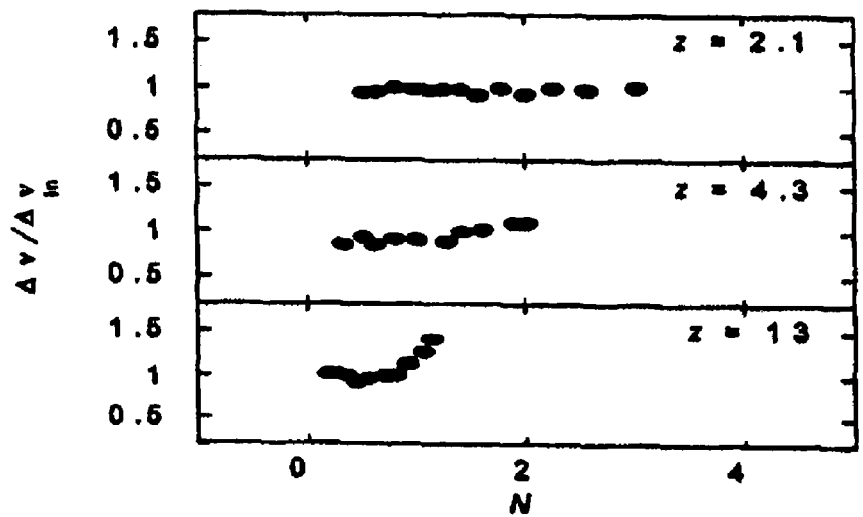
FIG. 20B is a graph showing a solution order number N dependency of the spectrum line width increasing ratio $\Delta \upsilon / \Delta \upsilon_{in}$.

On the contrary, the nonlinear effect is essential to realize a complete reshaping of the waveform. The solution converter 202 needs a certain fiber length which is a minimum length (nonlinear length) to generate nonlinear effect. The published paper (Deny et al., Opt. Lett., 25, p. 793, 2000) discloses that a solution converter needs a certain fiber length exceeding a solution frequency $Z_0$. $Z_0$ is given by the following equation:

$$z_0 = \frac{\pi}{2} \frac{T_o^2}{|\beta_2|} \quad \text{[Equation 1]}$$

wherein $T_0$ is a full-width at half maximum of the point where the intensity is a 1/e of the peak value of the input pulse, and $\beta_2$ is a dispersion value of a solution converter. In order to demonstrate experimentally the fiber length dependency of the performance of the solution converter 202, an optical signal noise ratio (OSNR) of the output pulse from the solution converter and a dependency of the input power $P_{in}$ at maximized spectrum width using three different types of fiber length normalized by the solution frequency were measured. The results are shown in FIG. 20A and FIG. 20B. The solution order N is on the horizontal axis. N is a square root of the normalized $P_{in}$ value carried by a basic solution excitation power and it is given by the following equation:

$$N = \frac{\gamma P_0 T_0^2}{|\beta_2|} \quad \text{[Equation 2]}$$

wherein $\gamma$ is a fiber nonlinear coefficient.

As indicated in FIG. 20A and FIG. 20B, the OSNR degenerates as N is increasing in all the solution converter independently of the normalized fiber length: z. However, when ADF 212 fiber length is at around second order of the solution frequency, its degeneration is small. Also it is indicated that it is not only this solution converter that increases the spectrum width ($\Delta\upsilon/\Delta\upsilon_{in}$). From the above experimental result, the solution converter whose normalized fiber length: z is less than 2, is effective to suppress the noise amplification. When z=2 or less, the relation between N and OSNR or the relation between N and $\Delta\upsilon/\Delta\upsilon_{in}$ shows the same result as shown in the upper side of FIG. 20A and FIG. 20B, so that it is not illustrated in the figures.

As the solution converter 202 is placed at the first stage of the regenerator 200, the input pulse may have a chirping by the residue of the dispersion. The optical signal has a problem that the pulse width is broadened when converted into a pulse if it has a chirping. Therefore, in the solution converter 202, the performance to a chirping included in the input pulse becomes important.

Figure 21:
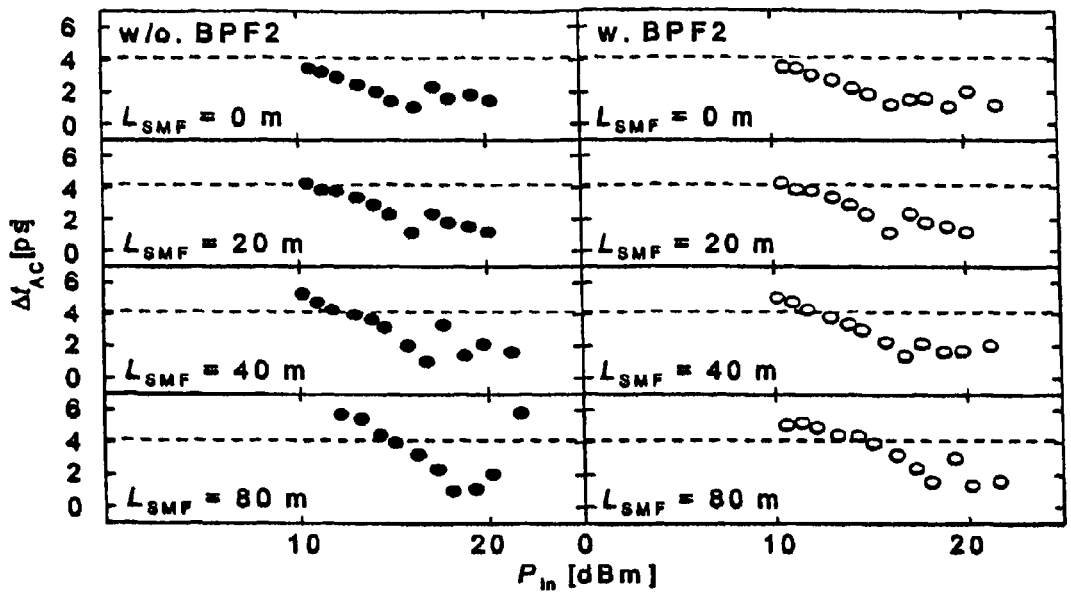
FIG. 21 shows a dependency of the output pulse self correlation wave width $\Delta t_{AC}$ on the input power $P_{in}$. The left side of the graph is an output pulse self correlation wave width $\Delta t_{AC}$ before the output optical filter, and the right side is after the output optical filter.

To investigate this, the pulse having (before the solution converter) a chirping added during a transmission in the single mode fiber (SMF) is inputted to the solution converter 202 and the output pulse waveform is measured. The self correlation waveform width dependency on the input power $P_{in}$ is shown in FIG. 21. The left side in FIG. 21 shows a pulse width before the output optical filter and the right side in FIG. 21 shows a pulse width after the output optical filter.

Figure 22:
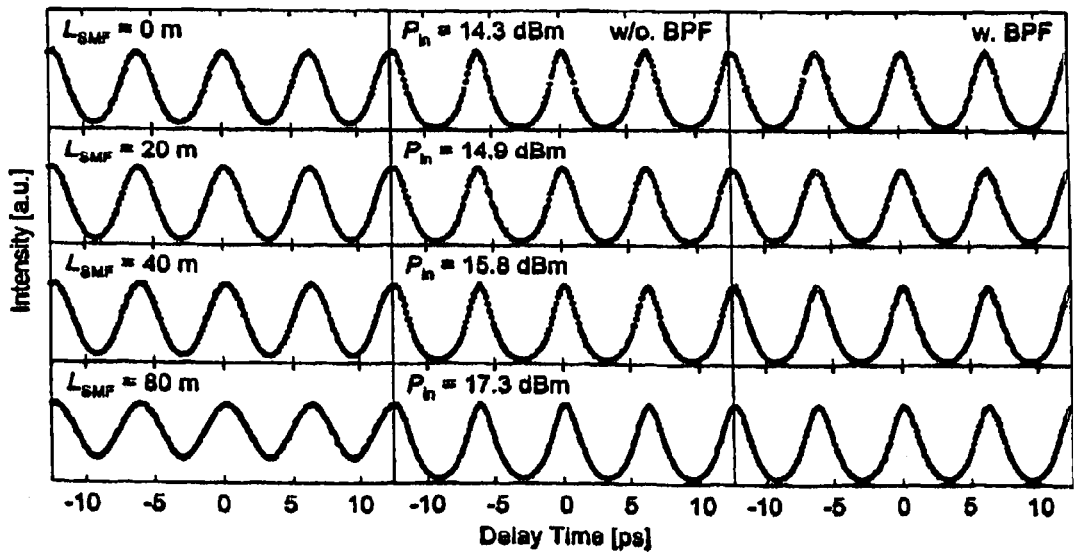
FIG. 22 left side shows a pulse for the length of 0, 20, 40 and 80 meter after SMF transmission. The middle and right sides show the self correlation waveforms of the output pulse from the solution converter after adjustment of $P_{in}$. Further, the middle graph is a pulse before entering to the optical filter and the right side is after the optical filter.

As understood from FIG. 21, when the amount of input chirping increases (SMF length is increased) as increase of $P_{in}$, it is shown that $\Delta t_{AC}$ has a tendency of decreasing regardless the amount of input chirping (i.e., length of SMF). Namely, according to the interpretation of the experimental results, it demonstrates that the input chirping dependency can be compensated by the $P_{in}$ adjustment. FIG. 22 shows the results which are directly confirmed by the experiment.

The left side in FIG. 22 shows an input pulse, the middle part in FIG. 22 shows an output pulse waveform from the solution converter after the $P_{in}$ adjustment, and the right side in FIG. 22 shows an output pulse waveform from the output filter. It is thus shown that there can be obtained the same pulse waveforms as the output pulse waveforms by the $P_{in}$ adjustment even when pulse trains having different characteristics are inputted into the solution converter, respectively, as shown in the left side of FIG. 22. One of the specific example of the $P_{in}$ adjustment is a method to control the optical power by placing a variable attenuator at the front stage of the solution converter.

Figure 23:
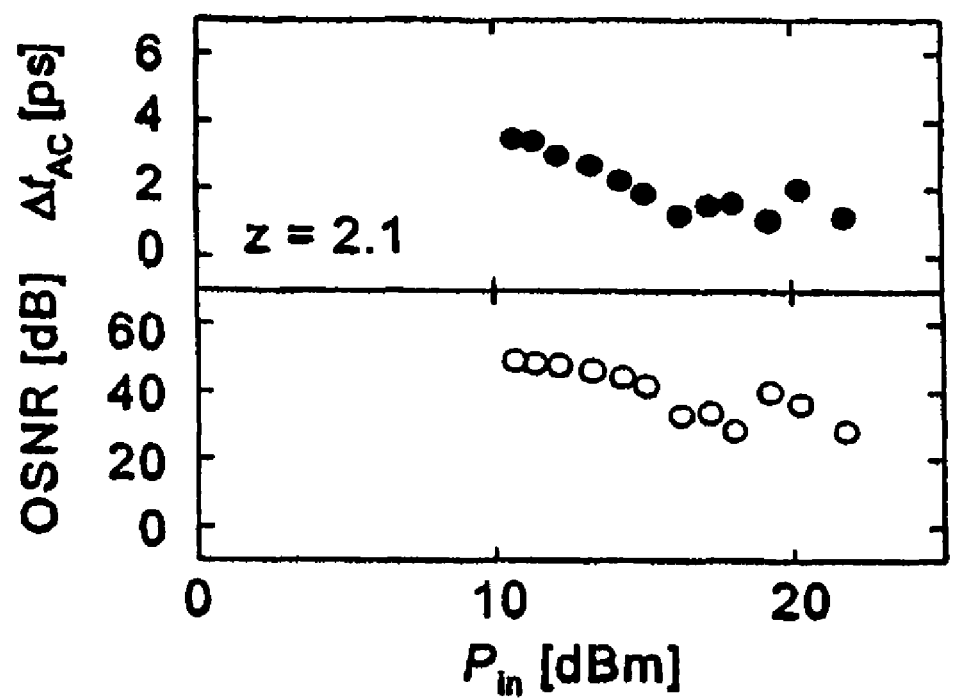
FIG. 23 shows a $P_{in}$ dependency of the self correlation wave width $\Delta t_{AC}$ of the solution output from the solution converter and OSNR.

The dependency of the self correlation wave width $\Delta t_{AC}$ of the solution output and OSNR on the $P_{in}$ in the short length solution converter of this embodiment is shown in FIG. 23. As described above, OSNR degeneration is suppressed to a certain extent compared to the long type. On the other hand, at the value of $P_{in}$ when $\Delta t_{AC}$ is in the minimum condition, the OSNR degeneration is remarkable.

Figure 19:
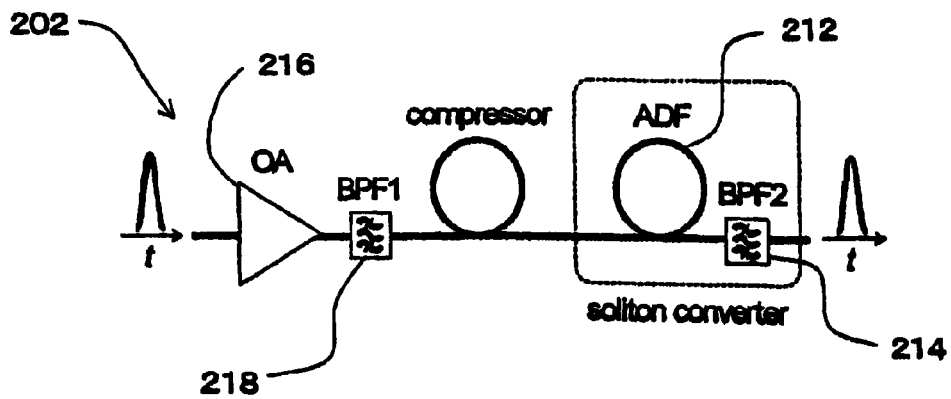
FIG. 19 is a schematic view of another embodiment of the solution converter in FIG. 17.

In other words, there is a trade-off between a pulse compression and an increase in noise. A method for realizing a compatible method of a noise suppression and a pulse compression is a combination of the noise suppression and the pulse compression which is one of the embodiments of the present invention (FIG. 19). In this configuration, the pulse compressor is placed before the waveform reshaping device. In this case, the waveform reshaping device includes a Mamyshev filter or a NOLM as well as the solution converter as described above. In general, the higher the input pulse peak power is, the higher performance it is expected for the waveform reshaping device which is based on the fiber nonlinear effect. The present invention intends to utilize this fact. It compresses the pulse train in advance and amplifies the peak power, then forwards to the waveform reshaping device.

Especially, the compressor based on an adiabatic compression method which has an advantage of noise immunity is suitable to this application. For this application, there is a method utilizing a fiber whose dispersion values decreases along with the fiber longitudinal direction (a dispersion decreasing fiber), or a fiber whose gain is gradually increasing (a Raman amplifier fiber). It is proposed to construct a fiber having a step-like dispersion profile (SDPF) by connecting a few different types of fiber which simulates the fiber in the former case, or a fiber having a comb-like dispersion profile (CDPF). Especially, a CDPF which is constructed from two types of fiber is preferable because of the easiness of manufacturing.

In addition, the adiabatic compression utilizes the characteristic that the optical solution is a stable pulse in which the dispersion effect and the nonlinear effect are balanced, and when the effect of either one increases or decreases, the another effect follows so that the optical pulse parameters automatically changes. Here, the dispersion effect is inverse proportion to the squared number of a fiber dispersion and a pulse width, and the nonlinear effect is proportional to the fiber nonlinear constant and the pulse power. In brief, in the condition of nonlinear effect is constant, when the fiber dispersion decreases, the square of the inverse number of a pulse width is needed to increase to satisfy it, and as a result, the pulse width becomes smaller.

Based on the above principle, in order to realize the pulse adiabatic compression, besides a method of making a fiber whose dispersion values decrease along with the fiber longitudinal direction, there are considered a method using a distributed Raman amplifier and a method increasing the nonlinearity along with the fiber longitudinal direction. In the former method, as the pulse power is increased by a distributed Raman amplifier while transmitting, the nonlinear effect increases, so that the pulse width becomes smaller as the dispersion effect follows it in the fiber in which the dispersion value and nonlinear constant is fixed.

In the latter case, in the fiber whose dispersion value is constant and nonlinear effect increases in the longitudinal direction (even if the pulse power decreases by the fiber loss, the fiber nonlinearity constant sufficiently increases so that when a product of the power and the nonlinear constant increase in the longitudinal direction, and the nonlinear effect increases accordingly), the dispersion effect has to increase, thus the pulse width becomes smaller in order to follow the increase of the nonlinear effect.

The method to increase the nonlinear constant can be realized by, besides continuously increasing in the fiber longitudinal direction, varying in a step-like manner, or arranging the nonlinear constant in a comb-shape to approximate it.

The fiber type waveform reshaping device is described as above, but it is not limited to the fiber type to realize the function of the waveform reshaping device. Generally, a device in which the input/output characteristic has a threshold and saturation characteristic (referred to as a saturable absorber), has a function of waveform reshaping. Herein below, the saturable absorber will be explained.

Devices each having a saturable absorbing characteristic is essential in the application of a whole optical regenerating relay (O3R) or a mode synchronized laser. Conventionally, there has been utilized an optical fiber nonlinearity for the saturable absorber, however, it has been proposed to directly utilize a saturable absorbing characteristic of a material such as; a semiconductor saturable absorber mirror (SESAM) (S. Tsuda, W. H. Knox, E. A. de Spuza, W. Y. Jan, and J. E. Cunningham, "Low-loss intracavity AlAsAlGaAs saturable Bragg reflector for femtosecond mode locking in solid-sate lasers," Opt. Lett., Vol. 20, No. 12 pp. 1406-1408, Jun. 15, 1995), and a carbon nanotube (CNT) (S. Y. Set, H. Yaguchi, Y. Tanaka, M. Jablonski, Y Sakakibara, A. Rozhin, M. Tokumoto, H. Kataura, Y. Achiba, K. Kikuchi, "Mode-locked fiber lasers based on a saturable absorber incorporating carbon nanotubes" Postdeadline papers, OFC2003, PD 44, 2003). However, when using the above-mentioned saturable absorber of the SESAM, the saturable absorbing characteristics of the material have to be optimized to obtain the desired characteristics, and thus it is difficult to maintain stable the conditions when manufacturing the material and to reproduce the material.

The saturable absorbing characteristic in case of using SESAM is determined by a composition in the neighboring area of the saturable absorbing layer, the absorbing spectrum, the thickness and the relative locations of the Bragg mirror and the saturable absorbing layer. In particular, the total optical intensity density has a distribution on the depth direction of the semiconductor, because the reflection light at the Bragg mirror forms a standing wave with the incident light. The relative relation between the saturable absorbing layer and the distribution of the optical intensity density is one of elements giving a different saturable absorbing characteristic to the same intensity of the incident light. In case of the CNT, a band gap and a thickness are primary design parameters. In any cases, it is difficult to realize a desired saturable absorbing characteristic precisely, and there are problems such as a yield or a limitation in the characteristic in the O3R or the mode synchronized lasers when constructing systems Since, in the mode synchronized lasers, the oscillation pulse characteristic largely depends on the saturable absorbing characteristic, the obtained pulse characteristic is determined by a selection of the saturable absorber. This is not only worsening the yield of the mode synchronized laser, but also limiting the characteristic of the oscillating pulse. The saturable absorbing characteristic required for oscillating pulses is fundamentally different from the saturable absorbing characteristic required for the shorter pulse operation and higher energy operation, and consequently the pulse characteristic under normal operation is problematically sacrificed to oscillate the pulse.

In order to solve such problem, as one of the embodiments of the present invention, the saturable absorber described above is changed to a variable characteristic saturable absorber. If the saturable absorbing characteristic is variable, there can be added a process to adjust the characteristic realizing a desired performance in the manufacturing, thus improving the yield. If it is possible to adjust the saturable absorbing characteristic after installing the system, it allows a flexible adjustment when the operating conditions are needed to change due to external turbulence or change of system parameters.

In the mode synchronized lasers, if the saturable absorbing characteristic is variable, the saturable absorbing characteristic can be adjusted so as to obtain a desired pulse characteristic from the saturable absorbing characteristic at the time when oscillating the pulse, while keeping a pulse operation. Consequently it makes possible to coexist the pulse oscillation with the short pulse/high energy operation which has been difficult.

Figure 47:
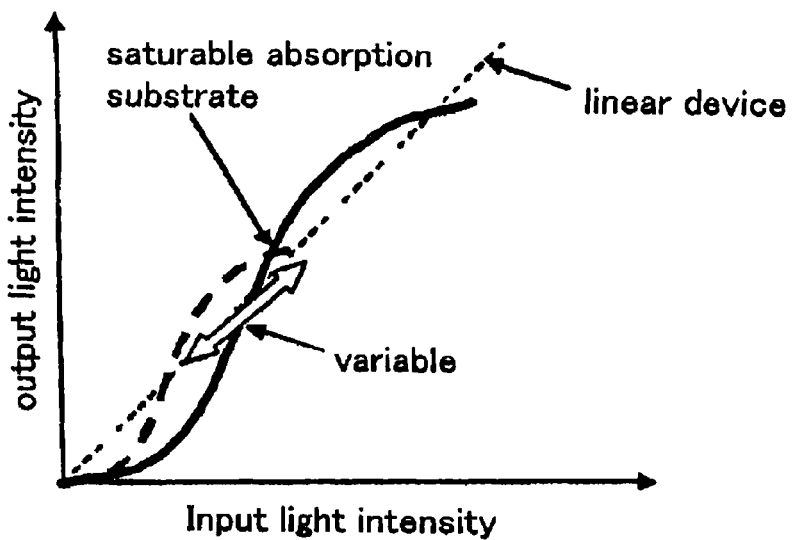
FIG. 47 is a graph showing a relation between an input light intensity and an output light intensity of the saturable absorption substance.

The contents mentioned above will be further explained referring to the drawing. FIG. 47 shows a typical saturable absorbing characteristic. The horizontal axis is an intensity of the input light and the vertical axis is an intensity of the output light. It is remarked that in the region of lower intensity of the input light, there is a threshold, and in the region of higher intensity of the input light, there is a saturated characteristic, which is different from a linear characteristic. Being variable of the saturable absorbing characteristic means that the curve is adjustable. Further detailed, this threshold saturation characteristic can be made variable to a certain intensity of the input light. Namely, the curve in FIG. 47 can be extended or shortened or a gradient angle thereof can be changed, as shown in the figure.

Figure 48:
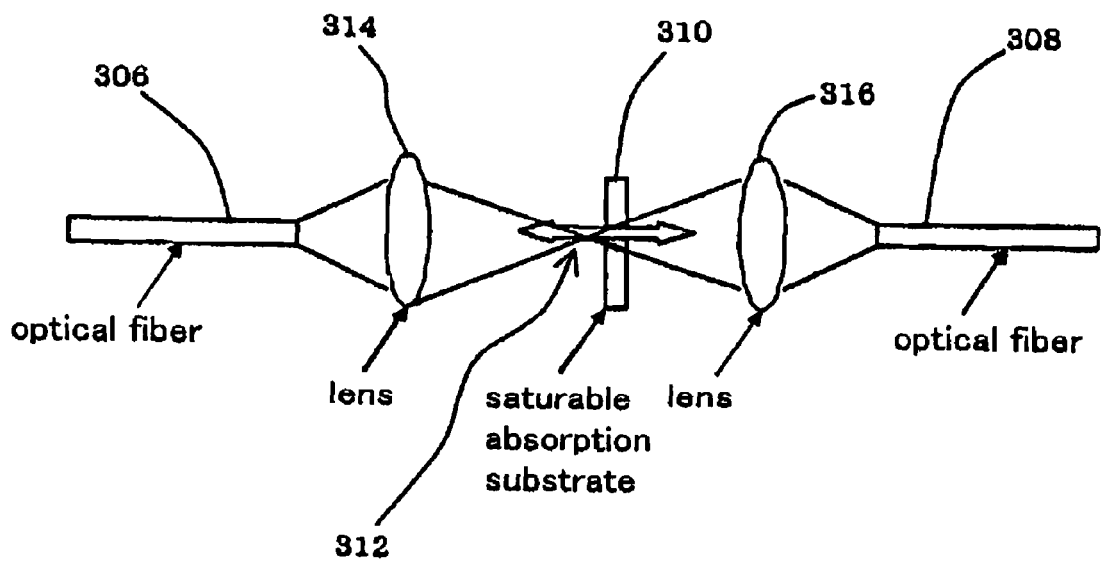
FIG. 48 shows one configuration of the device using the saturable absorption substance.
Figure 49:
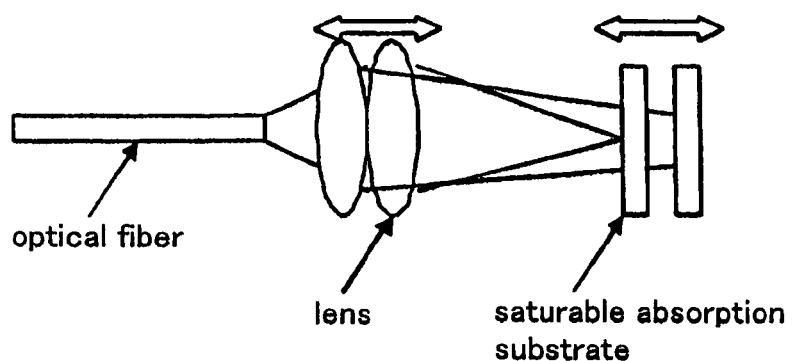
FIG. 49 shows one configuration of a modification of the device of FIG. 48.

Generally, if the optical intensity density of the incident light entering the saturable absorber is variable, the saturable absorbing characteristic can be adjusted. FIG. 48 shows its configuration. During the process starting from collecting the light which is emitted out from the optical fiber 306 to reconnect to another optical fiber 308, the optical intensity density of the incident light entering the saturable absorber 310 varies depending on the position where the saturable absorber 310 is placed. FIG. 48 shows a transmissive type, and FIG. 49 shows a reflective configuration. In the reflective type, the same result can be obtained by moving the optical system so that the beam waste changes.

It is also possible to add a surface distribution to the saturable absorbing characteristic of the SESAM or CNT. For example, in case of the SESAM, it can fabricate so as to continuously change the relative position on the surface between the Bragg mirror and the saturable absorbing layer by utilizing a distributed layer thickness in the surface. Alternatively, instead of the relative position between the Bragg mirror and the saturable absorbing layer, it is possible to have a distributed saturable absorbing characteristic in the surface by changing the composition or the thickness of the saturable absorbing layer. In the CNT, it is also possible to have a distributed saturable absorbing characteristic in the surface by adding a distributed inner thickness of the surface or changing a band gap in the surface by making a temperature gradient when manufacturing or changing the CNT construction.

Figure 50:
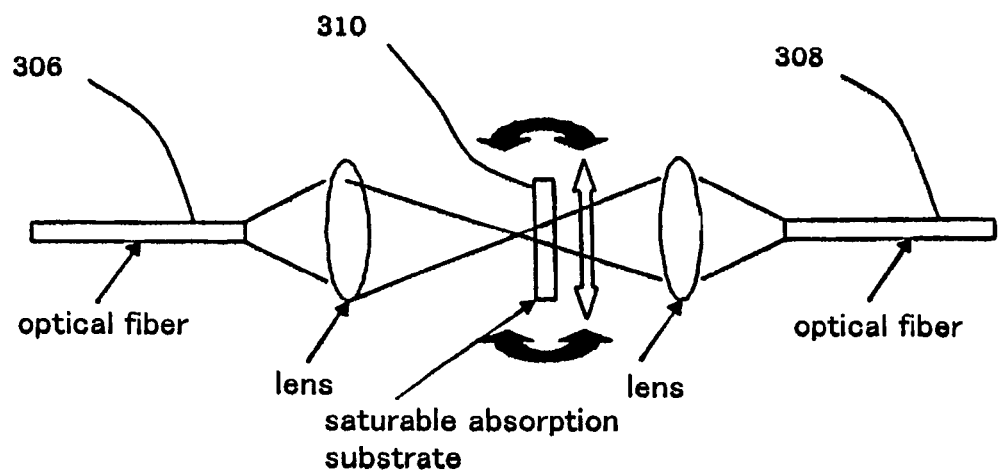
FIG. 50 shows another configuration of a modification of the device of FIG. 48.

By placing the saturable absorber 310 which has an inner surface distribution of the saturable absorbing characteristic in the optical path so as to freely move between the optical fibers 306 and 308 connected in the space as shown in FIG. 50, a device having a variable saturable absorbing characteristic can be realized. The movable direction is anyone of vertical, lateral, diagonal directions and inclined direction to the optical axis. In any direction, the length of the optical path running through the saturable absorber 310 is allowed to vary. The moving directions of the saturable absorber for both of the transmissive type as FIG. 48 and the reflective type as FIG. 49 can be the same configuration.

When applying the present invention to the mode synchronized laser, by shifting the curve in FIG. 47 gradually upwards from the saturable absorbing characteristic to start a pulse oscillation, the pulse width and the energy can be made gradually narrower and larger, respectively. This corresponds to move the saturable absorber 310 gradually towards the lens side 316 from the center position 312 in FIG. 48. In FIG. 48, although the saturable absorber 310 moves from the center 312 to the lens side 316, the same results may be obtained even when moved from the center 312 to the lens side 316.

When moving the saturable absorber 310 in this manner, the intensity density of the incident light becomes smaller, so that this case corresponds to expand the curve in FIG. 47 vertically and horizontally. In the configuration as FIG. 50, when the saturable absorber 310 is moved towards the position where the saturable absorbing characteristic is getting weaker, the same results may be obtained. The weak saturable absorbing characteristic corresponds to a thinner film layer of the CNT, if taking the CNT as an example. The variability can be used for adjusting the saturable absorbing characteristic in the manufacturing process and can be also applicable as a controllable device during the system operation.

Figure 24:
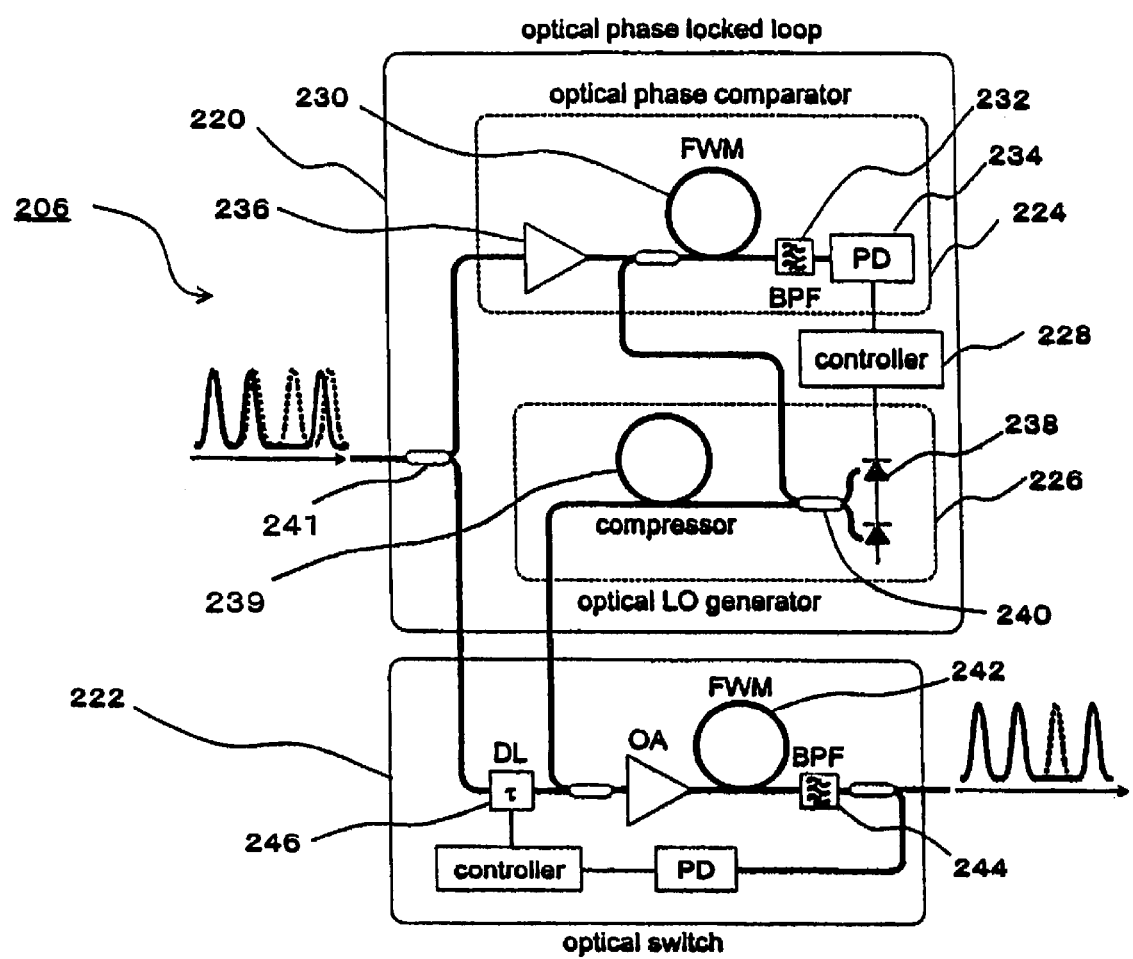
FIG. 24 shows one configuration of the Kerr-shutter.

Next, there is shown in FIG. 24 one of the embodiments of the Kerr-shutter 206 as a timing regenerator. The embodiment comprises an OPLL (optical phase locked loop) 220 and an optical switch 222. The OPLL 220 comprises a phase comparator 224, an optical LO generator 226 and a controller 228.

In the OPLL 220, the phase comparator 224 senses a phase difference between the external optical signal and the optical LO signal light (hereinafter, called an optical LO), and the controller 228 controls a repetitive frequency of the optical LO based on the phase difference. As a result, the optical clock pulse train which is synchronized with the external optical signal can be generated. Thus, the optical signal with time reformed can be generated by switching the optical clock pulse train and the external optical signal in optical domain. The details of respective parts of the present invention will be described below.

As described above, the QPLL 220 comprises a phase comparator 224, an optical LO generator 226 and a controller 228. The phase comparator 224 essentially comprises an FWM unit which is made of an optical fiber, an optical filter 232 and a photo receiving unit 234. The FWM unit 230 is made of an optical element such as a nonlinear optical fiber, a PPLN (Periodically-poled LiNO₃), SOA (semi-conductive optical amplifier) or the like which performs an FWM.

In the OPLL 220, by entering an external optical signal and an optical LO to the FWM unit 230, an FWM light is newly generated. The FWM light is filtered by the optical filter 232 and sensed by the photo receiving unit 234 which is made of a photodiode (PD).

The photo receiving unit 234 and the control part 228 detect the electrical signal as a phase difference signal, and control the optical LO oscillation frequency (corresponding to repetitive frequency) based on this value. As a result, the clock pulse train synchronized with the external optical signal is generated. In order to enhance the nonlinear characteristic sufficiently in the FWM unit (generating an FWM at high efficiency), the optical amplifier 236 such as an EDFA or a semiconductor amplifier, and the optical filter (not shown) may be placed before the FWM unit 230 as required, as shown in FIG. 24. Also, the optical element which performs an FWM such as PPLN, or SOA or the like may be placed in the FWM unit in order to sense the phase difference signal. In this configuration, the length of OPLL loop is further shortened and the OPLL bandwidth is broadened.

In addition, an intensity variation of a second-harmonic generation (SHG) can be used for sensing a phase difference between the external optical signal and the optical LO, replacing the FWM by a PPLN, or a nonlinear optical crystal. Further, by causing to enter the PD which has no sensitivity to the wavelength of the input signal light but is sensitive to the shorter wavelength light, the phase difference can be converted to the photo electric current by a two photon absorption effect in the PD.

On the other hand, the optical LO generator 226 consists of the beat light generators 238. Concretely, one or more semiconductor lasers which have two or more frequency components are preferable. In FIG. 24, the configuration constructed by two laser diodes (LD) is shown as an example. CW light emitted from the beat light generators 238 are mixed by the optical coupler, then a beat light is generated. The beat frequency can be controlled by adjusting the driving current and the temperature of at least one of the beat light generators 238.

The beat light is inputted to the phase comparator 224 as an optical LO and at the same time, and it is also inputted to the optical switch part 222 as a clock signal. If necessary, it may reshape the waveform of the clock signal to fit the optical switch part 222 by converting the beat light to the solution train by the pulse compressor 239 before entering the optical switch part 222.

The most important point during the clock extraction process is a reduction of the timing jitter of the output clock pulse train. Namely, it is the preciseness in the time position of the pulse. The present embodiment adopts the following three methods to decrease the timing jitter.

The first method is a shortening of the OPLL 220 loop length. The timing jitter is correlated with the OPLL 220 loop length and the shortening of the loop length (shorter fiber length) is effective to suppress the jitter. Especially in this embodiment, since the phase comparator 224 fundamentally consists of the FWM unit, it is easier to shorten the loop length than the conventional NOLM type. As a result, in this case, it is possible to generate a clock pulse train with a suppressed jitter. A highly-nonlinear fiber (HNLF) that is more than five times of the nonlinear coefficient of the typical transmission fiber may be adopted as the optical fiber of FWM unit 230 in the phase comparator 224 to realize the short loop length (fiber length).

Figure 68:
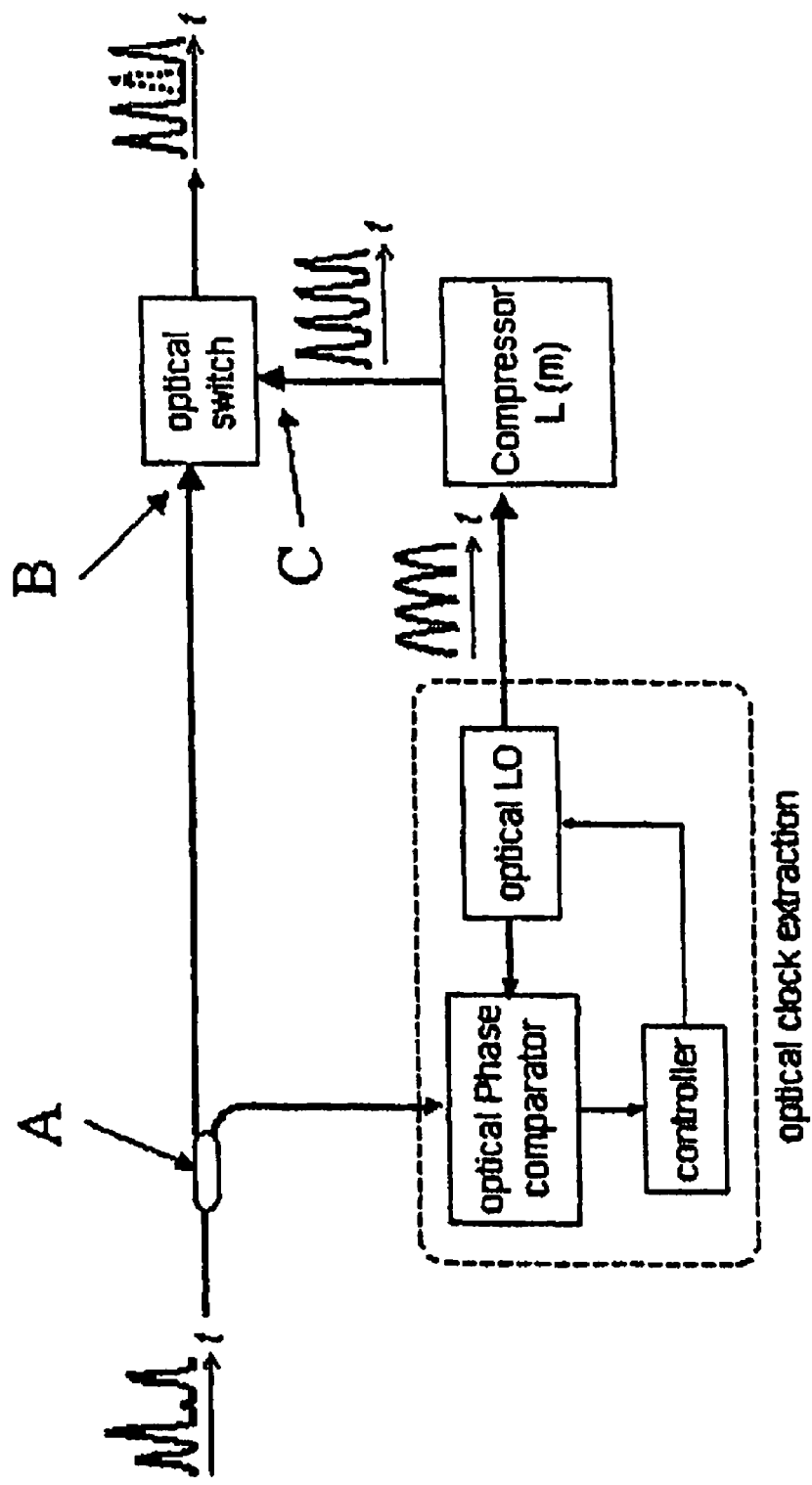
FIG. 68 is a schematic constitutional view of alternate embodiment of the Kerr-shutter illustrated in FIG. 24 and showing that the fiber length from the first demultiplexer to the optical switch is almost the same between both cases of transmitting through the OPLL part and transmitting directly.

In the second method, the fiber length $L_{A-B}$ [m] is adjusted to about the same length as the fiber length $L_{A-C}$ [m] in FIG. 68. The $L_{A-B}$ is a fiber length when directly connecting the demultiplexer A to the optical switch B, and the $L_{A-C}$ is a fiber length when connecting the demultiplexer A via the clock extractor, the fiber compressor to the optical switch C. $\tau_{A-B}$ is a time that the separated optical signal at the demultiplexer A travels to the optical switch B, and $\tau_{A-C}$ is a time that the separated optical signal at the demultiplexer A travels via the clock extractor, the fiber compressor and reaches to the optical switch C. They are expressed as $\tau_{A-B}=(L_{A-B}/v)$ [s], and $\tau_{A-C}=(L_{A-C}/v)$ [s], wherein v [m/s] is a velocity of a light traveling in a fiber. The length of the filer compressor in FIG. 68 is a few km distance. Therefore, if a fiber of the same length as $L_{A-C}$ [m] is not added between the demultiplexer A and the optical switch B, $|\tau_{A-B}-\tau_{A-C}|$ is derived to a few As which is a time difference that the optical signal reaches to the optical switch. The upper limit of the bit rate difference between the optical signal and the optical LO referring to the time difference is shown as:

$$\Delta\omega < |\delta B + \delta L| \times |\tau_{A-B} - \tau_{A-C}|$$

wherein

δB [Hz]: a signal bit rate line width, and

δL [Hz]: a frequency line width of LO output light.

Therefore, by changing the $|\tau_{A-B}-\tau_{A-C}|$ to a smaller value (in other words, by changing the difference of the fiber length $|L_{A-B}-L_{A-C}|$ to a smaller value), the bit rate difference Δω becomes smaller and hence the timing jitter during optical switching can be reduced.

Figure 25A:
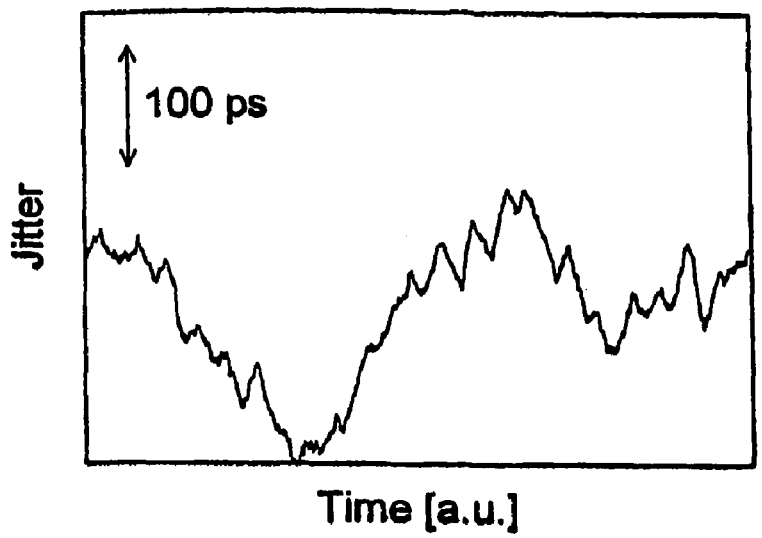
FIG. 25A is a graph showing a timing jitter characteristic when a pair of LDs are driven independently.
Figure 25B:
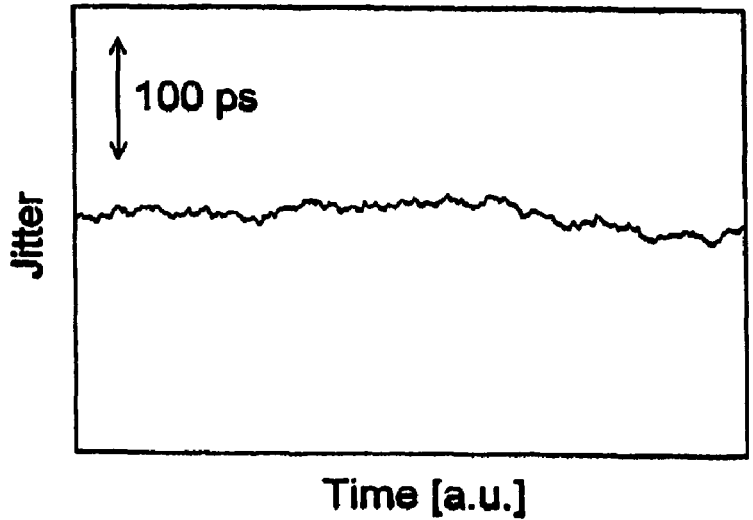
FIG. 25B is a graph showing a timing jitter characteristic when LDs are driven in series.

The third method is an LD pair driving circuit. In the optical LO generator 226, it can compensate the LD wavelength fluctuation caused by a driving current source by a method of driving two LDs in series. Actually, the measured results of the noise suppression by the method of LD series driving is shown in FIG. 25. FIG. 25A shows a timing jitter characteristic when driving the LD pair independently and FIG. 25B shows a timing jitter characteristic when driving the LD pair in series. It is demonstrated that the jitter when using a series driving is reduced by one-tenth compared to the independent driving. The noise reduction by the series driving is realized by keeping a change to be equal among the two LD driving currents. Instead of the LD pair driving circuit, a current mirror circuit can make the same result.

As shown in FIG. 24, generally the OPLL 220 is separated from the optical switch 222 and the pulse compressor 239 in the optical LO generator 226 has a length L(m). $\tau_1$ is defined as a time that the incident light travels through the phase controller 246 to the optical switch 222 after the incident light is divided at the first demultiplexer 241 (the demultiplexer in FIG. 24 where the incident optical signal is divided into the directions of the OPLL and the optical switch). Further, $\tau_2$ is defined as a time that the synchronized signal reaches to the optical switch 222 after synchronized at the OPLL 220. Then, $\tau_1$ and $\tau_2$ show different values, and time lag is expressed by the following equation:

$$T_{lag} = |\tau_2 - \tau_1| = n \cdot L/c$$

wherein n: refraction index of a fiber and c: velocity of a light. The input signal light frequency ω1 (t−$\tau_1$) and the beat light frequency ω2 (t−$\tau_2$) which is emitted from the optical LO generator 226 after clock extraction are different in general. The phase difference Δφ between the input signal light at the optical switch 222 and the synchronizing signal generated at the optical LO generator 226 is expressed as follows:

$$\Delta\phi = 2\pi(\omega 2(t-\tau_2) - \omega 1(t-\tau_1)) \cdot T_{lag} = \Delta\omega \cdot T_{lag};$$

When the tolerance of the phase difference ωφ is 0.05 (rad), it results in Δω<0.05 (n·c)/(2λL) (Hz). For example, when L=1000(m), n=1.5 and a frequency difference Δω<about 500 Hz, the phase difference is acceptable. In this way, depending on the length L of the pulse compressor 239, the tolerance of the frequency line width of the output beat light from the optical LO generator 226 is determined.

Next, referring to FIG. 24 and FIG. 68, the optimization of the loop length is described. In this case, the loop length means the optical fiber length in the optical clock extraction unit as shown in FIG. 68. As described above, the loop length $L_{Loop}$, is preferably determined so as to satisfy the following equation:

$$\Delta\omega(L_{Loop}) < v \cdot X/n \cdot L_{A-B}$$

wherein
Δω: bit rate difference,
$L_{Loop}$: loop length,
v: velocity of the light in the optical fiber,
$L_{A-B}$: length of the fiber connected between the demultiplexer A and the optical switch B,
n: refraction index of the optical fiber, and
X: arbitrary number.

Namely, in the present invention, the $L_{Loop}$ becomes small because a highly nonlinear fiber is used as the FWM unit 230. Consequently, Δω becomes small, thus reducing the timing jitter.

The optical switch 222 comprises an FWM unit 242, an optical switch 244 and a phase controller 246 (refer to FIG. 24). This is identical to the phase comparator 224 except the phase controller 246.

In the optical switch 222, firstly an optical signal and a clock pulse train are inputted into the FWM unit 242. Then, the timing reshaped optical signal is generated as an FWM light at the output port of the FWM unit 242. The light wave is separated from the input light components by the optical filter 244 and outputted.

The clock pulse and the optical signal are synchronized (with the same frequency) by the OPLL 220, but the phases need to be adjusted. To this end, the phases are adjusted by the phase controller 246 consisting of the variable delay line (DL) which is inserted in at least one optical path of either the optical signal or the clock pulse.

Regarding the delay line in the phase controller 246, either a half fixed or full variable type is acceptable. If the phase controller 246 is a half fixed type, the temperature of the whole system needs to be controlled constant so that the amount of adjustment necessary for the ambient temperature change would not vary. If the phase controller 246 is a variable type, the amount of adjustment for phase control is determined based on the electrical signal obtained by sensing a par of the output pulse.

Figure 51A:
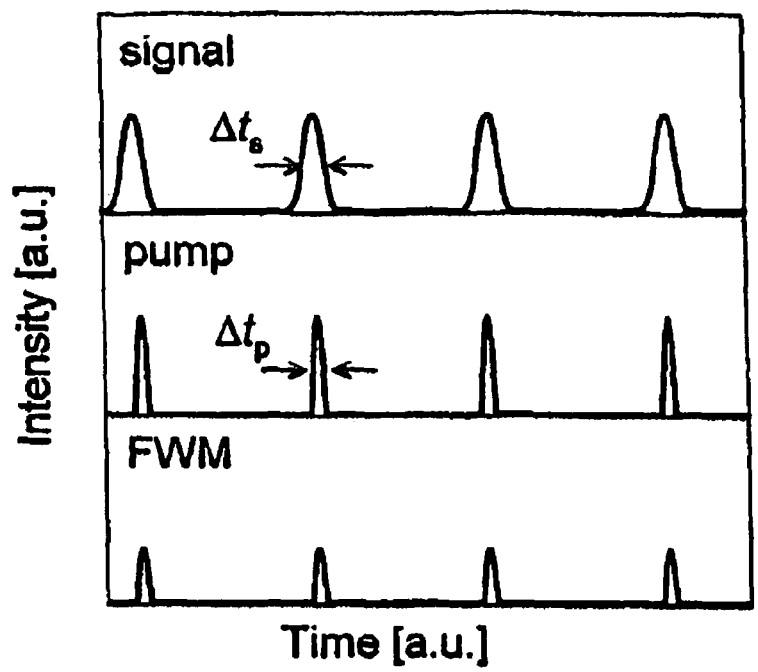
FIG. 51A is a graph showing an input pulse and output pulse at FWM when time is shown in a horizontal axis.
Figure 51B:
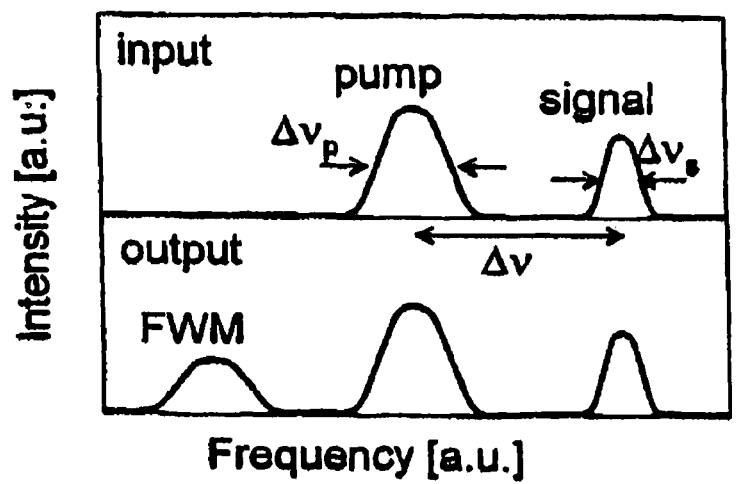
FIG. 51B is a graph showing an input pulse and output pulse at FWM when frequency is shown in a horizontal axis.

The fiber type FWM unit 242 will be described below. In this fiber type FWM unit, there are occasions where a waveform distortion occurs due to the effect of the dispersion and nonlinear during a transmission of the light in the optical fiber. To suppress this, it is important to select a suitable wavelength (frequency) arrangement and a fiber type to fit the input pulse condition. The method of suppression will be described in sequence from (1) through (4), as described below. A frequency arrangement and a designing of the fiber will be reviewed, where abbreviated as follows (refer to FIG. 51).

$\Delta t_p$: a time width of the input pumping pulse,
$\Delta v_p$: a spectrum width of the input pumping pulse,
$P_p$: a peak power of the input pumping pulse,
$\Delta t_s$: a time width of the input signal pulse,
$\Delta v_s$: a spectrum width of the input signal pulse, and
$P_s$: a peak power of the input signal pulse.

(1) In the FWM, it is necessary to maintain sufficient frequency distance Δv (detuning amount) between the pumping light and the signal light in order to avoid overlapping among spectrum components of the three wave lights. The condition is given by the flowing equation:

$$\Delta v > \frac{|\Delta v_p + \Delta v_s|}{2} \quad \text{[Equation 3]}$$

Figure 52:
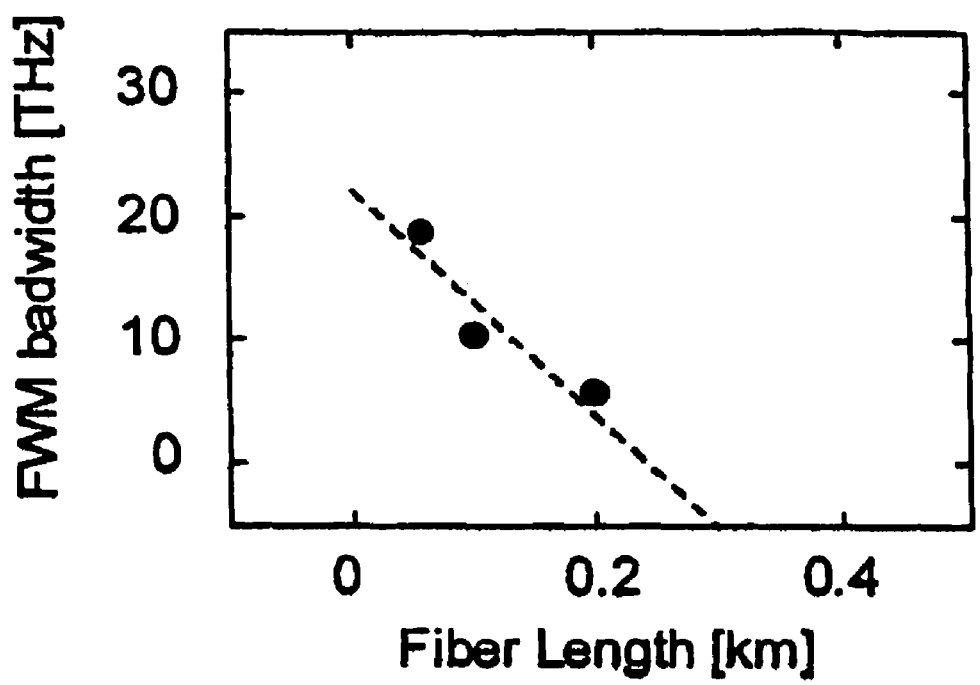
FIG. 52 is a graph showing a relation between a bandwidth and an optical fiber length required for FWM.

(2) In the wavelength conversion to Δv given from the above equation, the band width of at least 2Δv is needed. On the other hand, the possible causes to limit the band width of the fiber in the FWM are (a) un-matching phase due to wavelength dispersion, (b) polarizing dispersion, and (c) coherence degeneration. In case of the cause (a), it can be avoided by frequency arrangement to satisfy the phase matching condition, that is by adjusting the pumping wavelength to be coincide with the fiber zero dispersion wavelength. Generally, the cause (c) affects less influence than the cause (b). Consequently, in the typical FWM, the limitation in the band width due to the polarizing dispersion is dominant. For the limitation in the band width, a fiber polarizing holding (S. Watanabe et. al., ECOC97, PD7, 1998) is effective, but there is a problem in which it is difficult to manufacture. Another method of broadening a bandwidth is a shortening of the fiber length (O. Aso, et. al., EL, vol. 36, p 709, 2000). It is shown in FIG. 52. Based on the relation between the fiber length and the bandwidth shown in FIG. 52, the fiber length ΔL which can obtain the required bandwidth for Δv is prepared.

(3) To obtain sufficient nonlinear effect to generate an FWM, it is necessary for the fiber length L to be the same as $L_{NL}$ which is a nonlinear length for the input pumping pulse. This is defined by the following equation:

$$1 < \frac{L}{L_{NL}} = \gamma P_0 L \quad \text{[Equation 4]}$$

However there is an upper limit in the L value to obtain the FWM bandwidth as described above. Therefore, to satisfy the above equation, the increase of $\gamma P_0$ value becomes important. On the other hand, in the high power pulse transmission in the optical fiber, there is a problem in which a spectrum waveform distortion is caused by a self phase modulation (SPM) due to the nonlinear effect. To suppress this, the upper limit of $\gamma P_p L$ is set to be up to 3π/2 which is a nonlinear phase shift where the pumping pulse spectrum starts to have two peaks by the SPM. (Authored by Agrawal, Yoshioka Book Co.).

$$\gamma P_p L \leq \frac{3\pi}{2} \quad \text{[Equation 5]}$$

From the above two equations, the range of $\gamma P_p$ is identified to perform the FMW without the spectrum distortion.

(4) In the FWM transmission, there is an occasion where a time waveform distortion occurs by the dispersion effect on the input pumping pulse and the input optical signal pulse. To suppress this, it is necessary to reduce the second and third dispersion effects on the pulses. The condition is given by the following equation:

$$\frac{L}{L_{SOD}} < \frac{1}{2}, \frac{L}{L_{TOD}} < \frac{1}{2} \qquad \text{[Equation 6]}$$

Under the condition that wave length (frequency) arrangement satisfies the phase matching, the second dispersion effect in the wave length of the input pumping pulse is small. Consequently, the third dispersion effect becomes dominant for the pumping pulse. The condition to suppress this is given by the following equation:

$$\beta_3 < \frac{1.7628^3}{2} \frac{\Delta t_p^3}{L} \qquad \text{[Equation 7]}$$

The second dispersion effect in the wave length of the input signal optical pulse is given by $2\pi\beta_3\Delta v$, and the condition suppressing this is given by the following equation:

$$\beta_3 < \frac{1.7628^2}{4\pi} \frac{\Delta t_s^2}{L\Delta v} \qquad \text{[Equation 8]}$$

From the equations described above in the sections (1) through (4), the fiber can be designed necessary for the FMW without time waveform distortion. The design procedure is summarized in the flow chart in FIG. 53.

Figure 53:
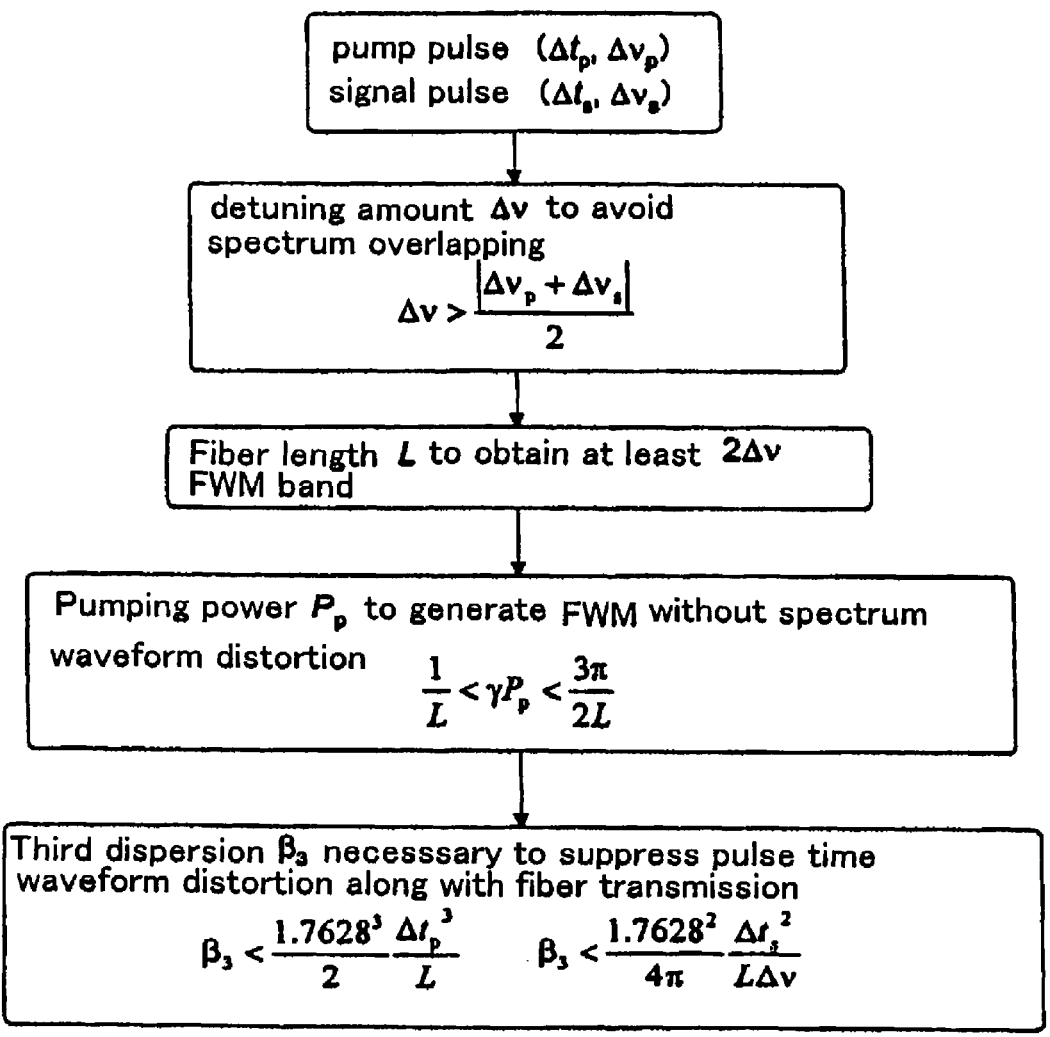
FIG. 53 is a flow chart of a designing step to determine the optimum fiber length required for FWM.
Figure 54:
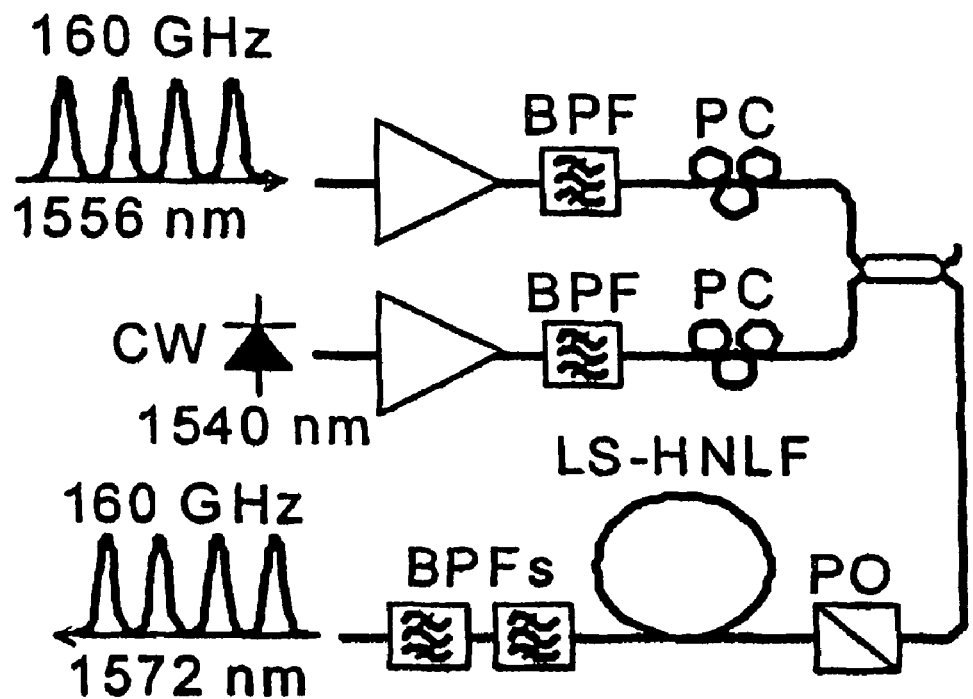
FIG. 54 shows an experimental configuration after performing FMW conversion with the optimum fiber length determined by the design flow of FIG. 53.
Figure 55:
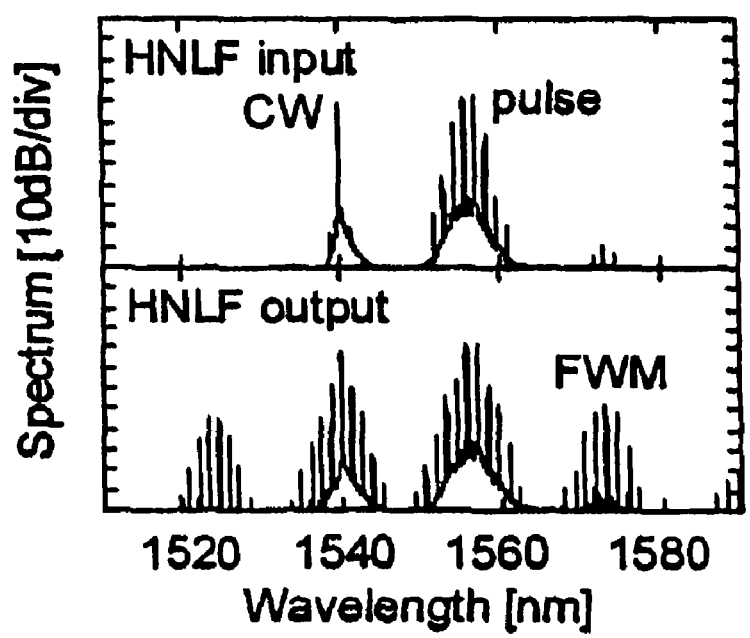
FIG. 55 is a graph showing an input and output pulse waveform in the experiment of FIG. 54.
Figure 56:
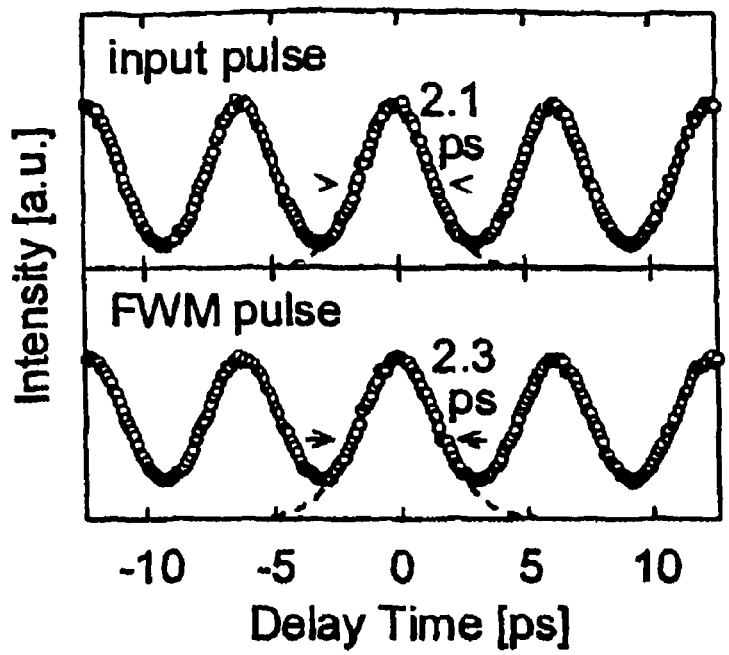
FIG. 56 is a graph showing a self correlation waveform at time of input and output according to the experiment of FIG. 54.

Next, the experimental results will be described in which the wavelength conversion of the 160 GHz pico second pulse train is performed, using the FWM unit having the fiber designed following the procedures in FIG. 53. The block diagram used for the experiment is shown in FIG. 54. In the configuration of FIG. 54, a 1556 nm 160 GHz 2 ps pulse train and a 1540 nm CW light are mixed at 3 dB coupler, then it enters the low slope HNLF of 0.2 km length. The FWM components generated is extracted by the two stage BPFs (1572 nm of transmission center wavelength and 4.5 nm of full width half maximum). Further, the γ and the dispersion slope of HNLF used in this case are 24.1/W/km and 0.014 ps/nm2/km, respectively. These values are determined by the procedure as shown in FIG. 53. The HNLF input and output spectrum waveform are shown in FIG. 55 at the condition where the power of the input pulse and output pulse are 19 dBm and 13 dBm, respectively. It shows the FWM components are generated near the 1572 nm and 1524 nm in the output. The self correlation waveform of the FWM pulse is shown in FIG. 56. For comparison purpose, the self correlation waveform of the input pulse is also shown. It shows that wavelength conversion has been performed without a distortion in time waveform of the pulse, although the width has been increased by 10% by means of the two stages of BPF used for FWM component extraction. After passing through the two stages of BPF, the FWM power becomes −2 dBm.

In FIG. 54, two BPFs are connected but one BPF is acceptable as long as it can eliminate the components of the input pulse and CW sufficiently. Furthermore, multiple connection like three stage, four stage . . . , n stage configuration is acceptable. In case of FIG. 54 and FIG. 55, the BPF with 1572 nm of transmission center wavelength is used and extracted only near 1572 nm wavelength pulse generated in the longer wave length side as an output pulse by the FWM. If using a BPF with 1524 nm of transmission center wavelength (not shown), it is obviously possible to extract the FWM components generated in the shorter wavelength side.

In this embodiment, it is focused that a career suppressed pulse whose phases are in reversed with the neighboring pulses, so-called CS-RZ pulse (Carrier Suppressed Return-to-Zero), is used as an input pulse. Firstly, the relationship of the phase between neighboring pulses in the pulse train generated by FWM will be studied. When the input CW light functions as an FWM pump, the FWM converted light generated in the shorter wavelength side (in this case, a component of near 1524 nm length) is a CS-RZ pulse train whose phases are in reversed with the neighboring pulses. On the other hand, when the input pulse train functions as an FWM pump, the FWM converted light generated in the longer wavelength side (in this case, a component of near 1572 nm length) is an RZ pulse train whose phases are in the same phase as the neighboring pulses. By utilizing the characteristic, it has been made possible to convert the CS-RZ pulse train to the RZ pulse train. If it is necessary to keep the same phase relation between the neighboring pulses, it is carried out by not using the input pulse as an FWM pumping.

Figure 57:
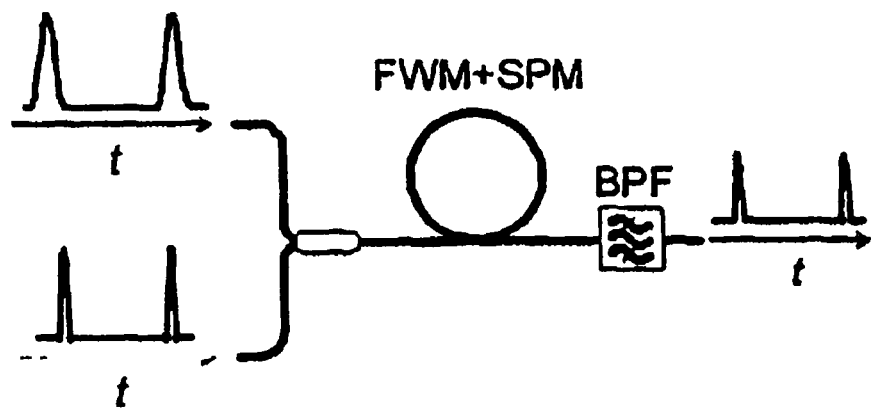
FIG. 57 shows one configuration of the waveform reshaping unit when using an FWM and SPM.
Figure 58:
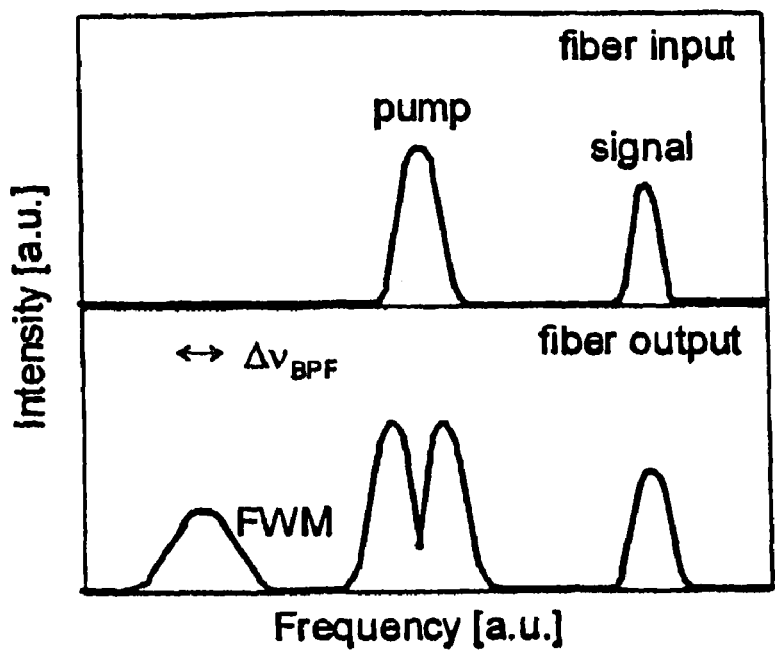
FIG. 58 is a graph showing a pulse waveform in the reshaping unit.

In the foregoing, the optical switch and the waveform converter using the FWM are described. Another embodiment using the FWM phenomenon is a device which can realize a waveform reshaping function. The configuration is shown in FIG. 57 and the phenomenon is shown in FIG. 58. The elements per se are almost identical to the configuration of the embodiment in FIG. 54. The different points lie in that the input pumping power is strengthened and the spectrum bandwidth broadened by the SPM is positively utilized. Along with this, the generated FWM pulse spectrum is also broadened. In addition, by increasing the input pumping power of the input optical signal, the effect of the cross phase conversion in the nonlinear effect results in further broadening of the FWM pulse spectrum.

Figure 59:
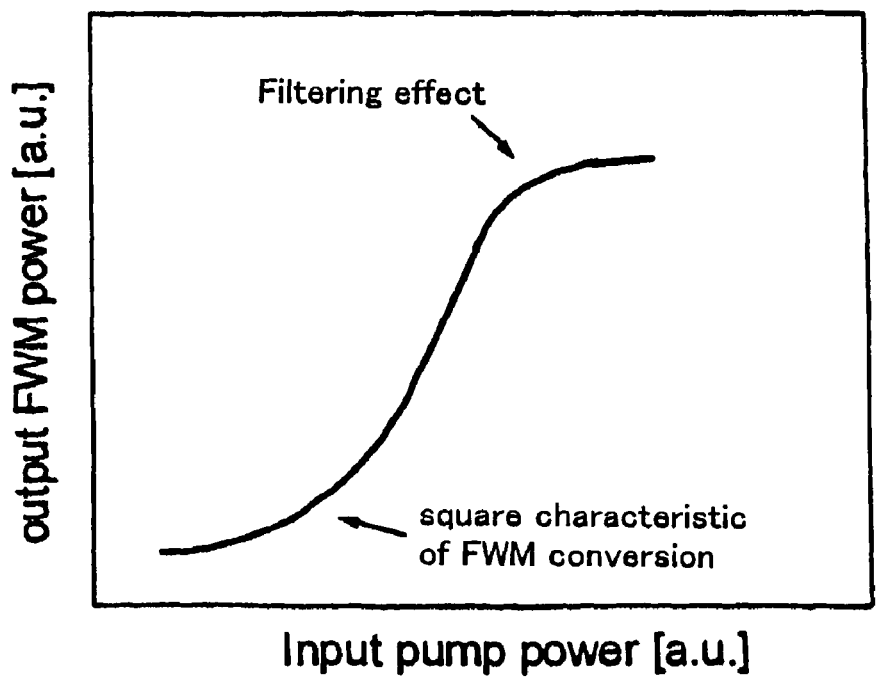
FIG. 59 is a graph showing a relation between the input pumping power and the output FWM power at the reshaping unit in FIG. 57.

In that, when the pumping power is low, the FWM pulse spectrum width is maintained about the same as that of the pump pulse or the signal optical pulse. When the pumping power is high, the FWM pulse spectrum width is broadened. Consequently, the broadened spectrum is cut off by arranging the BPF having an optimized FWHM, and hence it can realize the nonlinear loss. Then, the relation between the input pumping power and the output FWM power becomes as shown in FIG. 59, thus the threshold and saturation characteristic are realized. As a result, the FWM device can make an optical switch which has a waveform reshaping function and the O3R can be realized by using this.

Figure 26A:
FIG. 26A shows one configuration of the photo receiving device.
Figure 26B:
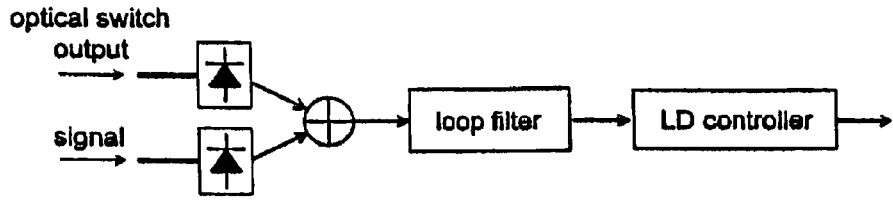
FIG. 26B shows a modification of FIG. 25A.
Figure 26C:
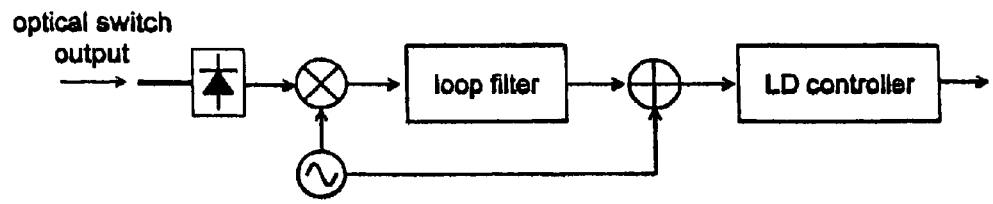
FIG. 26C shows a further modification of FIG. 26A.

Referring to FIG. 26A through FIG. 26C, a configuration of the electrical circuit in the photo receiving unit 234 (refer to FIG. 24) which senses the phase error signal will be described. FIG. 26A shows one configuration of the photo receiving unit 234. The photo receiving unit 234 comprises a photodiode (PD), a loop filter and an LD controller. The LD controller is a device to control the LD driving current and the temperature.

The photo receiving unit 234 in FIG. 26A receives the optical output from the phase comparator 224 by a PD, and then extracts its low frequency signal components by a loop filter. By means of controlling the LD driving current based on the output of the electric signal, the wavelength emitted from the LD of the beat light generator, that is a beat frequency, is controlled.

FIG. 26B shows a modified embodiment of FIG. 26A, and it comprises two PDs, a calculator, a loop filter, and an LD controller. In FIG. 26B, two PDs detect the output light from the phase comparator as well as the optical power of the input optical signal pulse, and then the difference between them is forwarded to the loop filter. Thus, the extinction ratio of a change of phase difference signal between the optical signal pulse and the optical LO is improved. The configuration of the photo receiving unit according to FIG. 26B can obtain higher sensibility.

FIG. 26C shows another modified embodiment of FIG. 26A, and it comprises a PD, a multiplier, a loop filter, an adder, an LD controller, and a reference signal-generator. After the PD detects the output of the optical switch and multiplied with a reference signal, then it extracts low frequency components in the electrical signal by the loop filter. Then it controls the LD based on the difference between its output and the reference signal. The configuration of the photo receiving unit according to FIG. 26C can obtain the maximum point of the optical output power at the phase comparator in an effective way.

Figure 60A:
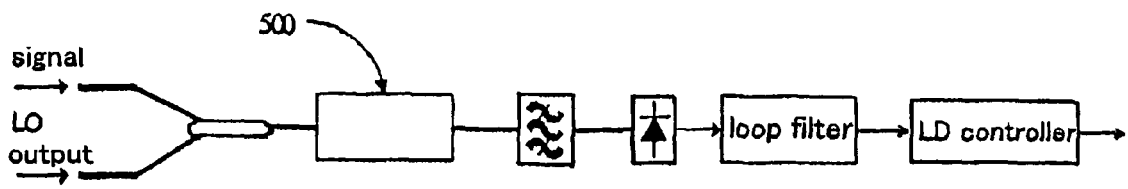
FIG. 60A shows one configuration to detect a phase difference wherein an optical fiber is not used in the FWM unit.
Figure 60B:
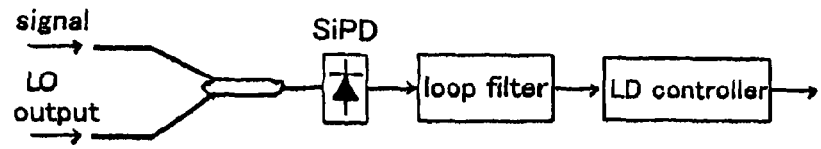
FIG. 60B shows one configuration of the modified FWM unit.

FIG. 60A shows a modified embodiment of the phase comparator 224 and shows one example to detect a phase difference where an optical fiber is not used in the FWM unit. As an FWM light generator 500, the SOLN and the PPLN can be used. Replacing an FWM light generator, a PPLN and a nonlinear optical crystal can be used as an SHG generator. Furthermore, as shown in FIG. 60B, it is also possible to detect by a two photon absorption replacing the PD with an SiPD (Silicon photodiode).

Figure 27:
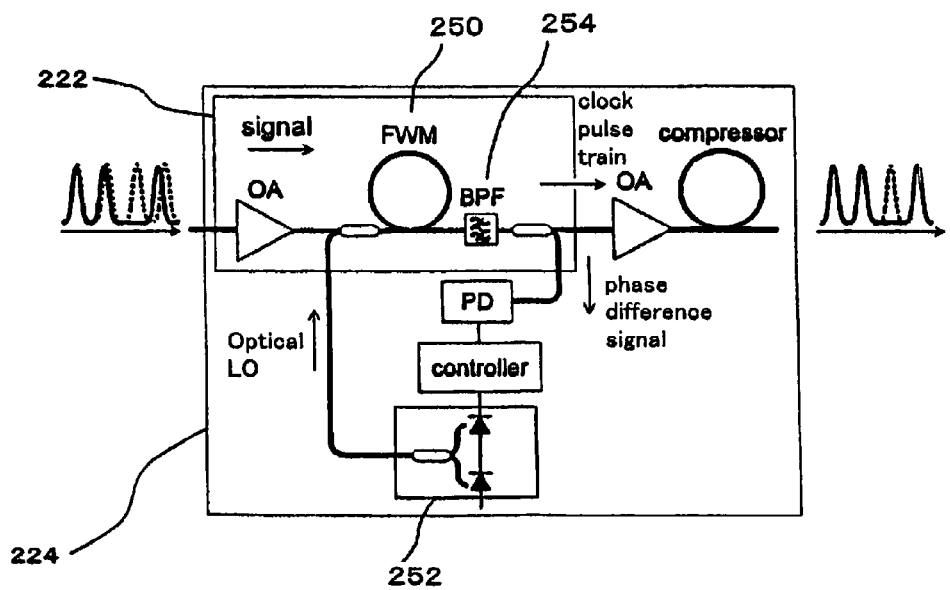
FIG. 27 shows one alternate configuration of the Kerr-shutter wherein the phase comparator and the FWM of the optical switch are integrated.

Furthermore, it is also possible to integrate the phase comparator 224 in the optical timing reforming system and the FWM fiber in the optical switch. The configuration is shown in FIG. 27. It consists of the FWM unit 250 wherein the optical phase comparator and the optical switch are shared, and the optical LO generator 252. Each element is identical to that of FIG. 23 as described above. The input optical signal and the optical LO are inputted to the FWM unit 250 and the generating FWM light is extracted by the optical filter 254. The FWM light is inputted to the optical LO frequency controller as an input phase error signal and also it is output as a clock pulse train.

As described above, there have been explained the components which are the minimum necessities for the optical regenerator system. The regenerator system 200 (refer to FIG. 17) according to the present invention comprises a pulse roller and a solution purifier in order to improve the performance. Some examples will be described below.

Figure 28:
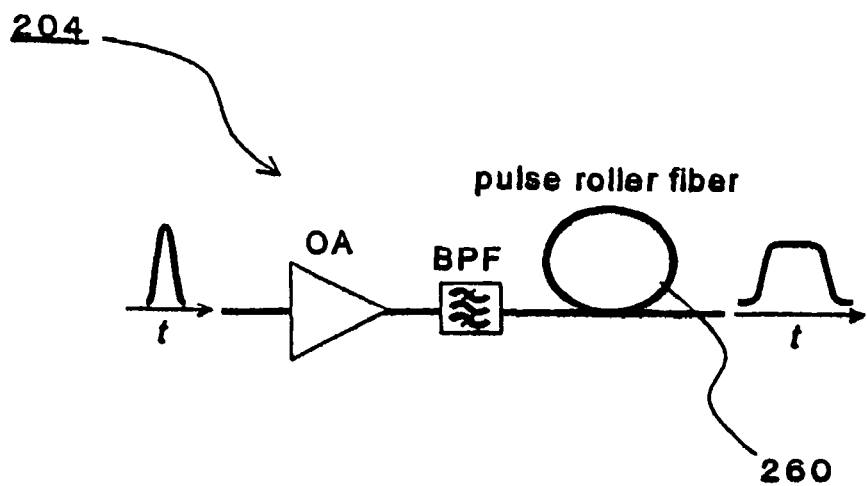
FIG. 28 shows one configuration of the pulse roller.

One embodiment of the pulse roller 204 is shown in FIG. 28. It is a configuration in which the optical signal is inputted to the pulse roller fiber 260. The input optical signal is reformed to a rectangular waveform by the interaction of the normal dispersion effect and nonlinear effect in the pulse roller fiber 260. The nonlinear effect broadens the pulse spectrum band width and in addition, the normal dispersion effect reshapes the pulse time waveform to a rectangular form.

Figure 41A:
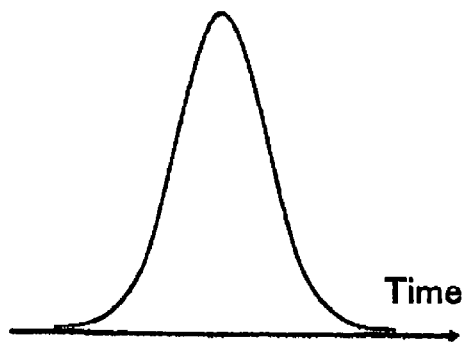
FIG. 41A is a graph showing the input pulse.
Figure 41B:
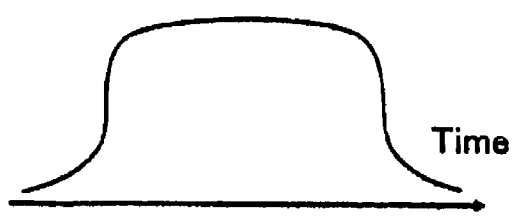
FIG. 41B through FIG. 41D are graphs showing the waveform after transformed to a rectangular waveform pulse from that in FIG. 41A.

Now, a method of reshaping to a rectangular waveform will be described referring to FIG. 41A through FIG. 41D and FIG. 42. When a pulse as illustrated in FIG. 41A transmits through a normal dispersion fiber, it changes to a rectangular waveform pulse. The interaction between the normal dispersion effect and nonlinear effect (Kerr effect) is essential to cause it. Namely, the up-chirping as illustrated in the lower part in FIG. 42 occurs by the nonlinear effect, and the lower frequency components transmits at a faster speed and the higher frequency components transmits at a slower speed by the normal dispersion effect. This results in a waveform distortion as illustrated in FIG. 41B.

Figure 42:
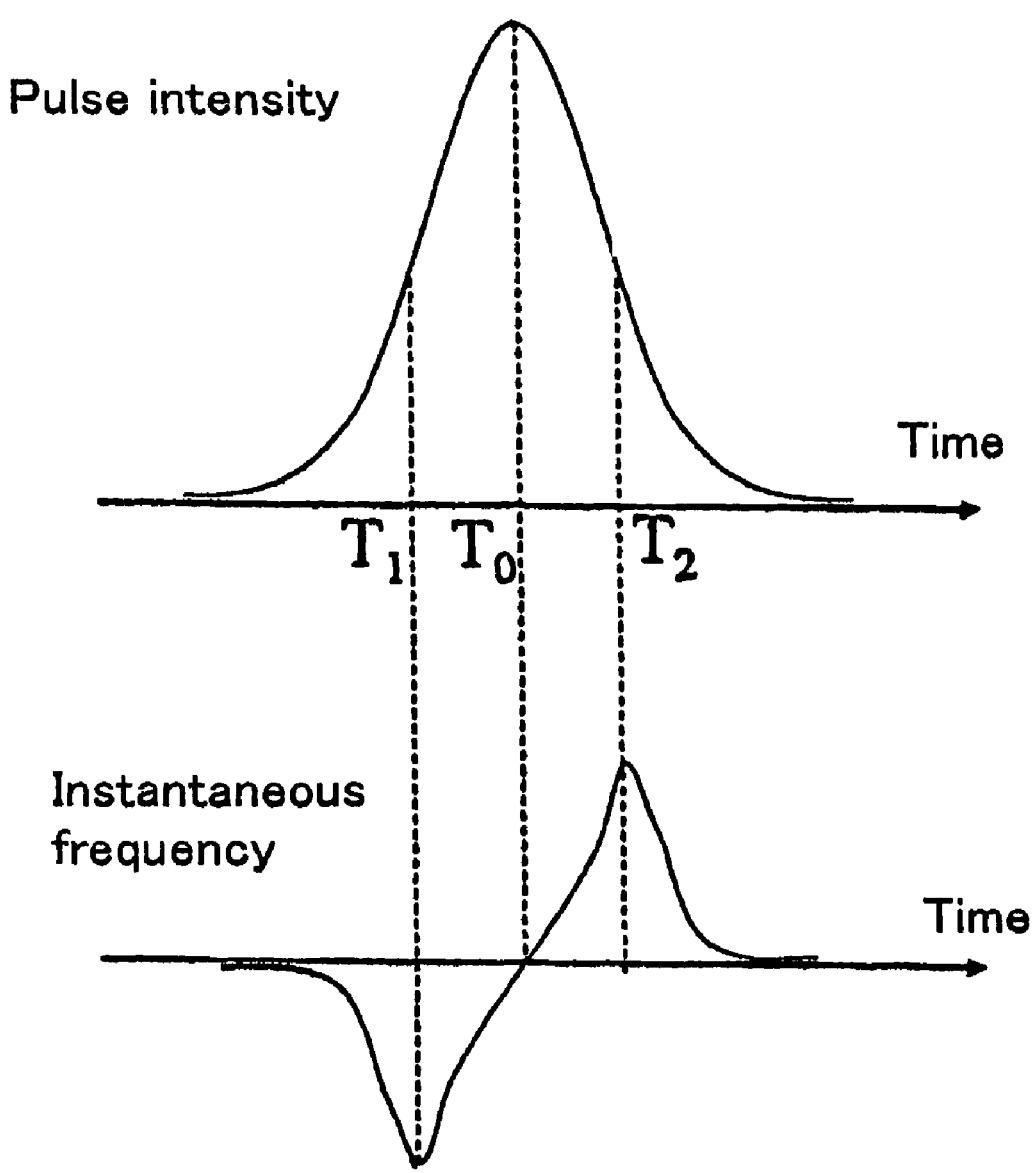
FIG. 42 shows waveforms explaining a relation between a pulse intensity and an instantaneous frequency.

In more details as illustrated in FIG. 42, the pulse is linearly broadened in the area between $T_1$ and $T_2$, which are a point of inflection of the pulse intensity, by the linear up-chirping according to the normal dispersion effect. $T_0$ is a center of the pulse. Since it is in a down-chirping between $T_x < T_1$ and $T_x > T_2$ ($T_x$ is an arbitrary time), the closer to the top of the pulse (|T| is larger), the slower the transmission speed is, and the closer to the rear end (|T| is larger), the faster the transmission speed is. More specifically, the energy is concentrated on the portions $T_1$ and $T_2$, and the pulse intensity comes to change rapidly for the time axis. The steepness is proportional to the peak value of the instantaneous frequency at $T_1$ and $T_2$.

Figure 29A:
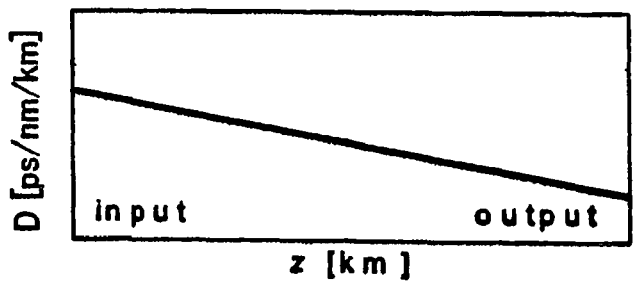
FIG. 29A is a graph showing a dispersion profile of the normal dispersion increasing fiber.
Figure 29B:
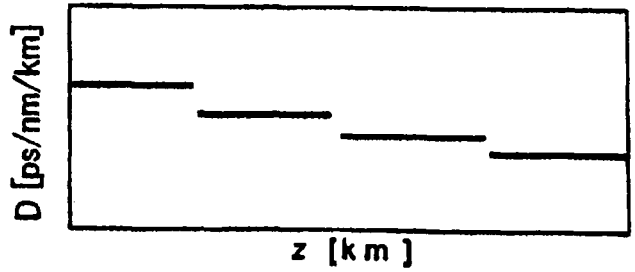
FIG. 29B is a graph showing a dispersion profile of the step-like dispersion profile fiber.
Figure 29C:
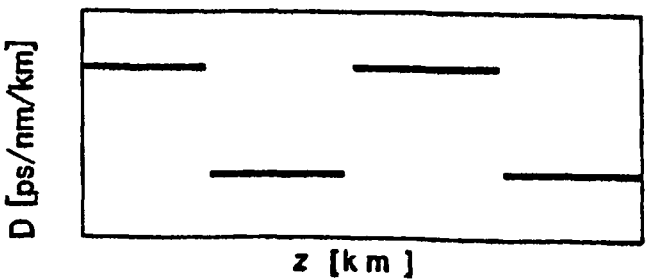
FIG. 29C is a graph showing a dispersion profile of the comb-like dispersion profile fiber.

The present invention uses a normal dispersion increasing fiber (NDIF) as a pulse roller fiber 260 to generate a rectangular phenomenon at a high efficiency. The dispersion profile of the NDIF is shown in FIG. 29A. The vertical axis of FIG. 29A through FIG. 29C show a negative dispersion value [ps/nm/km] in all the cases, and when it moves to the top side, the dispersion value approaches a "0" value.

As shown in FIG. 29A, because of lower dispersion value in the input side of the NDIF, the nonlinear effect relatively becomes dominant. Because of higher dispersion value in the output side of the NDIF, the normal dispersion effect relatively dominates. Hence, the pulse is sufficiently broadened in the spectrum width in the NDIF input side, and the pulse time waveform is made to a rectangular form at a high efficiency by strengthening the normal dispersion effect in the output side of the NDIF.

As a result, a length of the pulse roller fiber 260 (optical fiber: NDIF) can be shortened. In a quantitative expression using a nonlinear length $L_{NL}$ and a dispersion length $L_D$, it is designed to satisfy $L_D \gg L_{NL}$ at the input side, and $L_D \ll L_{NL}$ at the output side, respectively. Only, the dispersion length is expressed as $L_D = T_0^2/|\beta_2|$, where $T_0$ and $\beta_2$ show an input pulse time width and a dispersion value, respectively. Furthermore it satisfies $L_{NL} = 1/\gamma P_0$, where $\gamma$ and $P_0$ is a nonlinear coefficient and an input peak power, respectively.

Figure 41C:
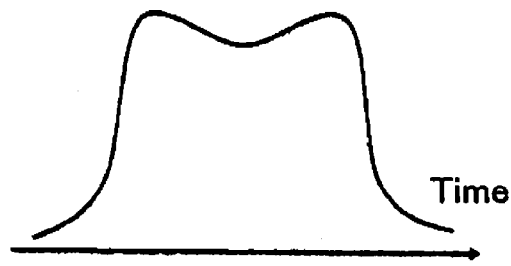

By adopting an NDIF, a complete flat rectangular waveform pulse in the top part can be made as shown in FIG. 41C. This is because, in the region of $L_D \gg L_{NL}$, the pulse can be converted to the super Gaussian pulse with up-chirping, and then, in the region of $L_D \ll L_{NL}$, the pulse can be broadened linearly by the normal dispersion effect. It is verified by theoretical calculation of the fact that the top of the waveforms changed to a complete flat shape when the super Gaussian pulse with up-chirping transmits through the linear transmission path under the nonlinear effect. The principle of the NDIF will be described in detail below.

Conventionally, when using a pulse roller which has a constant dispersion value, there has been required a large amount of input power to generate a nonlinear effect and a certain amount of dispersion value to generate a dispersion effect. The reason is that when a dispersion value is small, even the chirping is generated by nonlinear effect, and the dispersion effect is so small that no waveform is changed to a rectangular shape. When dispersion effect is so high, the components including the up-chirping generated by the nonlinear effect rapidly distribute, and since the peak power is reduced, the pulse transmits without accumulation of the chirping.

As a result, the rising of the pulse is slow as illustrated in FIG. 41B, and the top part is substantially the same as the rising waveform as illustrated in FIG. 41A which is an upwardly convex shape. The rising steepness of the pulse depends on the high frequency components included in the spectrum, and therefore the fact that the rising is dull corresponds to the fact that the high frequency components have not been generated by a sufficient nonlinear effect.

From the foregoing, in order to effectively make the pulse to be rectangular waveform, it is identified that the up-chirping is accumulated to the sufficient level under the condition of less influence from the dispersion, then the pulse waveform is converted by the large dispersion effect. This situation can be realized by using an optical fiber whose normal dispersion increases in a longitudinal direction.

More specifically, it may be designed so that the nonlinear distance corresponding to the input power of the pulse at the input end of the optical fiber is to be sufficiently shorter than that of the dispersion distance corresponding to the input pulse width and dispersion value. As a result, the nonlinear effect becomes dominant than the dispersion effect so that the sufficiently large chirping is accumulated in the initial period of the transmission.

Figure 41D:
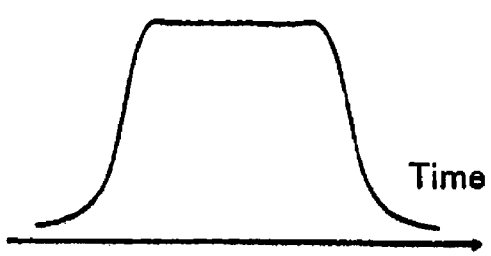

Furthermore, at the output end, it may be designed so that the dispersion distance is shorter than the nonlinear distance, and the dispersion effect becomes dominant. Since the high frequency components are already generated, the rising of the pulse becomes steep. That pulse can be simulated by a super Gaussian function with a large up-chirping. It is verified by a simple calculation that such a pulse becomes the shape of a function featuring from an upward concave to a downward concave in the area of the pulse center as shown in FIG. 41C, when transmitting in the fiber with the normal dispersion effect dominant. It is possible to make a rectangular pulse whose top part is approximately flat shape as shown in FIG. 41D by causing the pulse to output during the transition from the status as shown in FIG. 41B to the status as shown in FIG. 41C.

As described above, to realize the situation where a nonlinear effect is dominant at the input end of the fiber and a dispersion effect is dominant at the output end, there is a method for decreasing the nonlinear constant in a longitudinal direction with the constant dispersion, and in addition, there is another method for increasing a (normal) dispersion in a longitudinal direction. In case of decreasing the nonlinear constant, it is preferable to control the nonlinear constant in such a manner that the characteristic is varied so as to make a step like profile, or to make comb like profile except continuously decreasing it in a longitudinal direction.

Next, there will be described another embodiment of the pulse roller 204. FIG. 29B and FIG. 29C are another embodiment of FIG. 29A. The embodiment comprises a pulse roller 204 wherein the NDIF (refer to FIG. 29A) is replaced by a dispersion management optical fiber 260 consisting of combined at least two different types of optical fibers whose dispersion/nonlinear coefficients are different.

The pulse roller 204 having one of the fibers as shown in FIG. 29B and FIG. 29C shows the same function and effect as the pulse roller fiber 260 as shown in FIG. 29A. Namely, both types of the pulse roller 204 have a characteristic that the nonlinear effect is dominant at the portion of the input end and the dispersion effect is dominant at the portion of the output end.

In the pulse roller 204 as shown in FIG. 29B and FIG. 29C, the pulse roller fiber 260 is made of a combination wherein the optical fiber whose nonlinear effect is dominant and the optical fiber whose dispersion effect is dominant are arranged in series.

Figure 30A:
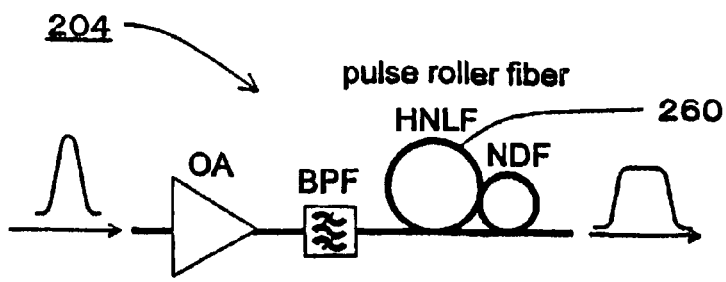
FIG. 30A is one configuration of the pulse roller and showing an experimental transmission path for pulse reshaping to a rectangle waveform.
Figure 30B:
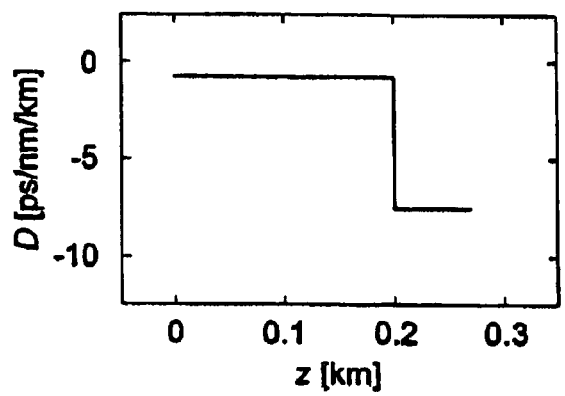
FIG. 30B shows a dispersion profile of the pulse roller fiber in FIG. 30A.

FIG. 30A shows an experimental configuration of reshaping a pulse to a rectangular waveform wherein the pulse roller fiber 260 is made of a pulse roller fiber 204 which consists of two types of optical fibers. A 160 GHz repetitive 2 ps pulse train is inputted to the pulse roller fiber 260. The dispersion profile of the pulse roller fiber 260 is illustrated in FIG. 30B. In FIG. 30B, the horizontal axis is a length of an optical fiber and the vertical axis is a dispersion. The pulse roller fiber 260 illustrated in FIG. 30B comprises an HNLF and an NDF, and the length of the HNLF is 200 m, and the dispersion D=−0.7 ps/nm/km, as well as the length of the NDF is 80 m, and the dispersion D=−7.5 ps/nm/km.

This case adopts a highly nonlinear fiber(HNLF) in which the nonlinear effect is dominant. The HNLF is an optical fiber wherein the nonlinear constant is larger than that of a fiber used in a communication channel. By using the HNLF, the length of the optical fiber can be shortened. In addition, when using the HNLF, the length can be shortened compared to the standard fiber, even if the NDIF as shown in FIG. 29A through FIG. 29C is not used and the dispersion is constant.

Figure 31:
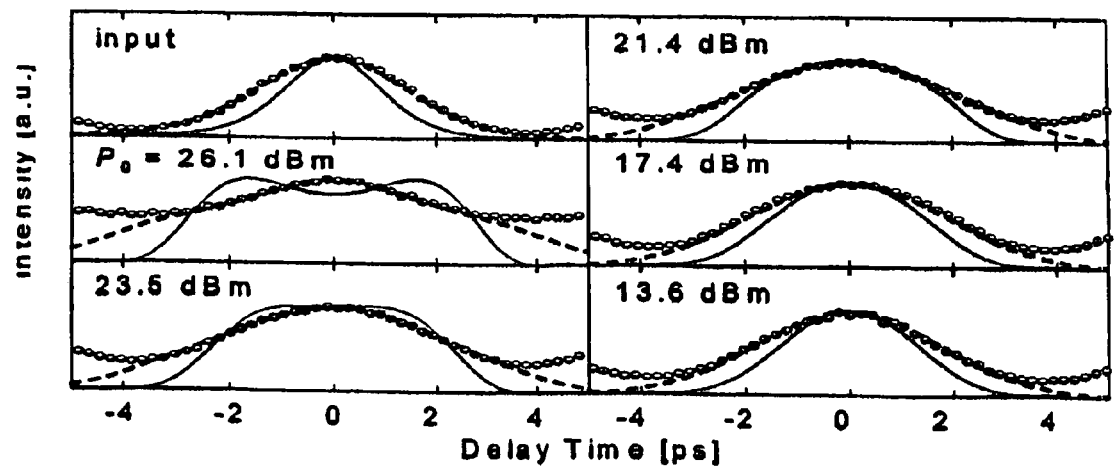
FIG. 31 shows simulation results of a pulse transmission in FIG. 30A and FIG. 30B.

Next, the simulation results of a 2 ps pulse transmission in the pulse roller fiber of FIG. 30B is shown in FIG. 31. A solid line shows a real time waveform of the output pulse, and a dotted line shows the corresponding self correlation waveform thereto. $P_0$ is an input peak power. It is shown that the output pulse waveform is changed to a rectangular shape at $P_0$=23.5 dBm as shown by a solid line. The self correlation waveform (dotted line) is a triangle shape.

Represented by white circles is an experiment result for the self correlation waveform. Because this experiment uses a 160 GHz pulse train, it is shown that there is a wide separation between white circles and a dotted line in the area where the trailing edges of pulses are overlapping, while both pulses are coincident in the area of the pulse center. Therefore, from the experiment result, it can be considered that the waveform is made to a rectangular shape at $P_0$=23.5 dBm in the same manner as the simulation result.

Figure 32:
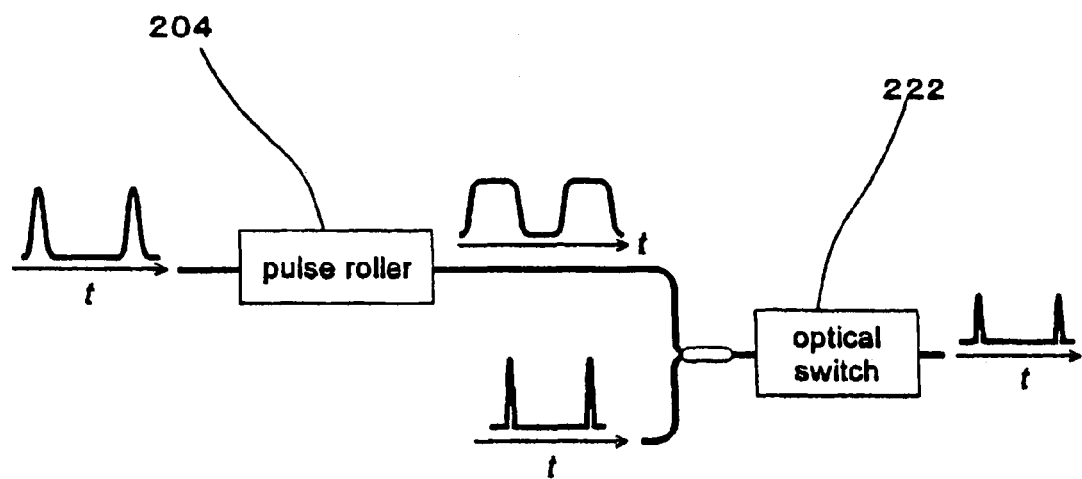
FIG. 32 is one configuration of the re-timing unit or the time division unit which consist of a pulse roller and an optical switch.

By placing the pulse roller fiber 204 before the optical switch (refer to FIG. 24), it can realize a high performance in a timing reforming device and a time division device. With reference to FIG. 24, the pulse roller fiber is placed between the first coupler and the optical switch, or between the LO generator and the optical switch. FIG. 32 shows one of the embodiments.

In the configuration in FIG. 32, the pulse roller 204 is placed before the optical switch 222, and reshapes the external signal light or the clock pulse to a rectangular waveform, then an optical switching is carried out by the optical switch (refer to FIG. 24). In this case, the configuration of the optical switch 222 is not limited to an FWM type as shown in FIG. 24, and may comprise a NOLM type or an SOA (semi-conductive optical amplifier) type.

Figure 39A:
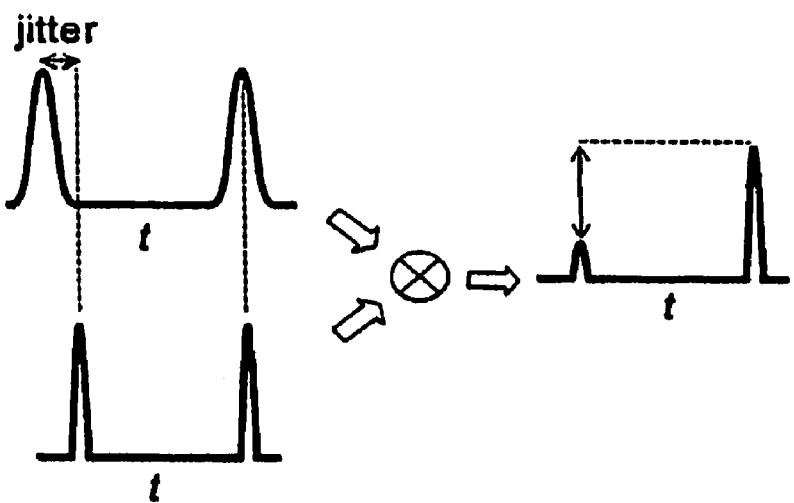
FIG. 39A and FIG. 39B are explanatory views of the conventional pulse rectangular technique.
Figure 39B:
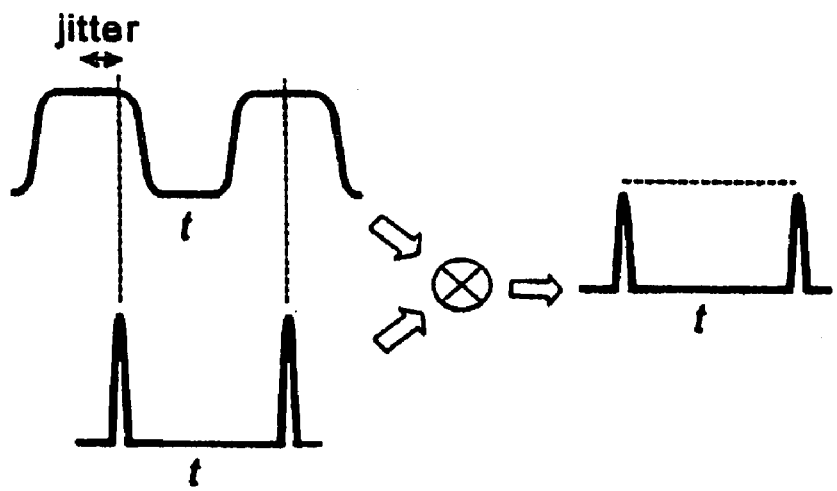
Figure 40A:
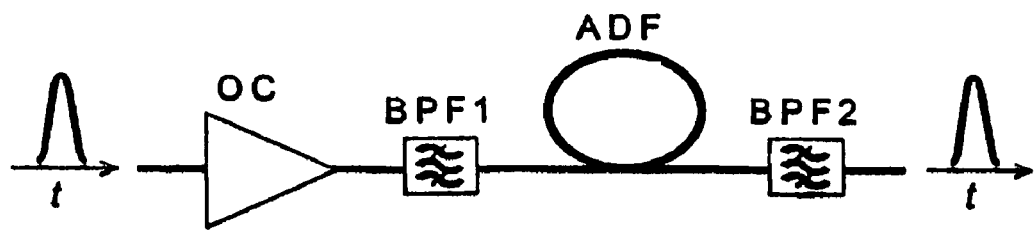
FIG. 40A shows a configuration of the conventional noise reduction unit.
Figure 40B:
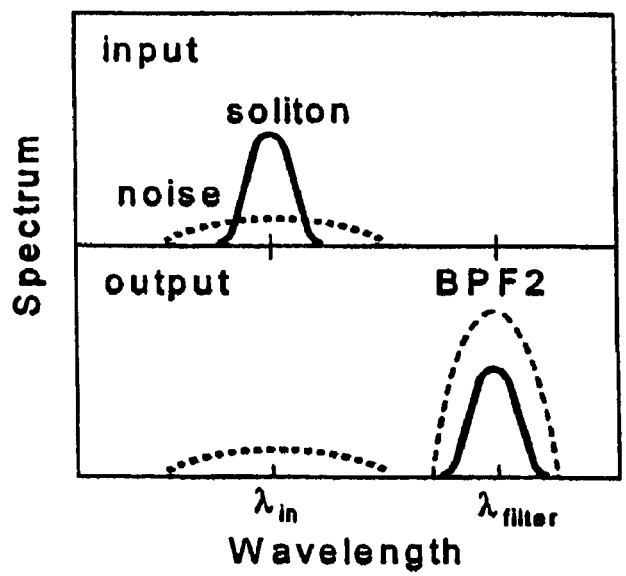
FIG. 40B is a graph showing a mechanism of a noise reduction unit.

Because one group of pulses is made to a rectangular waveform, it can suppress a conversion to an intensity jitter from a fluctuation in a relative time positions which are caused by a timing jitter of the external optical signal. The principle thereof is described as shown above (FIG. 39). The width of flat part of the rectangular pulse is equivalent to the range of the suppression.

Figure 33:
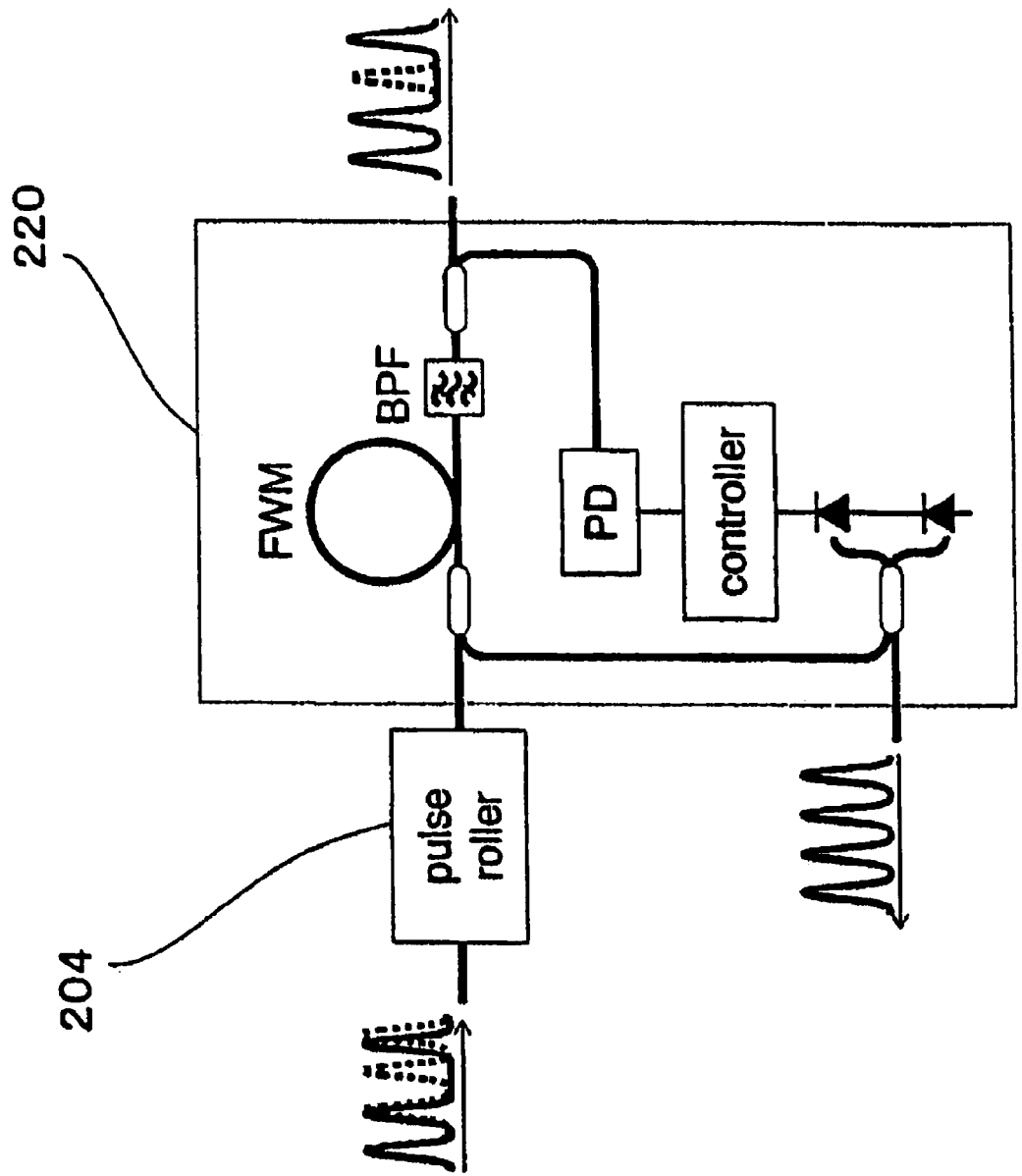
FIG. 33 is one configuration of the clock extractor wherein a pulse roller and an OPLL are combined.

Now, one embodiment of the clock extraction device in which the pulse roller 204 and the OPLL 220 are combined will be described below. The configuration is shown in FIG. 33. It comprises a pulse roller 204 and a clock extraction device in FIG. 24.

The optical signal pulse is made to a rectangular waveform by the pulse roller 204 and the rectangular waveform light and the optical LO enter the FWM unit. Then the generated FWM light is converted to an electrical signal at the photo receiving device. One of the remarkable points of the present invention is that the output pulse characteristic from the pulse roller is utilized in a method of detecting the FWM light as an error signal.

In the optical switch as shown in FIG. 24, the setting of the peak values of the input signal light and the optical LO is important. It is necessary to shift both peak timing positions in order to detect the phase difference between the input signal and the optical LO by means of the average power changes of the output from the optical switch.

In the optical switch as shown in FIG. 24, when using the photo receiving device in FIG. 26, it is necessary to adjust both time positions of the peak points of the signal light from the optical switch and the optical LO to be the same, since the average light intensity is used for sensing the phase. Hence, the optical switch in FIG. 24 needs to be operated independently of the OPLL.

In a method of sensing a phase of the output light from the optical LO which is applied a frequency modulation, the peak value of the input signal light is generally coincide with the optical LO in its average, however, its time difference of the peak points between each pulse varies depending on the modulated frequency. In addition, because a frequency modulation is applied to the output light from the optical LO, there is an occasion where the jitter is accumulated at multiple times whenever the optical regeneration is carried out.

Figure 35A:
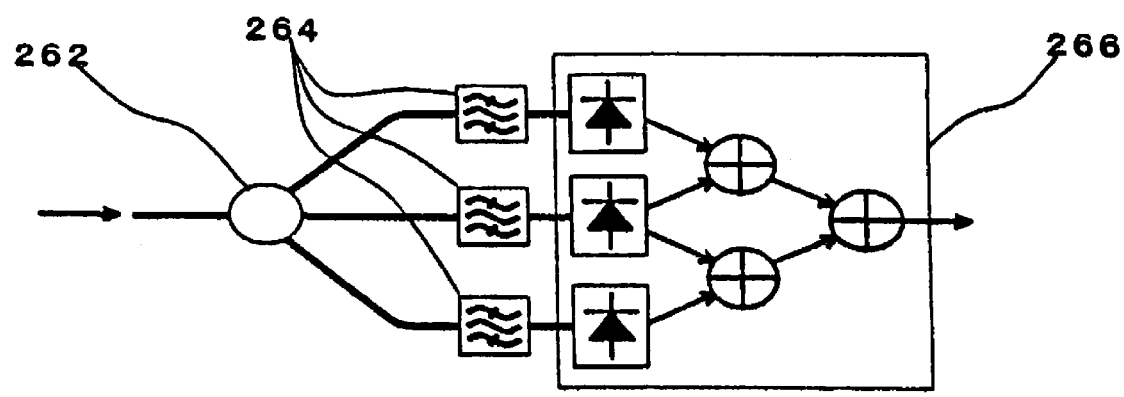
FIG. 35A and FIG. 35B show the photo receiving device which detects a phase difference.
Figure 35B:
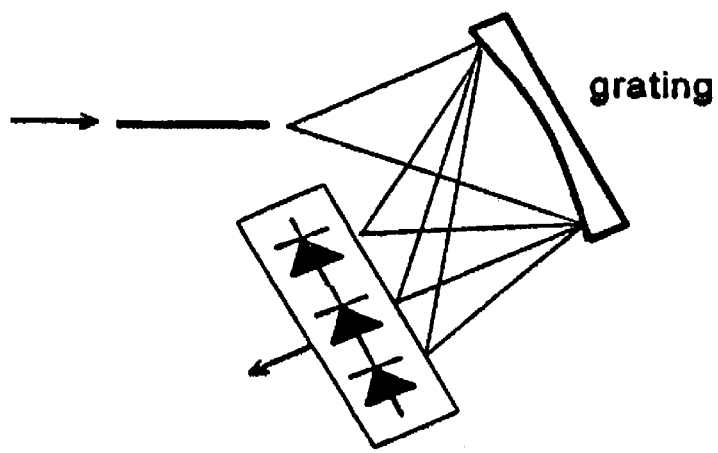

In contrast, the peak values coincide at the photo receiving device as shown in FIG. 35A and FIG. 35B, although it is an average value processing when sensing a phase by means of a spectrum of an FWM light. Therefore, it can effect functions of both of the optical switch and the OPLL at the same time.

Figure 34A:
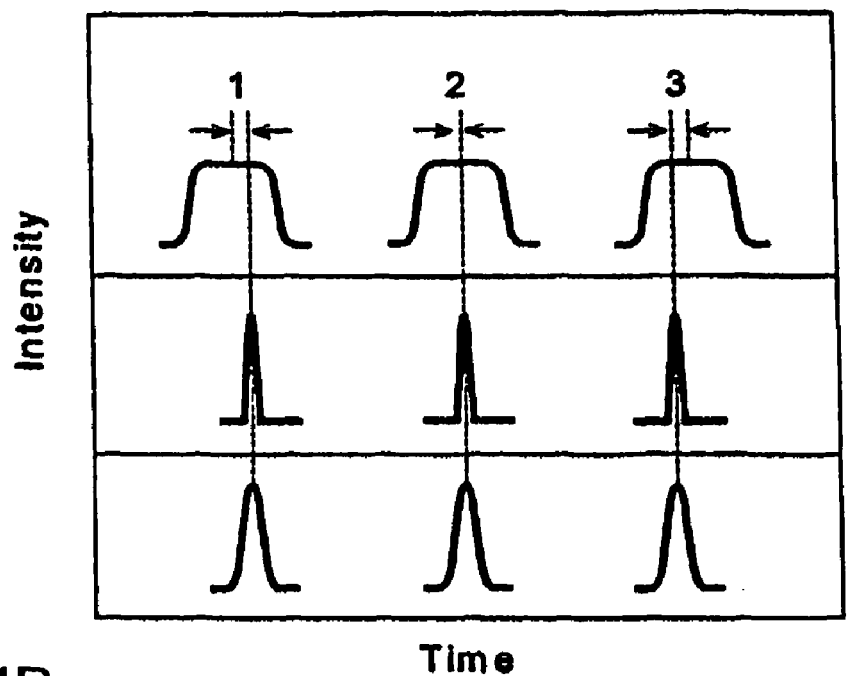
FIG. 34A and FIG. 34B are a graph showing a time waveform and a chirping characteristic of the output pulse from the pulse roller.
Figure 34B:
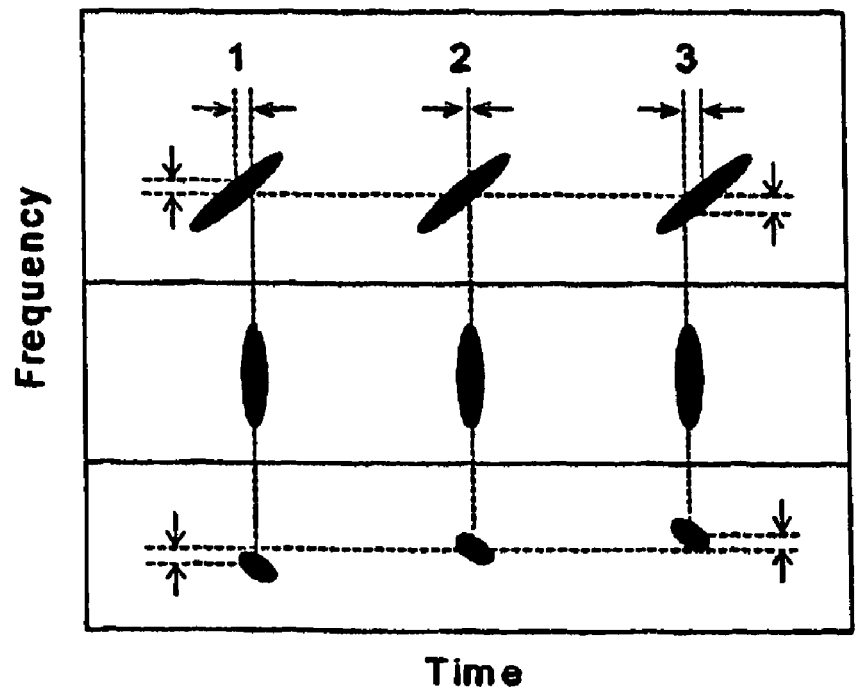

Typical time waveforms of the output pulse and the chirping (a change in time of the instantaneous frequency) characteristic of the pulse roller are illustrated in the top part of FIG. 34A and FIG. 34B, respectively. In general, a linear chirping is accumulated on the pulse being made to a rectangular waveform by the interaction of a normal dispersion and non-linear effect. The FWM light generated from this pulse and the conversion limit pulse (a center part of FIG. 34A and FIG. 34B) also has a linear chirping. The FWM pulse characteristic is shown in the bottom part of FIG. 34A and FIG. 34B.

Because the rectangular pulse has a linear chirping, the time difference between the input pulses is converted to the frequency difference of the output FWM light. Consequently, by monitoring the frequency difference of the output FWM light, the phase difference between the input pulses can be detected. The photo receiving device to sense the phase difference from the FWM light is illustrated in FIG. 35A and FIG. 35B.

The photo receiving device comprises a demultiplexer 262, at least two optical filters 264 (three in FIG. 35A) and an optical power comparator 266 for each filter output as illustrated in FIG. 35A. An AWG (arrayed waveguide) may be used in place of the demultiplexer 262 and plurality of the optical filters 264.

At the photo receiving device, FWM light is divided into three waves by the demultiplexer 262, and each wave is inputted into the optical filters 264 which has different transmission frequency. The difference between the filter output powers corresponds to the frequency difference of FWM light or time difference between input pulses of the optical phase comparator. Therefore, the time difference between input pulses can be detected by monitoring the power difference, and the frequency of the optical LO is controlled based thereon. Further, FIG. 35B is another embodiment of the photo receiving device in FIG. 35A which comprises a grating and a PD. The photo receiving device in FIG. 35B has the same function as that in FIG. 35A.

Figure 61:
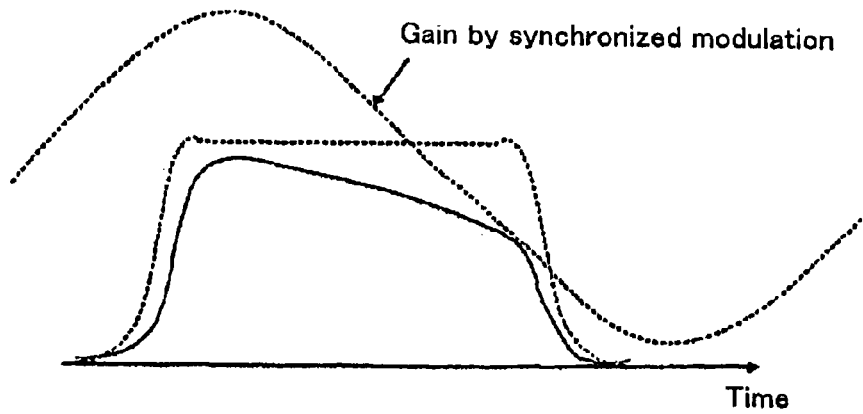
FIG. 61 is an explanatory view of a method to change the amplitude of the rectangle pulse in time domain in the OPLL operation.

As one of the applications of the OPLL operation using a rectangular pulse, the OPLL operation is also possible of changing a pulse amplitude in time as shown in FIG. 61 and sensing the shift of time position as a shift of intensity. As shown in FIG. 61, another method of changing a rectangular pulse amplitude in time is a synchronization modulation technique in which the phase at gain peak is slightly shifted from the center of the rectangular pulse.

As described in FIG. 32, the combination of the pulse roller 204 and the optical switch 222 can be applicable not only to a regenerator as described in FIG. 17, but also to an OTDM signal generator having a high quality repetitive characteristic.

Figure 62:
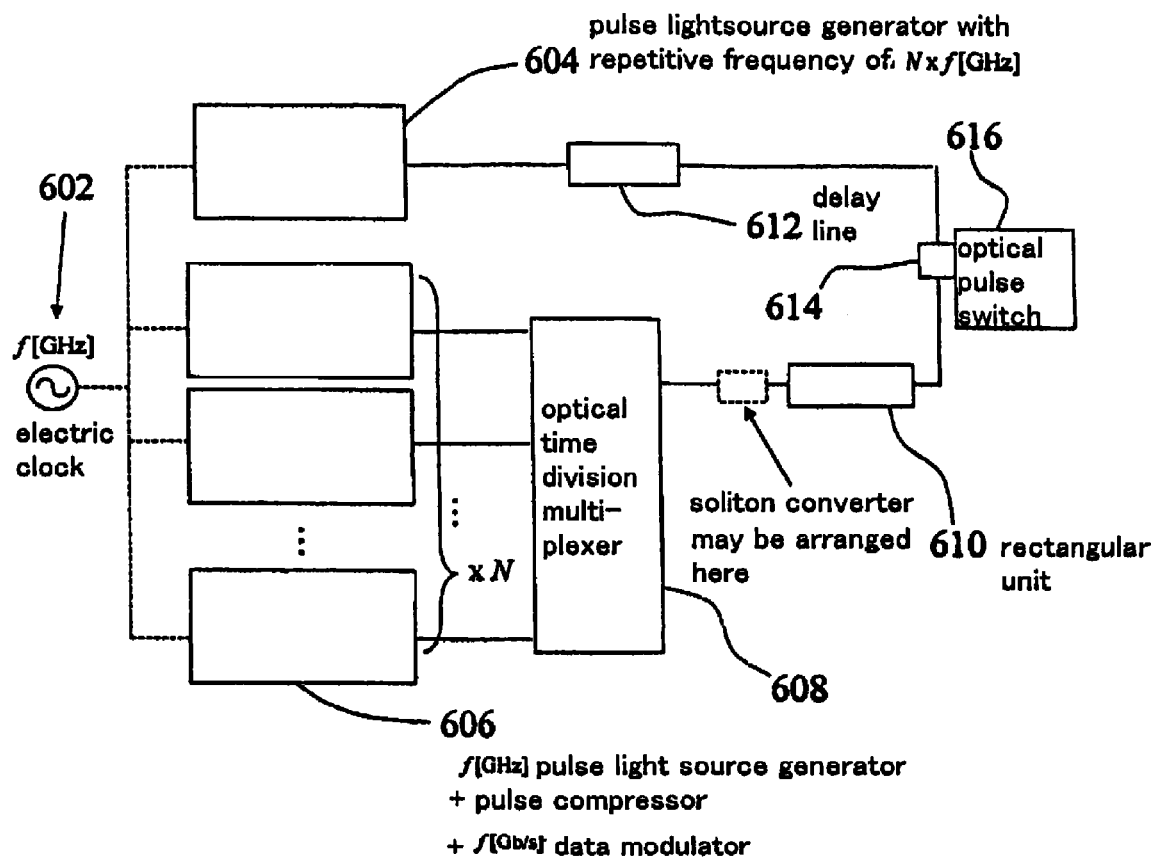
FIG. 62 shows one configuration of the OTDM signal generator in accordance with the present invention.

FIG. 62 shows a whole view of the OTDM signal generator. The pulse light source 604 with repetitive frequency of Nxf [GHz] has a superior repetitive characteristic and no information is carried on. In contrast, the pulse light source 606 has an f [GHz] repetitive frequency, and the time width is compressed so that an optical time division into N channel can be made, furthermore it is assumed that f [Gbit/s] data modulation is to be performed. All of the pulse light source 604 and the N units of pulse light sources 606 are assumed to be synchronized with the generated electrical clock signal. In FIG. 62, the electrical clock signal 602 is used for synchronizing the pulse light source 604 and the pulse light source 606, however it is not limited to this, for example, and a beat signal light can be used.

The information signals generated at the N units of pulse light sources 606 are multiplexed of time division by the optical time division multiplexer 608. The combination of the pulse light source 606 and the optical time division multiplexer 608 has been used conventionally, however its repetitive frequency characteristic is not in high quality all the case, for example, it includes a timing jitter. The signal which is multiplexed by the optical time division multiplexer 608 is reshaped to a rectangular waveform by the rectangular unit 610.

The optical signal generated at the pulse light source 604 is adjusted in its time position with the output signal from the rectangular unit 610 by using a delay line 612, then multiplexed by the multiplexer 614, and then the only logical signal of the OTDM is copied onto the optical pulse which is generated by the pulse light source generator 604, and as a result, the high quality pulse which is the same level of the repetitive frequency characteristic as the pulse generated by the pulse light source generator 604 can be obtained.

The delay line 612 may be placed either before or after the rectangular unit 610, or disposed within the optical time division multiplexer 608. Furthermore, in order to improve the efficiency of the rectangular unit 610, a solution converter may be placed before it.

Figure 36A:
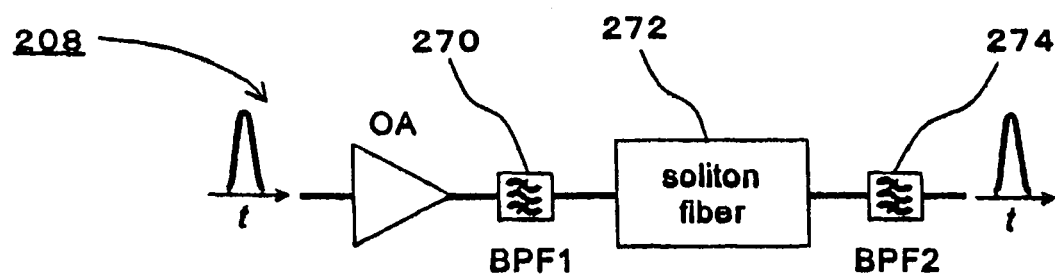
FIG. 36A shows one configuration of the solution purifier.

Next, the solution purifier 208 as a noise reduction device in this embodiment will be shown in FIG. 36A. The solution fiber 272 is placed between the two optical filters 270 and 274.

The operation of the solution purifier 208 will be described briefly. Firstly, noise components outside the signal bandwidth are eliminated by the BPF 270, and then the signal spectrum exceeding the BPF bandwidth is shifted in frequency domain by utilizing a Raman self frequency shift phenomenon in the solution fiber 272. At that time the noise components existing in the original signal bandwidth is not frequency-shifted to be able to separate the solution from the noise. At last, the noise components outside the signal bandwidth is eliminated again by the BPF 274. Thus, the noise of the signal is remarkably reduced.

The optical signal pulse entering the solution purifier 208 is performed a noise elimination, and the noise components outside the optical signal bandwidth are eliminated by the input side optical filter 270. After that, it is inputted to the solution fiber 272 which has an anomalous dispersion. In the solution fiber 272, it is important that the solution is controlled to allow a sensing of a slope of the gain by the stimulated Raman scattering (hereinafter called a gain slope) in the region within the bandwidth. As a result of the existence of the gain slope, the solution is wavelength-shifted. This phenomenon is known as a Raman self frequency shifting (Mitschke et al., Opt. Lett., vol. 11, p. 659 (1986) and Gordon, Opt. Lett., vol. 11, p. 662 (1986)). The solution with wavelength shifted is extracted by the output side optical filter 274.

The distinctive characteristic of the present invention is that the gain slope is controlled to effectively realize the wavelength shift of solution. This embodiment adopts the following two methods.

Figure 36B:
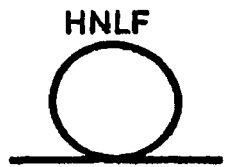
FIG. 36B shows one embodiment wherein an HNLF is used in the solution purifier.
Figure 37A:
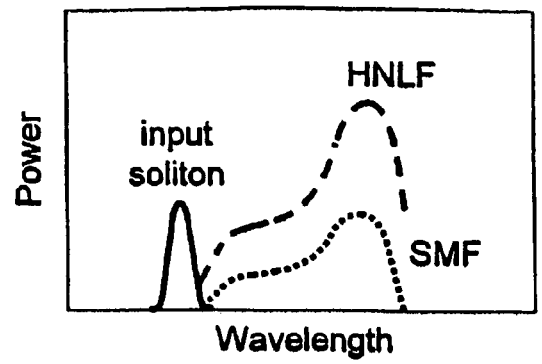
FIG. 37 is an explanatory graph of a gain slope in the solution wavelength.
Figure 37B:
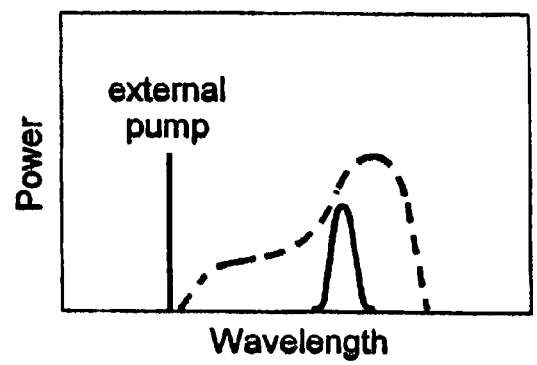
Figure 38:
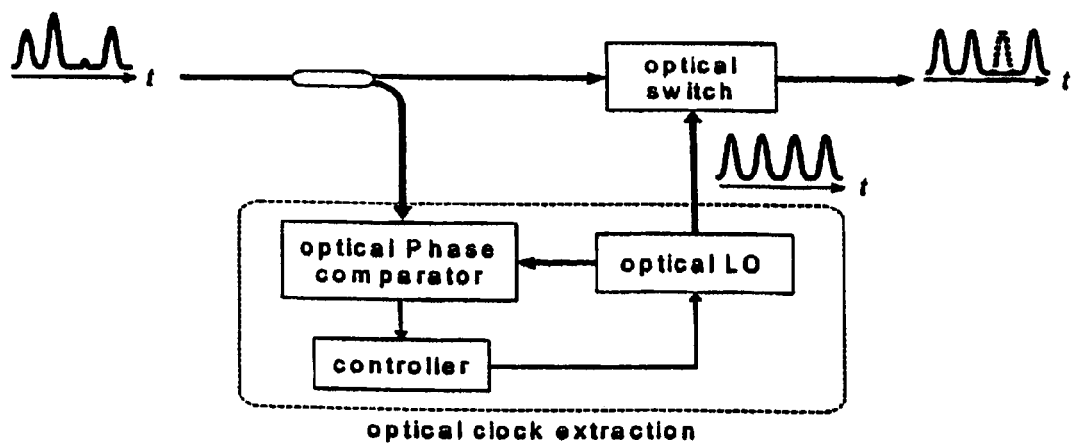
FIG. 38 is an explanatory view of the conventional re-timing technique.

The first method is to utilize an HNLF as a solution fiber (FIG. 36B). When a solution transmits to the fiber, the solution itself becomes a pump and generate a Raman gain in the lower frequency side. By sensing the gain slope, the center frequency of the solution shifts towards the lower frequency side thereof. This phenomenon is a solution self-frequency shift (SSFS). The typical Raman gain of HNLF is shown in FIG. 37A. For the comparison purpose, the Raman gain of SMF is shown as well.

Because the HNLF has a larger gain slope than SMF, even the fiber length is short, the SSFS effect can be strengthened. Therefore, by using an HNLF, the fiber length can be shortened, as a result the fiber loss is reduced, and the interaction between solitons can be suppressed.

Figure 36C:
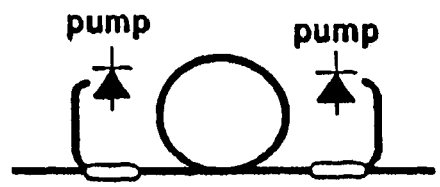
FIG. 36C shows one embodiment wherein a Raman amplifier is used in the solution purifier.

The second method is a Raman amplification utilizing an external pumping light (FIG. 36C). In FIG. 36C, the pumping light generator is placed before and after. The position of the pumping light generator is acceptable in either before or after side or both sides.

Figure 63:
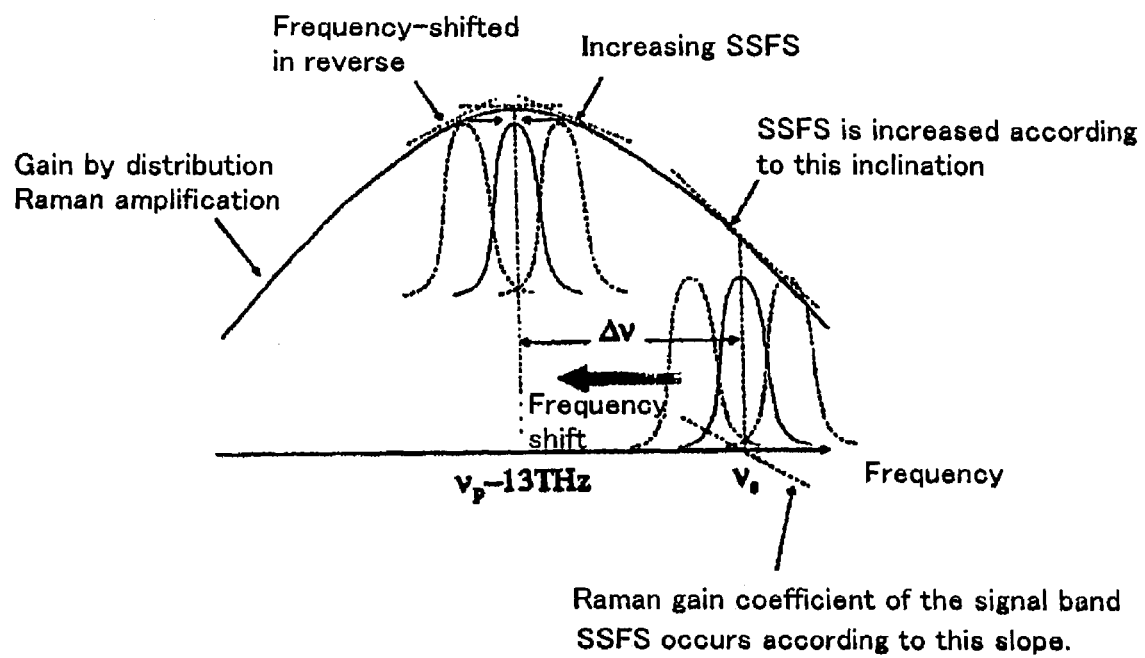
FIG. 63 is an explanatory view showing a relation between an amplifier gain by a Raman amplifier and a solution spectrum.

The solution purifier in this configuration works to control the SSFS effect through the amplification adjustment by the external pumping light. FIG. 63 shows a relationship between the amplified gain by the Raman amplifier and the solution spectrum in a frequency domain. When a pumping light frequency is expressed by vp, the Raman amplifier gain is in a peak at vp-13 THz approximately. On the other hand, the condition where the gain slope of for the frequency is maximized at frequency of vp-10 THz approximately, however, the SSFS effect can be maximized by setting the center frequency of the solution vs to this value. Furthermore, when the amount of frequency shift by the SSFS is expressed as Δv, the solution frequency shift can be limited by setting to satisfy vs−Δv=vp−13 THz.

It is known that a solution self frequency shift for the unit transmission distance is inversely proportional to the biquadrate of the pulse width. The frequency shift can be more effectively realized by compressing a pulse after inserting the pulse compressor in a position before the solution purifier 208.

In case of performing a stimulated Raman amplification at front and rear sides as illustrated in FIG. 36C, by means of designing in such a manner that the optical power is gradually increasing along with a transmission distance so that a solution adiabatic compression occurs, the pulse is compressed during the transmission, and hence the frequency shift can be done efficiently.

Figure 67:
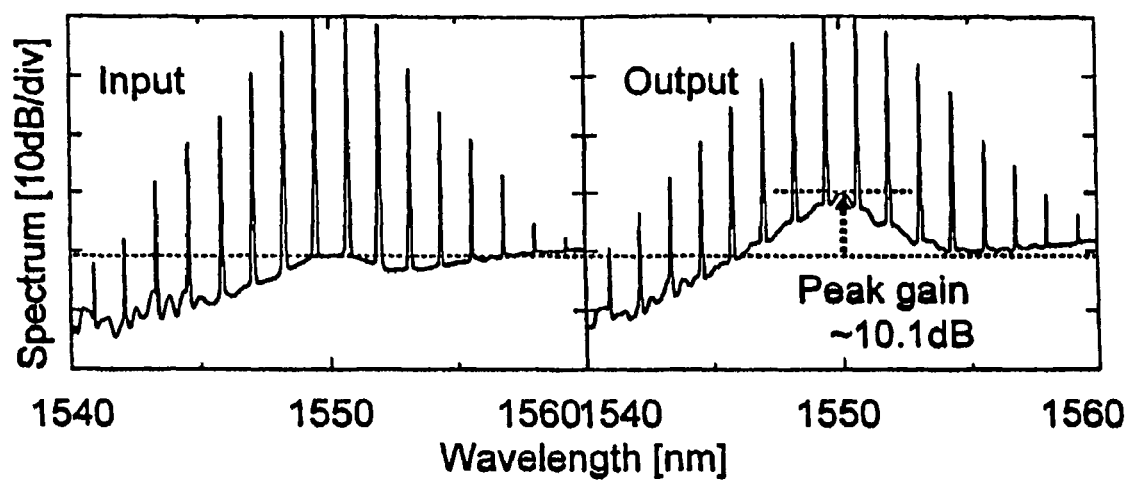
FIG. 67 is a graph of an input and output spectrum when the optical solution train which has a repetitive frequency of 160 GHz and a half width of 1 ps transmitted in the 2 km distance of the HNLF.
Figure 69:
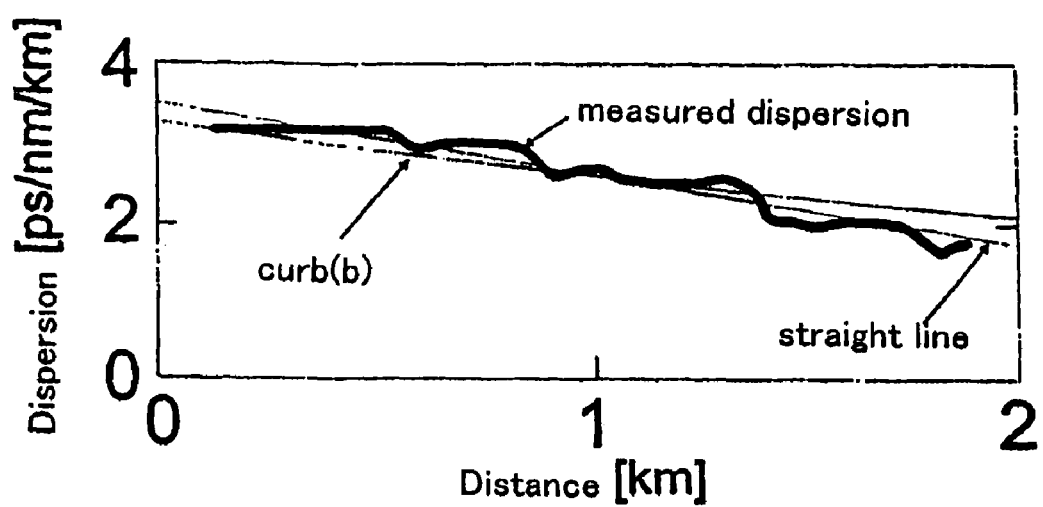
FIG. 69 is a graph showing a relation between an HNLF length (distance) and a dispersion value used in FIG.67.

When studying a whole optical nonlinear signal processing using an optical solution train having a good repetitive characteristic, it may be a problem that a noise near the signal bandwidth is amplified. FIG. 67 shows an experimental result of the input and output spectrum wherein the optical solution which has a 160 GHz repetitive frequency and 1 ps full width half maximum travels a 2 km HNLF. As is clear from FIG. 67, the noise near the center frequency is amplified. The dispersion used continuously decreases from about 3.5 ps/nm/km to about 1.8 ps/nm/km, and the nonlinearity is at 21.8 $w^{-1}km^{-1}$ and the loss is at 1 dB/km. In FIG. 69, the straight line (a) is approximated in linear from the measured dispersion values and hence the relation derived is expressed as an equation of D=3.5−0.9Z where a dispersion value is D [ps/nm/km] and a distance is Z [km]. On the other hand, the curved line (b) is the function expressed as $D=3.25 \times 10^{-0.1Z}$, where a ratio of decrease of D is 1 dB/km. It is estimated from FIG. 69 that the fiber dispersion almost linearly decreases for the length, but because the distance is short, it can be approximated by an exponential function, in this case, the decreasing ratio is 1 dB/km which is coincident with 1 dB/km which is a decreasing ratio of the fiber loss value. When the attenuation of the light power along with the transmission distance caused by the fiber loss and the attenuation of the dispersion are in balanced, the transmission path can be treated as equivalent to a non loss path (K. Tajima "Compensation of soliton broadening in nonlinear optical fibers with loss," Opt. Lett. vol. 12, pp. 54-56, 1987.), and consequently it can be treated equivalently as the basic soliton travels 1.6 km effective distance without loss. The noise amplification in FIG. 67 is a result of parametric process by a discrete spectrum of the optical pulse with a very high repetitive characteristic. When a duty ratio (=pulse half width/pulse duration) is large (more than 0.2), the peak gain of the amplified noise is determined by only the duty ratio and transmission distance because the optical soliton train travels without any loss.

Figure 64:
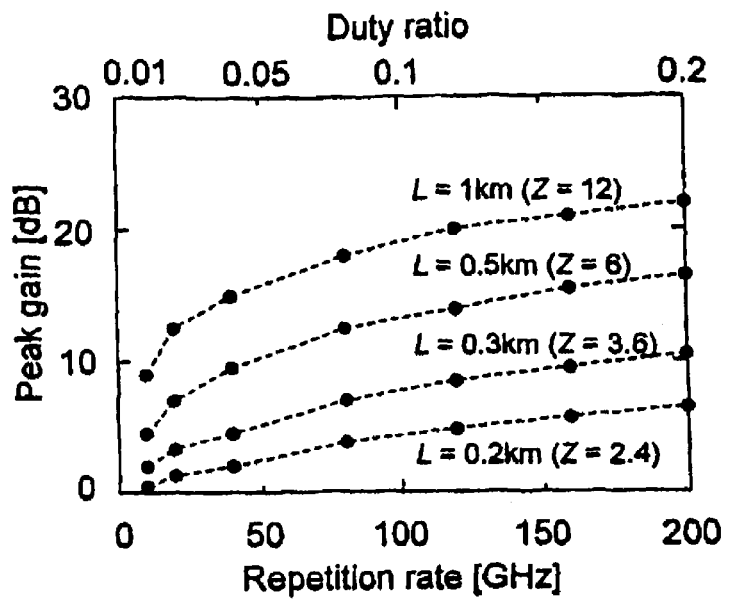
FIG. 64 is a graph of a peak gain of the noise amplification for a bit rate and transmission distance obtained by a numerical calculation.

FIG. 64 shows the peak gain of the amplified noise vs the bit rate and the transmission distance by a numerical calculation. It is assumed that the soliton pulse train with 1 ps pulse width travels in the fiber (dispersion value 3 [ps/nm/km], nonlinear coefficient 20 [1/km/w].) along with the noise. In this case, the dispersion distance is calculated as 0.1 km, and distance L in the drawing is converted to a ratio for the dispersion distance Z, and the noise amplified gain is determined by only the duty ratio and Z. For example, when the repetitive frequency is 160 GHz (duty ratio 0.16) and if the noise amplified gain needs to be less than 15 dB, the maximum distance that the soliton can travel is indicated as 0.5 km from FIG. 64, or up to 5 times of the dispersion distance. The fact that the noise amplified gain is determined by the duty ratio and the dispersion distance is truly-applicable to the case where the initial soliton power is thought to be relatively very small compared to the arbitrary physical scale and the initial noise power.

Figure 65:
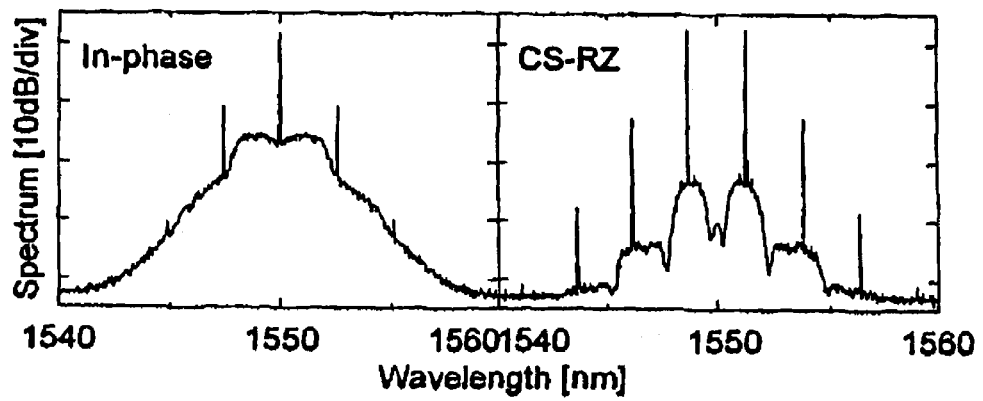
FIG. 65 is a graph of a spectrum of the output pulse train when setting a bit rate to be 320 GHz and a transmission distance at 1 km in FIG. 64.

On the other hand, when the duty ratio is large, the condition of the noise amplification relates to the phase difference between the neighboring pulses in the soliton train. FIG. 65 shows a calculated spectrum of the output pulse train in the condition wherein the fiber and the pulse are the same parameters as those in the previous case, and the repetitive frequency is 320 GHz and the transmission distance is 1 km. Evidently, it demonstrates that the CS-RZ pulse train wherein the phase difference between neighboring pulses is λ has been suppressed more in a noise amplification than the same phase pulse train.

Consequently, when the soliton train with high repetitive characteristic travels, it is suggested that the noise amplification is much suppressed in case of adopting a CS-RZ train. The conclusion of the calculation in FIG. 65 is applicable to the case where the repetitive frequency is 160 GHz, pulse width is 2 ps and the transmission distance is 4 km.

Figure 66:
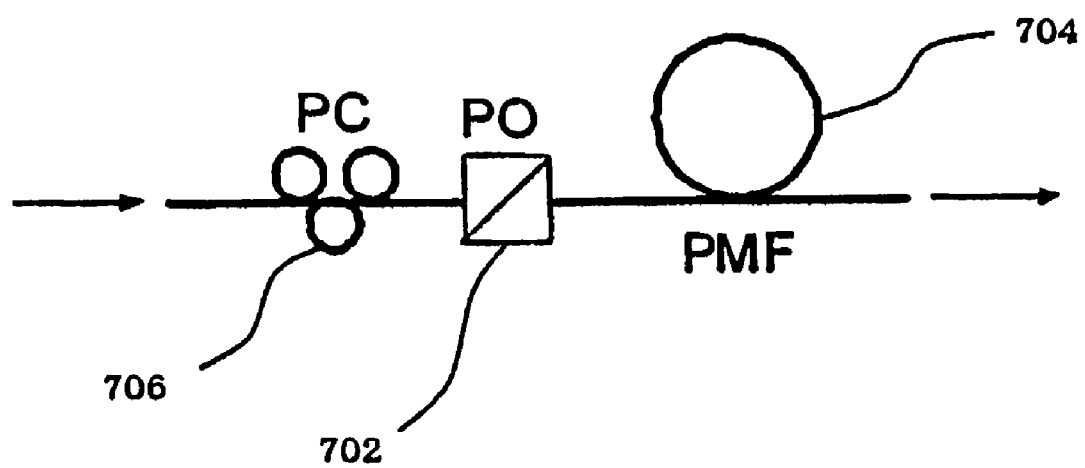
FIG. 66 shows one configuration of the polarization maintaining device utilizing a nonlinear effect.

The detail of the regenerator has been explained in the above. Those are the devices or combination thereof wherein the nonlinearity of the optical fiber is primarily utilized. In general, since the nonlinearity effect depends on the input light polarization, the improvements of the performance and the stability can be made by realizing a polarization maintaining characteristic of the fiber used in those devices. One of the embodiments is shown in FIG. 66. It comprises a polarizer 702 and a polarization maintaining fiber (PMF) 704.

The input light is allowed to pass a single polarized component through the polarizer 702, then enters the PMF 704. The polarized wave after passing through the polarizer 702 is optimized to fit the PMF 704. In order to reduce the loss by the polarizer 702, it is preferable to place the polarizing controller 706 before the polarizer 702 so that the input light polarizing condition is optimized by the polarizing controller 706. The optimization of the PM for the nonlinear devices as described above is effective not only to the performance improvements but also to the downsizing of devices. Because the PMF 704 is durable under influence of the loss or the birefringence caused by a fiber bending, the diameter of a bobbin for winding a fiber can be made smaller. As a result of smaller size of the bobbin, the device can be made in a smaller dimension.

Consequently, according to the wavelength division multiplexing optical regeneration system and the wavelength division multiplexing optical regeneration method of the present invention, the transmission speed of the wavelength division multiplexing optical light in the wavelength division multiplexing optical regeneration system can be increased to 40 GBit/s of bit rate or higher and also the downsizing and the power saving can be realized.

Furthermore, when it passes a plurality of relaying stations which includes the wavelength division multiplexing optical regeneration system of the present invention, the wavelength division multiplexing optical light cab be correctly regenerated at each station, and hence the quality such as a signal intensity, a waveform, a timing or the like of the wavelength division multiplexing light can be maintained. As a result, the optical communication system for long distance can be realized according to the present invention.

Therefore, the industry applicability of the wavelength division multiplexing optical regeneration system and the wavelength division multiplexing optical regeneration method according to the present invention is significantly important in the usage value in this communication industry.

The invention claimed is:

1. A waveform reshaping device having a soliton converter comprising an anomalous dispersion fiber (ADF) in which a fiber length thereof is up to twice of that of a soliton frequency, said waveform reshaping device comprising:
    a pulse compressor at an input side, wherein
    said pulse compressor utilizes adiabatic compression, and includes an SDPF in which the dispersion has a step like profile in a longitudinal direction of the optical fiber.

2. A waveform reshaping device having a soliton converter comprising an anomalous dispersion fiber (ADF) in which a fiber length thereof is up to twice of that of a soliton frequency, said waveform reshaping device comprising:
    a pulse compressor at an input side, wherein
    said pulse compressor utilizes adiabatic compression, and includes a CDPF in which the dispersion has a comb like profile in a longitudinal direction of the optical fiber.

3. A waveform reshaping device having a soliton converter comprising an anomalous dispersion fiber (ADF) in which a fiber length thereof is up to twice of that of a soliton frequency, said waveform reshaping device comprising:
    a pulse compressor at an input side, wherein
    said pulse compressor utilizes adiabatic compression, and includes an optical fiber in which nonlinearity has a step like profile increasing in a longitudinal direction of the optical fiber.

4. A waveform reshaping device having a soliton converter comprising an anomalous dispersion fiber (ADF) in which a fiber length thereof is up to twice of that of a soliton frequency, said waveform reshaping device comprising:
    a pulse compressor at an input side, wherein
    said pulse compressor utilizes adiabatic compression, and includes an optical fiber in which nonlinearity has a comb like profile increasing in a longitudinal direction of the optical fiber.

* * * * *